US012667771B2

(12) United States Patent
Kruzynski

(10) Patent No.: US 12,667,771 B2
(45) Date of Patent: Jun. 30, 2026

(54) PICKLEBALL PLAYER STATISTICS TRACKING DEVICE AND METHOD

(71) Applicant: RJK Pharmacy Innovations LLC, Bonita Springs, FL (US)

(72) Inventor: Richard J. Kruzynski, Bonita Springs, FL (US)

(73) Assignee: RJK Pharmacy Innovations LLC, Bonita Springs, FL (US)

( * ) Notice: Subject to any disclaimer, the term of this patent is extended or adjusted under 35 U.S.C. 154(b) by 0 days.

(21) Appl. No.: 19/089,514

(22) Filed: Mar. 25, 2025

(65) Prior Publication Data

US 2025/0303262 A1 Oct. 2, 2025

Related U.S. Application Data

(60) Provisional application No. 63/675,621, filed on Jul. 25, 2024, provisional application No. 63/571,104, filed on Mar. 28, 2024.

(51) Int. Cl.
| | |
|---|---|
| *A63B 71/06* | (2006.01) |
| *A63B 102/00* | (2015.01) |
| *G06F 3/0488* | (2022.01) |

(52) U.S. Cl.
CPC ........ *A63B 71/0669* (2013.01); *G06F 3/0488* (2013.01); *A63B 2102/00* (2015.10)

(58) Field of Classification Search
CPC ............ A63B 71/0669; A63B 2102/00; G06F 3/0488
USPC ......................................................... 700/92
See application file for complete search history.

(56) References Cited

U.S. PATENT DOCUMENTS

| | | |
|---|---|---|
| D446,790 S | 8/2001 | Wang et al. |
| D603,418 S | 11/2009 | Magnani et al. |
| D666,626 S | 9/2012 | Mori et al. |
| D710,368 S | 8/2014 | Amaitis et al. |
| D724,567 S | 3/2015 | Buch et al. |
| D753,692 S | 4/2016 | Vazquez |
| D757,054 S | 5/2016 | Starbuck et al. |
| D759,662 S | 6/2016 | Panjabi |
| D770,488 S | 11/2016 | Li et al. |
| D771,077 S | 11/2016 | Ryzhkov |

(Continued)

FOREIGN PATENT DOCUMENTS

| | | |
|---|---|---|
| CA | 224242 | 11/2023 |
| JP | 1405943 | 1/2011 |

OTHER PUBLICATIONS

Images of Pickleball Score Sheets, available before the priority date of this application, Mar. 28, 2024, 4 pages.

(Continued)

*Primary Examiner* — Pierre E Elisca

(74) *Attorney, Agent, or Firm* — Neal, Gerber & Eisenberg LLP

(57) ABSTRACT

Pickleball player statistic tracking devices and methods that enable a scorer to easily and quickly record the results of each rally-ending shot for a play of a pickleball game and the related performance statistics of each player such that the scorer, the players, the teams, and others can easily track, see, and understand how each player/team performed during a play of a pickleball game in addition to the determination of which team actually won or loss the play of the pickleball game.

20 Claims, 42 Drawing Sheets
(10 of 42 Drawing Sheet(s) Filed in Color)

Pickleball Stat Sheet

- Overall Concept: Good shots minus bad shots on the rally-ending point. (Your "Stats")
- Good Shots/Winners: (W) = Winning Shots
- Bad Shots/Mistakes: (SF) = Service Faults
  (UE) = Unforced Errors
- Player Total/Stat - (W) Good shots minus (SF)/(UE) bad shots for each player
- Team Total/Stat - Tabulated for each team
- Compare Team Stat to game score outcome

(56) References Cited

U.S. PATENT DOCUMENTS

| | | | |
|---|---|---|---|
| D773,513 S | 12/2016 | Rhodes et al. | |
| D783,033 S | 4/2017 | Ratcliffe | |
| D801,373 S | 10/2017 | Vaglio et al. | |
| D807,902 S | 1/2018 | Cong et al. | |
| D809,542 S | 2/2018 | Lu | |
| D810,770 S | 2/2018 | Trahan et al. | |
| D818,482 S | 5/2018 | Yates et al. | |
| D825,599 S | 8/2018 | Endre et al. | |
| D829,748 S | 10/2018 | Iwabuchi | |
| 10,091,459 B2 | 10/2018 | Pranger et al. | |
| D845,972 S | 4/2019 | Pranger et al. | |
| D848,448 S | 5/2019 | Carlson et al. | |
| D851,103 S | 6/2019 | Moody | |
| D854,562 S | 7/2019 | Vaccari et al. | |
| D856,345 S | 8/2019 | Clifford et al. | |
| D868,808 S | 12/2019 | Hopper et al. | |
| D869,476 S | 12/2019 | Hopper et al. | |
| D876,455 S | 2/2020 | Holden et al. | |
| D893,524 S | 8/2020 | Sabourenkov | |
| D896,824 S | 9/2020 | Langan et al. | |
| D904,440 S | 12/2020 | Holden et al. | |
| D907,656 S | 1/2021 | Di Bella et al. | |
| D908,134 S | 1/2021 | Liebowitz et al. | |
| D912,078 S | 3/2021 | Pellow | |
| D934,816 S | 11/2021 | Chen | |
| D937,846 S | 12/2021 | Ogawa | |
| D937,882 S | 12/2021 | Harvey | |
| D938,474 S | 12/2021 | Harvey | |
| D940,178 S | 1/2022 | Ang | |
| D944,837 S | 3/2022 | Harvey | |
| D944,838 S | 3/2022 | Harvey | |
| D945,438 S | 3/2022 | Ding | |
| D951,983 S | 5/2022 | Knowles et al. | |
| D958,182 S | 7/2022 | Wang | |
| D964,390 S | 9/2022 | Mairs et al. | |
| D965,020 S | 9/2022 | Xu | |
| D965,606 S | 10/2022 | Chen et al. | |
| D966,309 S | 10/2022 | Kmak et al. | |
| D966,310 S | 10/2022 | Kmak | |
| D966,316 S | 10/2022 | Kmak | |
| D966,322 S | 10/2022 | Altonen et al. | |
| D969,827 S | 11/2022 | Fang et al. | |
| D969,829 S | 11/2022 | Holland | |
| D970,519 S | 11/2022 | Paul | |
| D973,676 S | 12/2022 | Knowles | |
| D977,490 S | 2/2023 | Casse | |
| D978,157 S | 2/2023 | Han | |
| D978,185 S | 2/2023 | Ramaswamy | |
| D979,584 S | 2/2023 | Dalonzo et al. | |
| D979,586 S | 2/2023 | Song | |
| 11,704,892 B2 * | 7/2023 | Velardo | G06V 20/42 |
| D997,958 S | 9/2023 | Feng et al. | |
| D1,010,668 S | 1/2024 | Lu | |
| D1,019,679 S | 3/2024 | Yoo et al. | |
| D1,021,652 S | 4/2024 | Shultz et al. | |
| D1,023,031 S | 4/2024 | Khoreibi et al. | |
| D1,027,985 S | 5/2024 | Schillebeeckx et al. | |
| D1,029,038 S | 5/2024 | Burmester | |
| D1,031,743 S | 6/2024 | Bhatia et al. | |
| D1,033,462 S | 7/2024 | Schaefer et al. | |
| 12,046,015 B2 * | 7/2024 | Velardo | G06V 10/40 |
| D1,051,156 S | 11/2024 | Shriniwar | |
| D1,060,393 S | 2/2025 | Arora | |
| D1,062,788 S | 2/2025 | Foreman Harmon | |
| D1,065,220 S | 3/2025 | Brasure et al. | |
| D1,072,856 S | 4/2025 | Emery et al. | |
| D1,100,950 S | 11/2025 | Kawamoto | |
| 2015/0199876 A1 | 7/2015 | Weber et al. | |
| 2015/0208491 A1 | 7/2015 | Lipscombe | |
| 2016/0266169 A1 | 9/2016 | Garland et al. | |
| 2017/0270079 A1 | 9/2017 | Rajwat et al. | |
| 2018/0104573 A1 | 4/2018 | Jeffery et al. | |
| 2021/0113911 A1 | 4/2021 | Madsen | |
| 2021/0220722 A1 | 7/2021 | Stringfield | |
| 2021/0354024 A1 * | 11/2021 | Goodwin | A63B 71/0622 |
| 2022/0114370 A1 | 4/2022 | Khatri | |
| 2022/0347549 A1 | 11/2022 | Washburn | |
| 2023/0330508 A1 | 10/2023 | Spack | |
| 2023/0351718 A1 * | 11/2023 | Velardo | G06V 20/42 |
| 2024/0245976 A1 * | 7/2024 | Cohen | G06F 3/1454 |
| 2024/0342580 A1 * | 10/2024 | Brown | A63B 71/0669 |
| 2024/0350881 A1 | 10/2024 | Popnoe | |
| 2024/0410116 A1 | 12/2024 | Jackson | |
| 2025/0032888 A1 | 1/2025 | Eklund | |
| 2025/0046081 A1 | 2/2025 | Kogler et al. | |
| 2025/0130531 A1 * | 4/2025 | Dinardi | G04G 21/08 |
| 2025/0177836 A1 | 6/2025 | Markison et al. | |

OTHER PUBLICATIONS

Images of USA Pickleball New Combined Scoresheets, available 2021, 3 pages.

Pickleball Scoresheet, https://www.etsy.com/listing/1530580187/pickleball-score-sheet-85-x-11-instant (Year: 2023).

Pickleball Scoresheet, https://www.etsy.com/listing/1555226194/downloadable-pickleball-scoresheet-score (Year: 2023).

* cited by examiner

Figure 1:
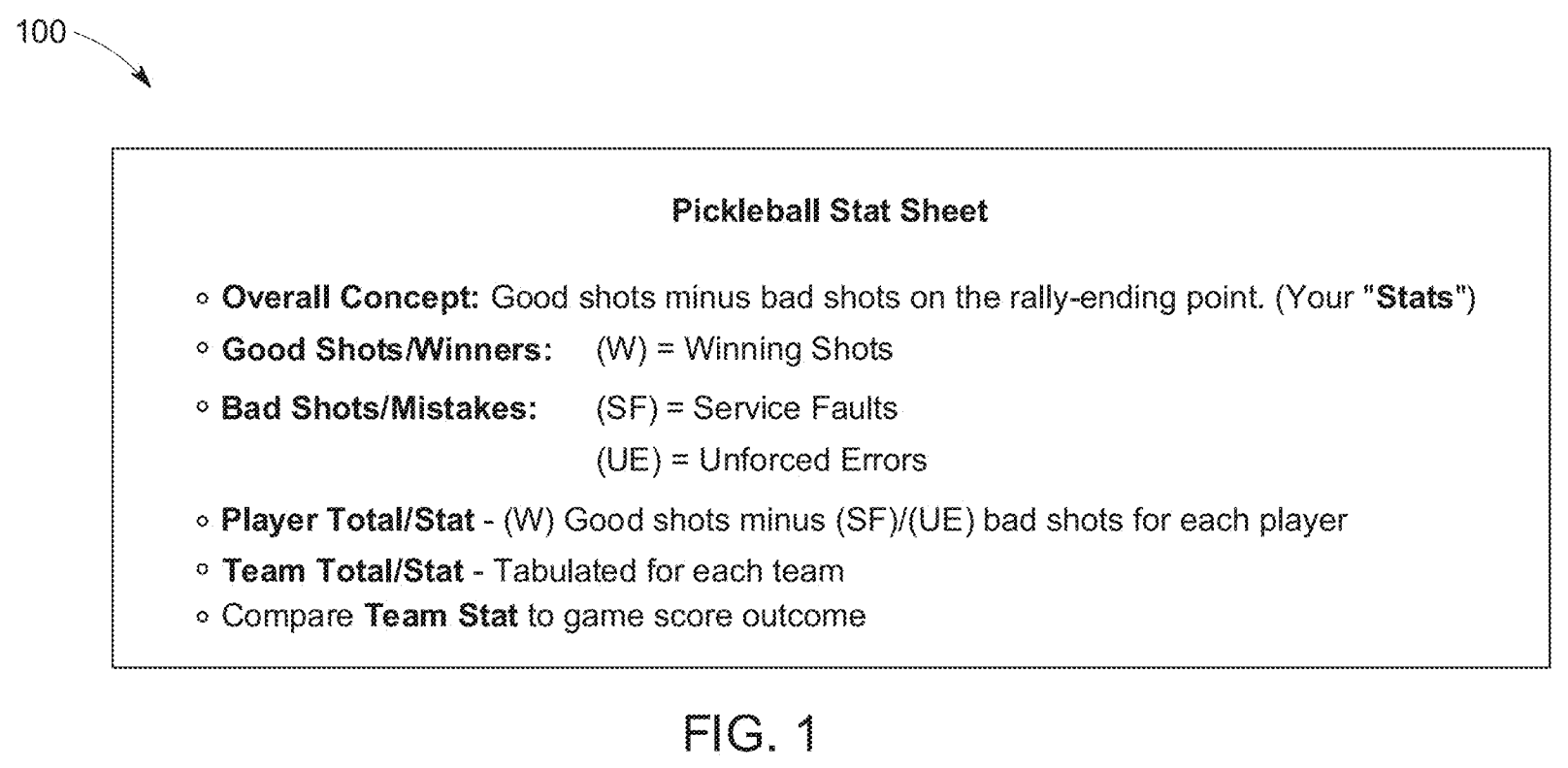

Pickleball Stat Sheet

○ Overall Concept: Good shots minus bad shots on the rally-ending point. (Your "Stats")

○ Good Shots/Winners:    (W) = Winning Shots

○ Bad Shots/Mistakes:    (SF) = Service Faults (UE) = Unforced Errors

○ Player Total/Stat - (W) Good shots minus (SF)/(UE) bad shots for each player ○ Team Total/Stat - Tabulated for each team ○ Compare Team Stat to game score outcome

PICKLEBALL PLAYER STATISTICS TRACKING DEVICE AND METHOD

PRIORITY CLAIM

This application claims priority to and the benefit of U.S. Provisional Patent Application No. 63/571,104, filed Mar. 28, 2024, and U.S. Provisional Patent Application No. 63/675,621, filed Jul. 25, 2024, the entire contents of both of which are incorporated herein by reference.

BACKGROUND

Pickleball has widely grown in popularity. The following explanations provide various information regarding pickleball and various rules for playing pickleball. This information and these rules are provided in no particular order and do not include all information regarding pickleball and all pickleball rules.

Pickleball is played on a court including two equal sides and a net between the two sides. Each side of the net has a first section generally called the "kitchen" that is adjacent to the net. Each side of the net has two equal rear sections adjacent to the kitchen. These sections are indicated by spaced apart side parallel lines, a kitchen line spaced 7 feet from the net extending between the side lines, a baseline parallel to the kitchen line and spaced 20 feet from the net, and a center line equally spaced between and parallel to the side lines and extending between the kitchen line and the baseline. The side lines therefore partially define the kitchen and partially define the rear sections. The kitchens are thus the respective court sections within 7 feet on both sides of the net.

Pickleball can be played either by two people (i.e., singles—where one person is on each side of the net) or by 4 people (i.e., doubles where two people are on each team and are on each side of the net). Pickleball is most commonly played as doubles. The same size court and rules are used for both singles and doubles.

Pickleball is played with a single plastic ball with holes, and each player has a paddle that the player uses to hit the ball and thus play each rally of the game.

In most pickleball games, points can only be scored by a team when that team is the serving team and wins a rally (i.e., there is a rally-ending shot-which can include an unforced error by a player). In other words, the team receiving the serve cannot score a point on that rally, but rather a win of that rally is a step toward getting the service turn back to that receiving team. A rally can include one or more hits of the ball by the players. Rallies can include only one hit by the serving player (such as (1) an ace where the other team does not hit or return the ball, or (2) a service fault, or can include multiple hits by one or multiple players on both teams that eventually ends via a rally-ending winning shot or a rally-ending unforced error.

Pickleball games are normally played to 11 points (with win by 2 scoring). Pickleball games such as tournament game can be played to 15 or 21 (with win by 2 scoring) or can be timed.

Before a player serves, the serving player calls out the score of the game prior to the serving the ball. The score is called as three numbers that include, in the following order: (1) the serving team's score; (2) the receiving team's score; and (3) for doubles only, the server number: 1 or 2. The server number refers to whether the first player on the serving team is serving or the second player on the serving team is serving.

To start a match, the score will be called as: zero-zero-two (because only one player of the first serving team gets to serve for the start of the game).

The server number (1 or 2) applies for that service turn only. The player of a team who is on the right or R side of the court (depending on the score) when a team gets the serve back is the first server for that service turn. The next time that a team gets the serve back, it might be the other player that is on the right or R side and is therefore the first server for that service turn.

A loss of a rally by the receiving team results in a point for the serving team. A loss of a rally (other than on the serve) occurs when a team hits a ball outside of the court or fails to return a ball to the other side of the court, or before the ball bounces two times. During all rallies (other than on the service), a ball that touches any of the side lines, the kitchen line, the center line, or the baseline are considered in play.

A loss of a rally by the serving team results in that team's player loss of serve. If the player's partner (i.e., the other player on the team) has already served for that service turn, the serving team loses the service turn and the receiving team gets the service turn back.

On a serve, to be considered "in" and not a service fault, the ball must land in the opposite rear section of the court. If the served ball contacts the kitchen line, that is considered a service fault. In other words, a served ball in the kitchen, on the kitchen line, or on any of the side lines defining the kitchen is considered a service fault and results in a loss of the rally.

During any rally (i.e., during the service or thereafter), each player is prohibited from hitting the ball on the fly when the player is within the kitchen, on the kitchen line, or their momentum from hitting the ball on the fly causes either or both of their feet to land in the kitchen or on the kitchen line. This rule prevents players from executing smashes of a fly ball from a position within the kitchen. In other words, if a player steps in the kitchen or on the kitchen line, and hits a ball on the fly and/or when the player's momentum causes them or anything they are wearing or carrying to touch the kitchen or kitchen line of either of the side lines that define the kitchen, that player/team loses the rally. A player may legally be in the kitchen any time other time. At any time, a player may hit a ball after the ball lands in the kitchen even if the player is in the kitchen or on the kitchen line or portions of either of the side lines that define the kitchen.

During a serve, the server's arm must be moving in an upward arc when the paddle held by the server strikes the ball. On the serve, the paddle's contact with the ball must also not be made above the serving player's waist level, and the head of the paddle of the server must not be above the highest part of the wrist of the server at the point of contact with the ball. At the time the ball is struck on the serve, the server's feet may not touch any part of the court and at least one foot must be behind the baseline (which is the furthest line from the net) on the surface behind the baseline.

The first serve of each serving team is made from the right side (which is often called the even side) of the court. In other words, at the start of each service turn (including the first service turn of the game), the player on the right side serves to the diagonally opposite side rear section of the opponent's part of the court. The served ball must be made diagonally and must land within the diagonally opposite rear section of the opposing team's side of the court beyond the kitchen and the kitchen line on that side of the court. Each serving player has only one serve attempt to make a good serve. In other words, unlike tennis, there is no second serve.

On the first service turn of a game, only one player on the first serving team can serve. If the serving team scores a point, the server switches sides to the left or L side (which is often called the odd side) and the server player initiates the next serve from the left or L (odd) side of the court. As subsequent points are scored by the first serving team, the serving player continues switching back and forth until they lose a rally. When this occurs for the first serving team, the first serving team loses their service turn, and the other team then begins their first service turn.

For this and each subsequent service turn, each player on the serving team gets at least one chance to be the serving player. When the first server on a serving team loses their serve by that team losing a rally, their partner on that serving team then serves from their current side of the court. The second server continues serving until their team loses a rally to the opposing team. Thus, after the first service turn, for each subsequent service turn, the first serve is from the right (even) side of the court and both players on that serving team have the opportunity to serve and score points until their team loses two rallies. In other words, after the first service turn, when the first serving team receives the service turn back, each player on the serving team is able to serve and can score points until that serving team loses a rally.

When the serving team's score is even (0, 2, 4, 6, 8, or 10), the player who was the first server in the game for that team will be in the right (even) side of the court when serving or receiving; when the serving team's score is odd (1, 3, 5, 7, or 9). that player will be in the left (odd) side of the court when serving or receiving.

When the ball is served, the receiving team must let the ball bounce before returning the ball, and then the serving team must also let the ball bounce before returning, thus requiring two bounces before any player can hit the ball on the fly (i.e., before it bounces). After the ball has bounced once on each team's side of the court, both teams may either hit the ball before the ball bounces or hit the ball after the ball bounces. This two-bounce rule eliminates an advantage for the serving team.

If a point is scored on a rally, the serving player moves to the other side of their court (i.e., from the R side to the L side, or from the L side to the R side) and continues to serve to the diagonally opposite side of the court. In other words, the server player continues to serve until the serving team loses a rally, in which case if the other player on that team has not served, then that player gets to serve (except on the first service turn) and has a chance to continuing serving until that serving team loses a rally.

Players on the serving team thus continue to move from the right to left side or from the left to right side each time their team scores a point on a rally. Players on the serving team do not alternate sides unless they score a point. The receiving team never alternates sides.

When the second server of a serving team loses their serve turn, the service turn goes to the other team and the player on the right on that team serves first. That pattern continues throughout the game until the game is over.

Once the above-described service rules and scoring system is learned, it is relatively easy to keep track of the score for each pickleball game. It is thus easy to determine if a team wins or losses a pickleball game.

However, it is somewhat difficult to track and determine how each player actually performed in each pickleball game. It is also difficult to track every rally-ending shot by each player.

BRIEF SUMMARY

In various embodiments, the present disclosure relates to pickleball player statistics tracking devices and methods.

The player statistic tracking devices and methods of the present disclosure enable a scorer to easily record the results of each rally for a play of a pickleball game and the performance of each player such that the players and others can easily determine, track, see, and understand how each player performed during that play of the pickleball game in addition to the determination of which team won or loss the play of the pickleball game.

For purposes of the present disclosure, the scorer is a user of a player statistic tracking device of the present disclosure and is a person other than one of the players of the pickleball game. The scorer watches the play of the pickleball game and records the results of each rally and specifically each rally-ending shot. Since the scorer is not a player, the scorer does not slow down play of the pickleball game. In various situations one or more of the players could be a scorer, but such situations may slow down play of the pickleball game.

The present disclosure also contemplates that an automated system can function as a scorer or can assist a scorer in recording the results of each rally-ending shot during a play of a pickleball game. In various such embodiments, one or plurality of digital cameras and/or optical sensors are employed to determine the result of each rally-ending shot such as where the shot landed, which player made the winning rally-ending shot, the service fault rally-ending shot, or the unforced error rally-ending shot.

In various embodiments, the player statistic tracking devices and methods employ a physical device (such as including a substrate that can be written on) to record each individual player statistics during a play of a pickleball game.

In various embodiments, the player statistic tracking devices and methods employ an electronic device to record each individual player statistics with respect to each of the rally-ending shots during a play of a pickleball game and to thereafter selectively display various data regarding the performance of each player with respect to their rally-ending shots during the play of the pickleball game. It should thus be appreciated that the tracked individual player statistics are based on each rally-ending shot for the play of the pickleball game (rather than each hit of the ball by each of the players).

In various embodiments, the player statistic tracking devices and methods employ an electronic device in the form of an electronic tablet to record each individual player statistics based on rally-ending shots during a play of a pickleball game and to thereafter selectively display various data regarding the performance of each player during the play of the pickleball game based on the rally-ending shots.

In various embodiments, the player statistic tracking devices and methods employ an electronic device in the form of an electronic mobile telephone such as a smart phone to record each individual player statistics during a play of a pickleball game and to thereafter selectively display various data regarding the performance of each player during the play of the pickleball game and specifically with respect to each rally-ending shot.

Additional features and advantages are described in, and will be apparent from, the following Detailed Description and the figures.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

FIG. 1 is front view of an example pickleball player statistic tracking device instruction page for a pickleball player statistic tracking device in accordance with one embodiment of the present disclosure.

DETAILED DESCRIPTION

Figure 2:
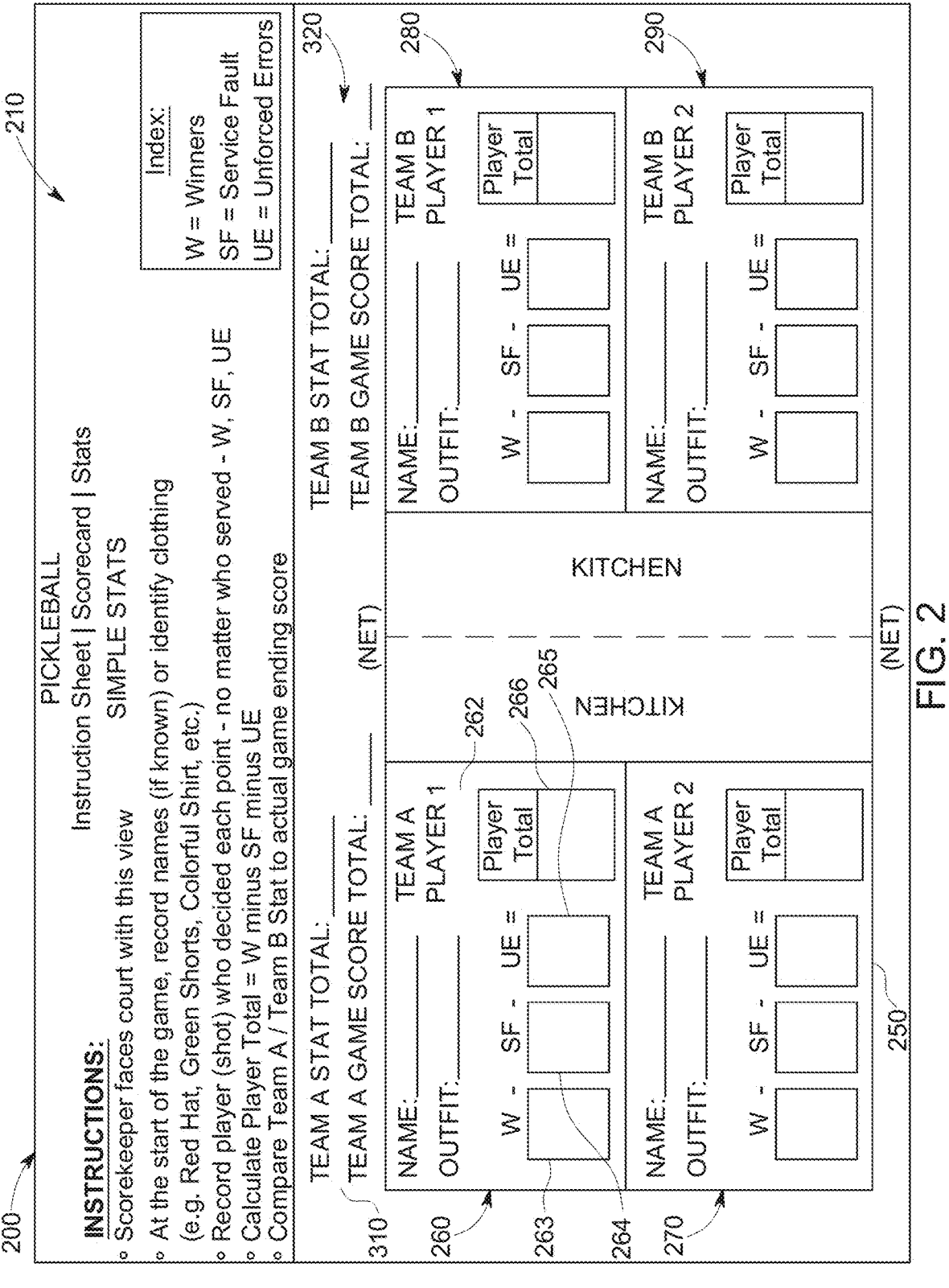
FIG. 2 is front view of an example pickleball player statistic tracking device in accordance with one embodiment of the present disclosure.

While the systems, devices, and methods described herein may be embodied in various forms, the drawings show, and the specification describes certain exemplary and non-limiting embodiments. Not all components shown in the drawings and described in the specification may be required, and certain implementations may include additional, different, or fewer components. Variations in the arrangement and type of the components; the shapes, sizes, and materials of the components; and the manners of connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as mounted, connected, etc., are not intended to be limited to direct mounting methods but should be interpreted broadly to include indirect and operably mounted, connected, and like mounting methods. This specification is intended to be taken as a whole and interpreted in accordance with the principles of the present disclosure and as understood by one of ordinary skill in the art.

In various embodiments, the present disclosure relates to pickleball player statistic tracking devices and methods. The player statistic tracking devices and methods of the present disclosure enable a scorer to easily and quickly record the results of each and every rally for a play of a pickleball game and the performance of each player. This enables the scorer, each of the players, and others to easily and quickly determine and track each player's performance and see understand how each player performed in each pickleball game. This is all in addition to the separate determination of which team actually won or loss the play of the pickleball game.

In various embodiments, the player statistic tracking devices and methods employ a physical device (such as including a substrate that can be written on) to record each individual player statistics during a play of a pickleball game. In various embodiments, the physical device can be in the form of one or more individual single sheets of paper or a pad of single sheets of paper. In various embodiments, a single sheet of paper is used for each play of a pickleball game.

In various embodiments, the player statistic tracking devices and methods employ an electronic device to record each individual player statistics during a play of a pickleball game. In various such embodiments, the electronic device can display a single graphical user interface for each play of a pickleball game.

In various embodiments, the pickleball player statistic tracking device includes: (1) one or more instruction sections; (2) a first player section; (3) a second player section; (4) a third player section; and (5) a fourth player section.

The one or more instruction sections provides a series of instructions that inform a scorer on how to use the pickleball player statistic tracking device.

FIG. 1 shows a separate example instruction section 100 for a scorer using a pickleball player statistic tracking device of one example embodiment of the present disclosure. This instruction section 100 can be on a cover or in another suitable page of a pad or an electronic page.

This instruction section 100 informs the scorer of how to use each pickleball player statistic tracking device. This instruction section 100 provides suitable abbreviations for certain types of results of rallies for each rally during a pickleball game. These examples include: (1) W for a winning shot; (2) SF for a service fault by a serving player of a serving team; and (3) UE for an unforced error by a player. Other suitable abbreviations can be employed in accordance with the present disclosure. The instruction section 100 can be arranged in other suitable manners in accordance with the present disclosure. The instruction section 100 can be positioned on a pickleball player statistic tracking device such as the example pickleball player statistic tracking devices shown in FIGS. 2 and 3 or shown in FIGS. 4 and 5 in accordance with the present disclosure.

Figure 3:
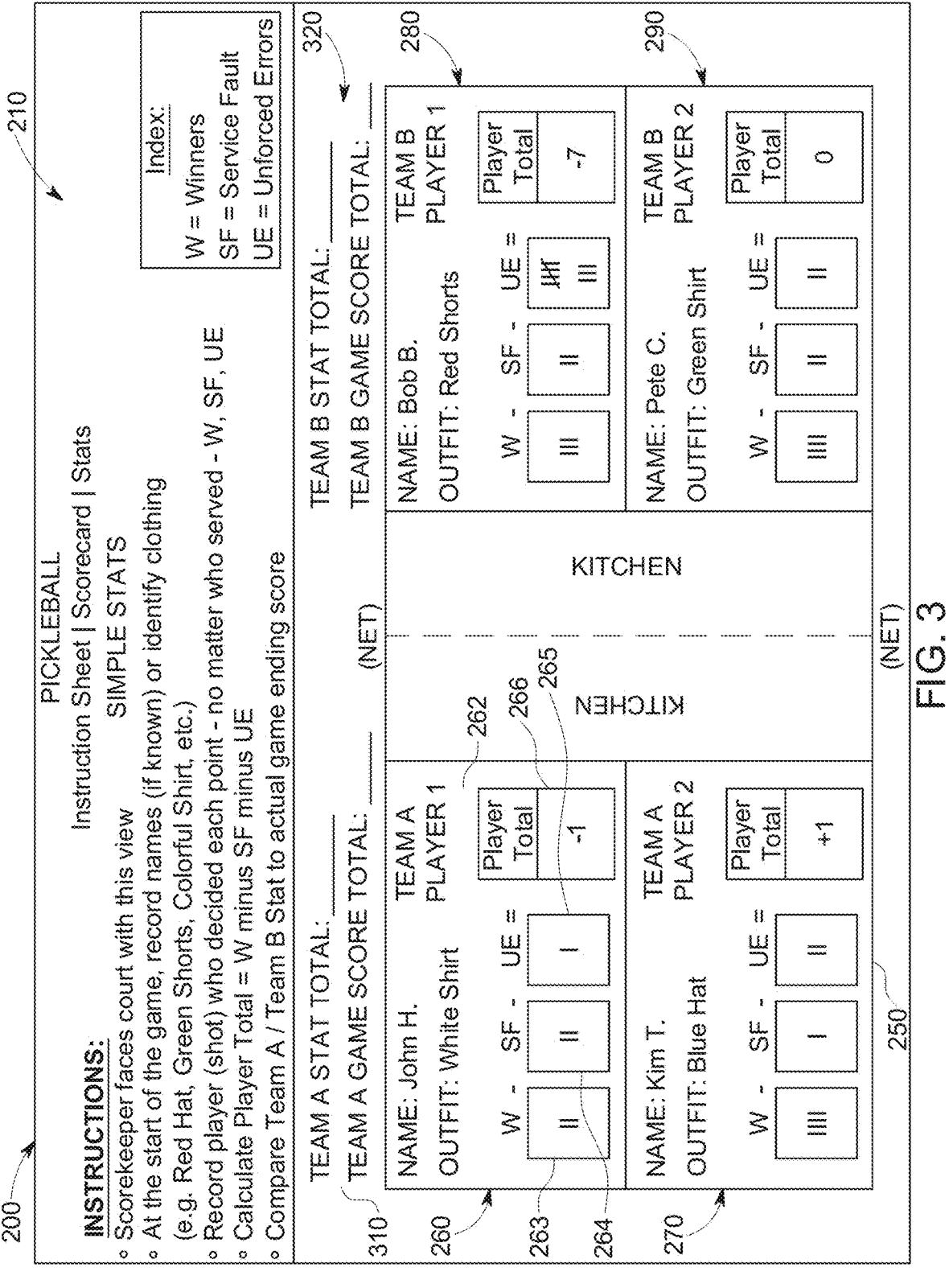
FIG. 3 is front view of the pickleball player statistic tracking device of FIG. 2 filled in for an example play of a pickleball game.

FIGS. 2 and 3 show an example pickleball player statistic tracking device 200 in accordance with one embodiment of the present disclosure.

The example pickleball player statistic tracking device 200 includes a substrate and an instruction section 210 on the substrate that informs the scorer of how to use pickleball player statistic tracking device 200. This instruction section 210 provides suitable abbreviations (not labeled) for each rally during a pickleball game. These examples include: (1) W for a winning shot; (2) SF for a service fault by a serving player; and (2) UE for an unforced error by a player. Other suitable abbreviations can be employed in accordance with the present disclosure. This instruction section 210 also informs the scorer on how to identify each player (even if the player names are unknown) and otherwise how to use the pickleball player statistic tracking device 200.

This example pickleball player statistic tracking device 200 includes a court layout 250 that shows the structure of the pickleball court including the net (not labeled), the two respective kitchen sections (not labeled) on each side of the net, the two respective rear sections (not labeled) on each side of the court, the side lines on each side of the net (not labeled), the kitchen lines (not labeled) on each side of the net, the center lines (not labeled) on each side of the net, and the baseline (not labeled) on each side of the net. This enables the scorer to better track each of the players' statistics.

This example pickleball player statistic tracking device 200 includes four individual separate player statistic sections 260, 270, 280, and 290, wherein the individual separate player statistic sections 260 and 270 are for the two players on a first one of the teams and individual separate player statistic sections 280 and 290 are for the two players on a second one of the teams. The four individual separate player statistic sections 260, 270, 280, and 290 are positioned on the court layout 250 and configured to correspond to each player's initial starting position for a play of the pickleball game. The first, second, third, and fourth individual separate player statistic sections 260, 270, 280, and 290 each include identical components for each player. For brevity, only one player statistic section is described in detail herein.

The first individual player statistic section 260 includes: (1) a player identification area 262; (2) a player winning shot area 263; (3) a player service fault area 264; (4) a player unforced error area 265; and (5) a player total area 266.

Each of the player identification area 262, the player winning shot area 263, the player service fault area 264, the player unforced error area 265, and the player total area 266 are fillable areas, or said differently are areas configured to be completed by the scorer. The scorer may choose, for example, dots, dashes, checkmarks, or other symbols for marking areas.

The player identification area 262 includes a name section (not labeled) that enables a scorer to record the player's name and/or an outfit section (not labeled) that enables a scorer to identify the player based on a piece of clothing or another characteristic of the player. This outfit section assists the scorer in tracking and recording each player's statistic during a play of a pickleball game as the player switches from the right (even) side to the left (odd) side of their team's side of the court during the play of the pickleball game as described above.

The player winning shot area 263 enables a scorer to separately record each of the individuals first player's winning shots during the play of the pickleball game.

The player service fault area 264 enables a scorer to separately record each of the individual first player's service faults during the play of the pickleball game.

The player unforced error area 265 enables a scorer to separately record each of the individual first player's unforced errors during the play of the pickleball game.

During a play of a pickleball game, for each rally, the scorer (which is not one of the players) can record the respective results of each rally during the play of the pickleball game using this example pickleball player statistic tracking device 200.

The player total area 266 enables a scorer to separately record a player total rally-ending statistic for the individual first player for the play of the pickleball game. This player total rally-ending statistic is based on the formula W−SF−UE=Player's total rally-ending statistic (i.e., W less SF less UE=total rally-ending statistics). In other words, winners (W) minus service faults (SF) minus unforced errors (UE)

equals a player's total rally-ending statistic. The player total rally-ending statistic can be based on another suitable formula (such as a weighted formula) in accordance with the present disclosure. The total player rally-ending statistic provides an indication of how the individual player performed during the play of the pickleball game and can be used to rate the player and for any other suitable purposes (such as for showing the player how the player performed relative to the other players). The individual player winning shot area 263, player service fault area 264, and player unforced error area 265 also enable the player to see how the player performed and potential specific areas for improvement.

The four individual separate player rally-ending statistic sections 260, 270, 280, and 290 are thus configured to provide this information for each player.

FIG. 3 shows an example pickleball player statistic tracking device 200 that is completed for a play of a pickleball game in accordance with one embodiment of the present disclosure. In this example, for each player, the respective player's name, player clothing, player winning shot area, player service fault area, and player unforced error area are completed by the scorer during the pickleball game and after the pickleball game ends, the scorer can complete the player total for each player.

Figure 4:
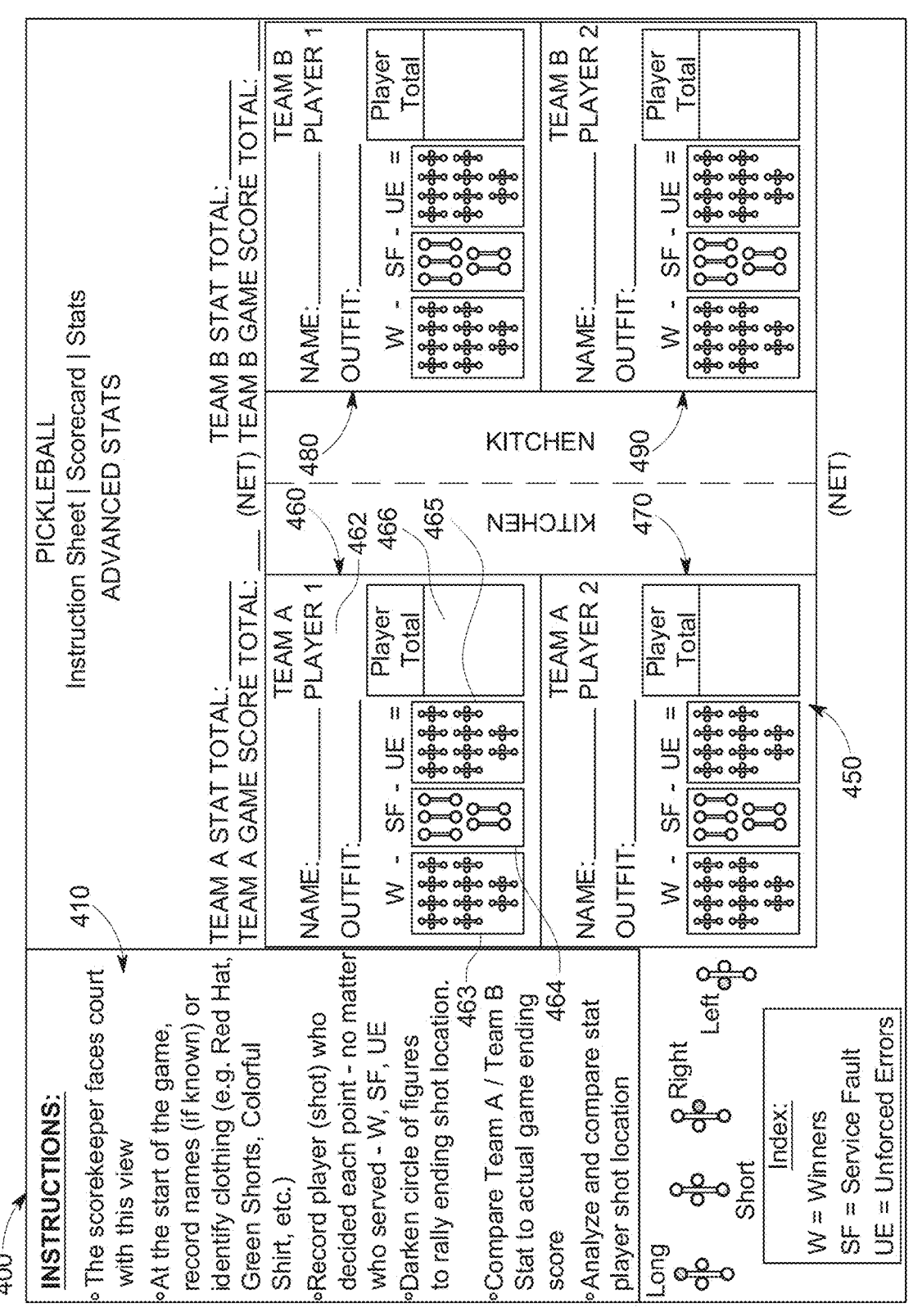
FIG. 4 is front view of an example pickleball player statistic tracking device in accordance with another embodiment of the present disclosure.
Figure 5:
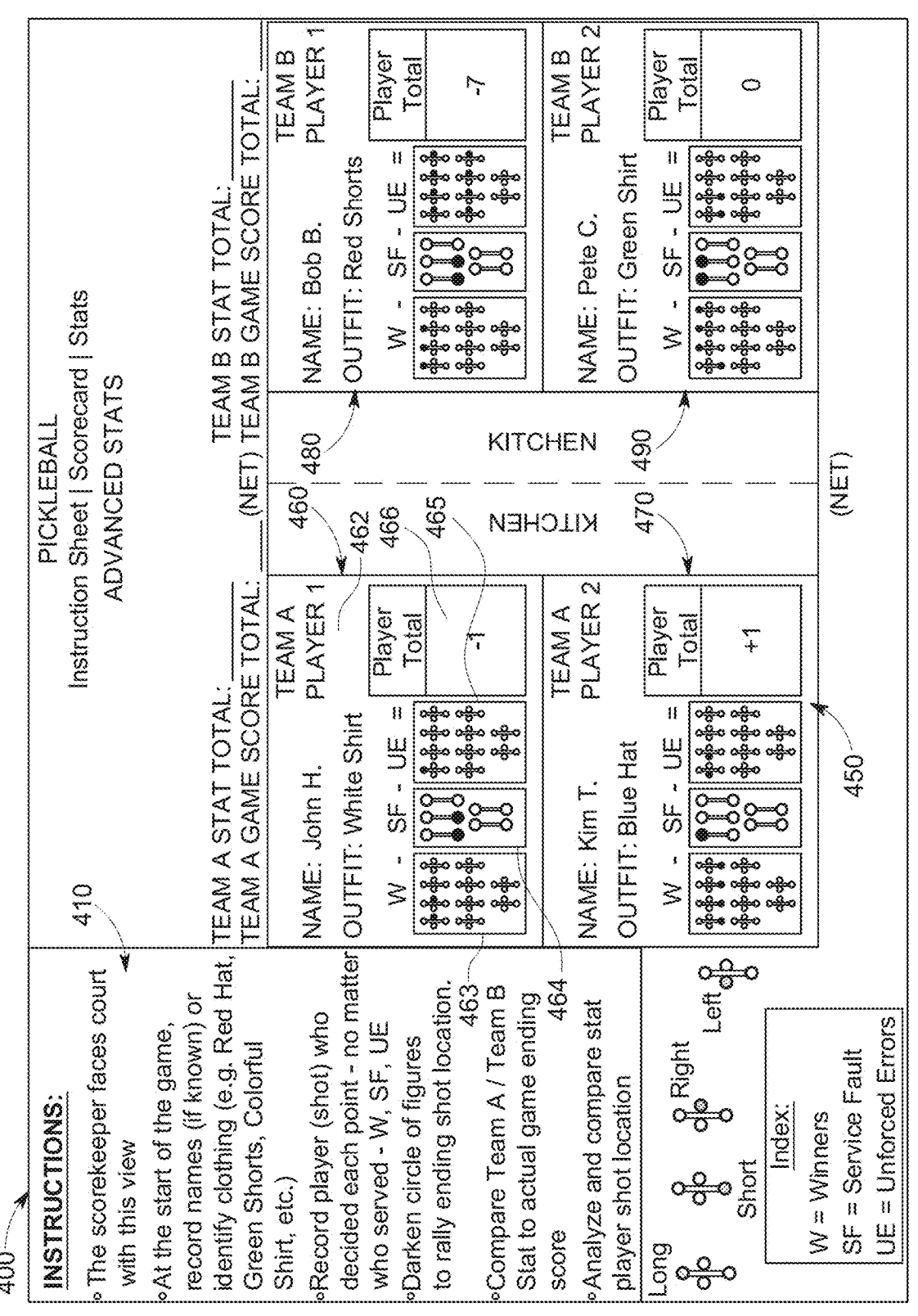
FIG. 5 is front view of the pickleball player statistic tracking device of FIG. 4 filled in for an example play of a pickleball game.

FIGS. 4 and 5 show another example pickleball player statistic tracking device 400 in accordance with one embodiment of the present disclosure.

The example pickleball player statistic tracking device 400 includes an instruction section 410 that informs the scorer of how to use pickleball player statistic tracking device 400. This instruction section 410 provides suitable abbreviations (not labeled) for certain types of results of rallies for each rally during a pickleball game. These examples include: (1) W for a winning shot; (2) SF for a service fault by a serving player; and (3) UE for an unforced error by a player. Other suitable abbreviations can be employed in accordance with the present disclosure. This instruction section 410 also informs the scorer on how to identify each player and otherwise how to use the pickleball player statistic tracking device 400.

This example pickleball player statistic tracking device 400 includes a court layout 450 that shows the structure of the pickleball court including the net (not labeled), the two respective kitchens (not labeled) on each side of the net, the two respective rear sections (not labeled) on each side of the court, the side lines on each side of the net (not labeled), the kitchen lines (not labeled) on each side of the net, the center lines (not labeled) on each side of the net, and the baseline (not labeled) on each side of the net. This enables the scorer to better track each players' statistics.

This example pickleball player statistic tracking device 400 includes four individual separate player statistic sections 460, 470, 480, and 490, wherein the individual separate player statistic sections 460 and 470 are for the two players on a first one of the teams and individual separate player statistic sections 480 and 490 are for the two players on a second one of the teams. The four individual separate player statistic sections 460, 470, 480, and 490 are positioned on the court layout 450 and configured to correspond to each player's initial starting position for a play of the pickleball game. The first, second, third, and fourth individual separate player statistic sections 460, 470, 480, and 490 each include identical components for each player. For brevity, only one player statistic section is described in detail herein.

The first individual player statistic section 460 includes: (1) a player identification area 462; (2) a player winning shot area 463; (3) a player service fault area 464; (4) a player unforced error area 465; and (5) a player total area 466.

Each of the player identification area 462, the player winning shot area 463, the player service fault area 464, the player unforced error area 465, and the player total area 466 are fillable areas or said different areas configured to be completed by the scorer.

The player identification area 462 includes a name section (not labeled) that enables a scorer to record the player's name and an outfit section (not labeled) that enables a scorer to identify the player based on a piece of clothing or another characteristic of the player. This outfit section assists the scorer in tracking and recording each player's statistic during a play of a pickleball game as the player switches from the right (even) side to the left (odd) side of their team's side of the court during the play of the pickleball game as described above.

The player winning shot area 463 enables a scorer to separately record each of the individuals first player's winning shots during the play of the pickleball game. This player winning shot area 463 also enables the scorer to graphically record the location of the winning shot.

The player service fault area 464 enables a scorer to separately record each of the individual first player's service faults during the play of the pickleball game. This player service fault area 464 also enables the scorer to graphically record the location of the player's service faults.

The player unforced error area 465 enables a scorer to separately record each of the individual first player's unforced errors during the play of the pickleball game. This player service fault area 464 also enables the scorer to graphically record the location of the player's unforced errors.

These specific graphical displays for recording this more specific information is shown in one example manner but can be alternatively configured in accordance with the present disclosure.

During a play of a pickleball game, for each rally, the scorer (which is not one of the players) can record the respective results of each rally during the play of the pickleball game using this example pickleball player statistic tracking device 400.

The player total area 466 enables a scorer to separately record a player total rally-ending statistics for the individual first player for the play of the pickleball game. As indicated above, this player total rally-ending statistics is based on the formula W−SF−UE. The player total rally-ending statistics can be based on another suitable formula (such as a weighted formula) in accordance with the present disclosure. The total player rally-ending statistics provides an indication of how the individual player performed during the play of the pickleball game and can be used to rate the player and for any other suitable purposes (such as for showing/instructing the player how the player performed relative to the other players). Each of the respective individual player winning shot areas, player service fault areas, and player unforced error areas also enable the player to see how the player performed and potential specific areas for improvement. This information can also provide strategies as to where an opposing team is vulnerable.

The four individual separate player statistic sections 460, 470, 480, and 490 are thus configured to provide this information for each player.

FIG. 5 shows an example pickleball player statistic tracking device 200 that is completed for a play of a pickleball game in accordance with one embodiment of the present disclosure. In this example, for each player, the respective player's name, player clothing, player winning shot area, player service fault area, and player unforced error area are completed (as partially shown by the filled in circles) by the scorer during the pickleball game and after the pickleball game ends, the scorer can complete the player total for each player, and the team total for each team.

Figure 6:
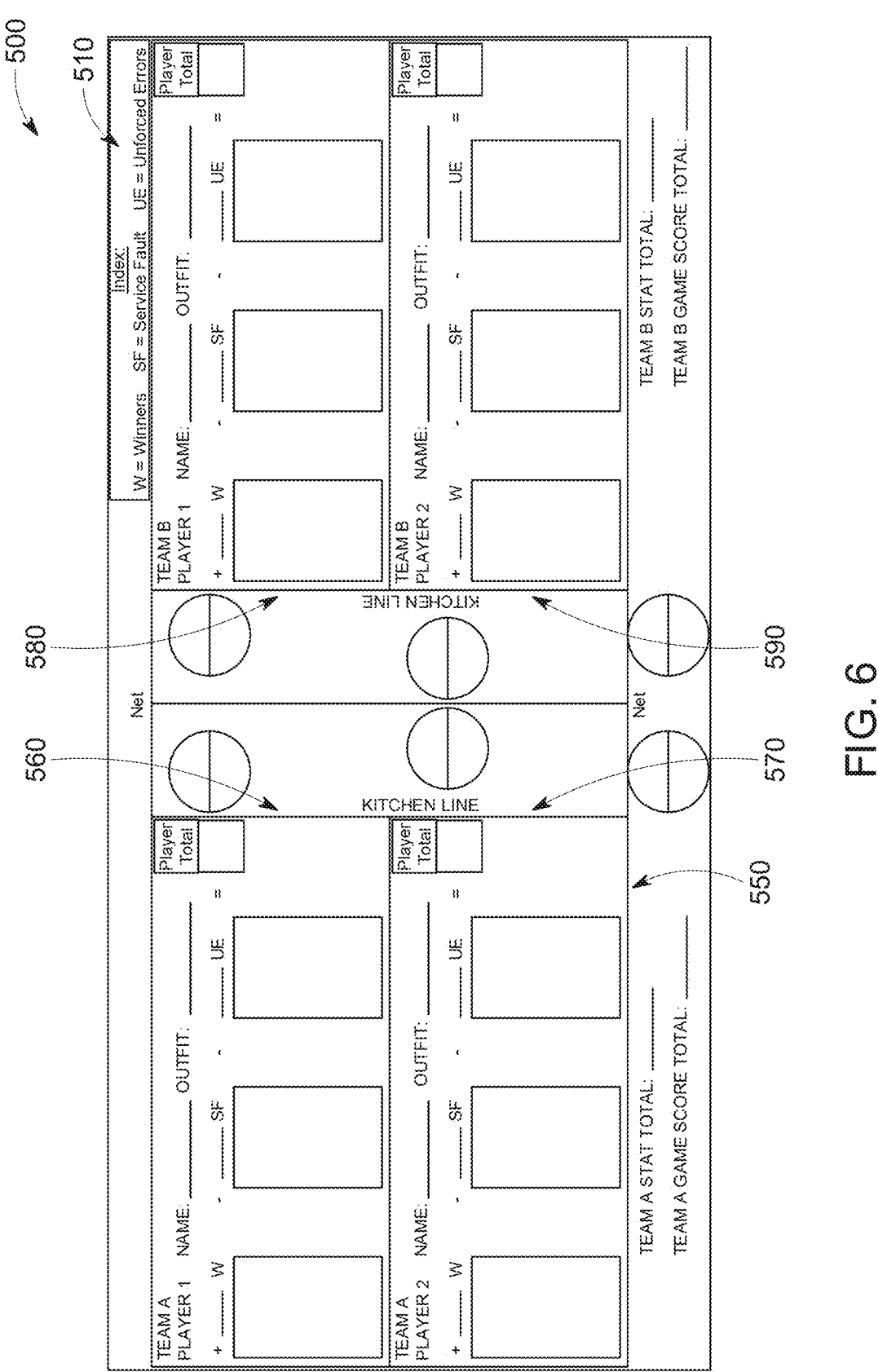
FIG. 6 is front view of an example pickleball player statistic tracking device in accordance with another embodiment of the present disclosure.

FIG. 6 shows another example pickleball player statistic tracking device 500 in accordance with one embodiment of the present disclosure.

This example pickleball player statistic tracking device 500 includes an instruction section 510 that informs the scorer of how to use the pickleball player statistic tracking device 500. This instruction section 510 provides suitable abbreviations (not labeled) for certain types of results for each rally during a pickleball game. These examples include: (1) W for a winning shot; (2) SF for a service fault by a serving player; and (3) UE for an unforced error by a player. Other suitable abbreviations can be employed in accordance with the present disclosure. This example pickleball player statistic tracking device 500 does not include but can otherwise inform the scorer on how to identify each player and otherwise how to use the pickleball player statistic tracking device 500.

This example pickleball player statistic tracking device 500 includes a court layout 550 that shows the structure of the pickleball court including the net (not labeled), the two respective kitchens (not labeled) on each side of the net, the two respective rear sections (not labeled) on each side of the court, the side lines on each side of the net (not labeled), the kitchen lines (not labeled) on each side of the net, the center lines (not labeled) on each side of the net, and the baseline (not labeled) on each side of the net. This enables the scorer to better track each players' statistics.

This example pickleball player statistic tracking device 500 includes four individual separate player statistic sections 560, 570, 580, and 590, wherein the individual separate player statistic sections 560 and 570 are for the two players on a first one of the teams and individual separate player statistic sections 580 and 590 are for the two players on a second one of the teams. The four individual separate player statistic sections 560, 570, 580, and 590 are positioned on the court layout 550 and configured to correspond to each player's initial starting position for a play of the pickleball game. The first, second, third, and fourth individual separate player statistic sections 560, 570, 580, and 590 each include identical components for each player.

Each of the individual separate player statistic sections 560, 570, 580, and 590 respectively includes: (1) a player identification area (not labeled); (2) a player winning shot area (not labeled); (3) a player service fault area (not labeled); (4) a player unforced error area (not labeled) and (5) a player total area (not labeled). Each of the respective player identification areas, the player winning shot area, the player service fault areas, the player unforced error areas, and the player total areas are fillable areas or said different areas configured to be completed by the scorer.

Each of the player identification areas (not labeled) respectively includes a name section (not labeled) that enables a scorer to record the player's name and an outfit section (not labeled) that enables a scorer to identify the player based on a piece of clothing or another characteristic of the player. This outfit section assists the scorer in tracking and recording each player's statistic during a play of a pickleball game as the player switches from the right (even) side to the left (odd) side of their team's side of the court during the play of the pickleball game as described above.

Each of the respective player winning shot areas enables a scorer to separately record each of the individual player's winning shots during the play of the pickleball game.

Each of the respective player service fault areas enables a scorer to separately record each of the individual player's service faults during the play of the pickleball game.

Each of the respective player unforced error areas enables a scorer to separately record each of the individual player's unforced errors during the play of the pickleball game.

During a play of a pickleball game, for each rally, the scorer (which is not one of the players) can record the respective results of each rally during the play of the pickleball game using this example pickleball player statistic tracking device 500.

Each of the respective player total areas enables a scorer to separately record a player total rally-ending statistics for the individual first player for the play of the pickleball game. As indicated above, this player total rally-ending statistics is based on the formula W−SF−UE. The player total rally-ending statistics can be based on another suitable formula (such as a weighted formula) in accordance with the present disclosure. The player total rally-ending statistics provides an indication of how the individual player performed during the play of the pickleball game and can be used to rate the player and for any other suitable purposes (such as for showing/instructing the player how the player performed relative to the other players). Each of the individual player winning shot areas, player service fault areas, and player unforced error areas also enable the player to see how the player performed and potential specific areas for improvement. This information can also provide strategies as to where an opposing team is vulnerable.

The four individual separate player statistic sections 560, 570, 580, and 590 are thus configured to provide this information for each player.

Figure 7:
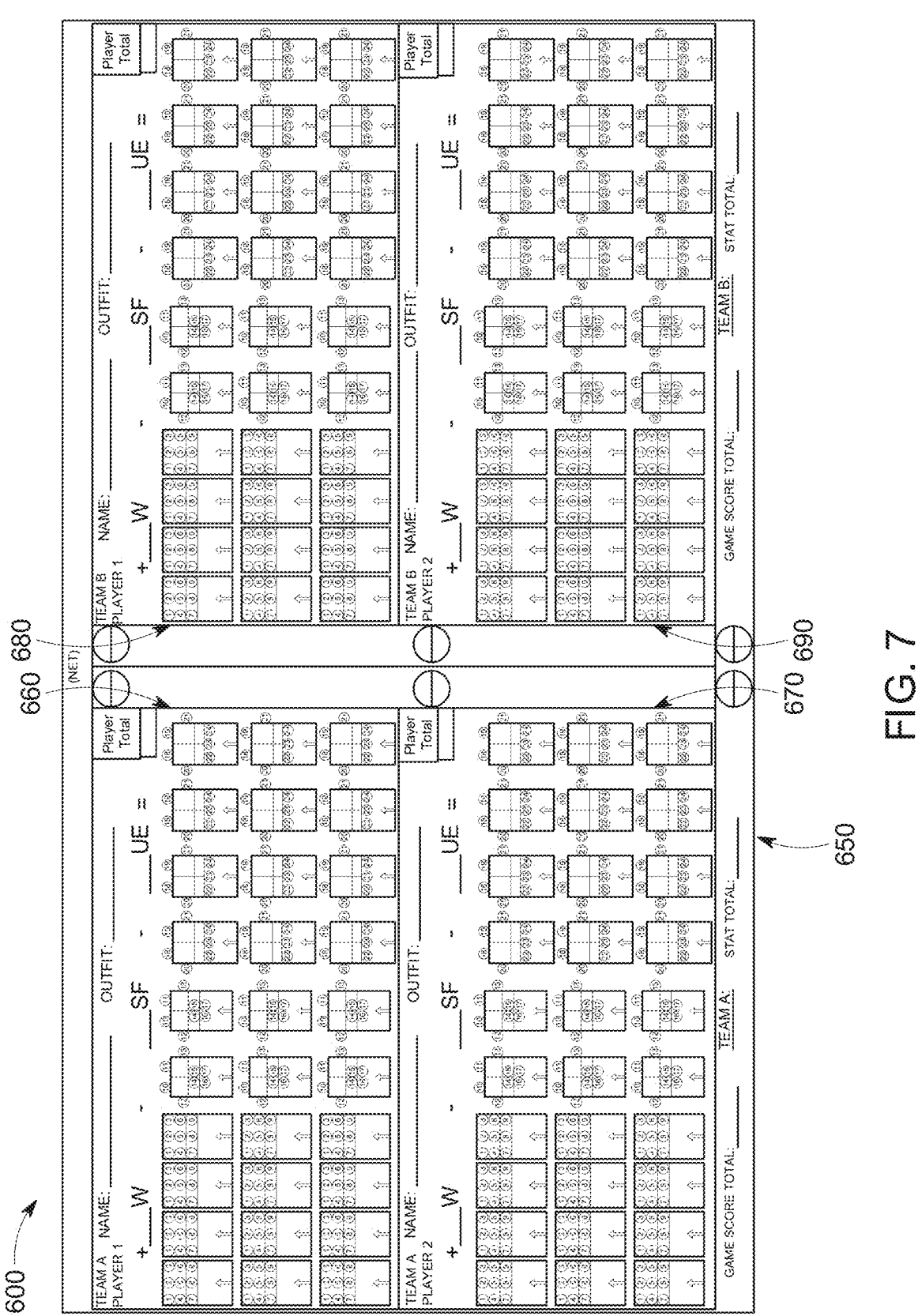
FIG. 7 is front view of an example pickleball player statistic tracking device in accordance with another embodiment of the present disclosure.
Figure 7A:
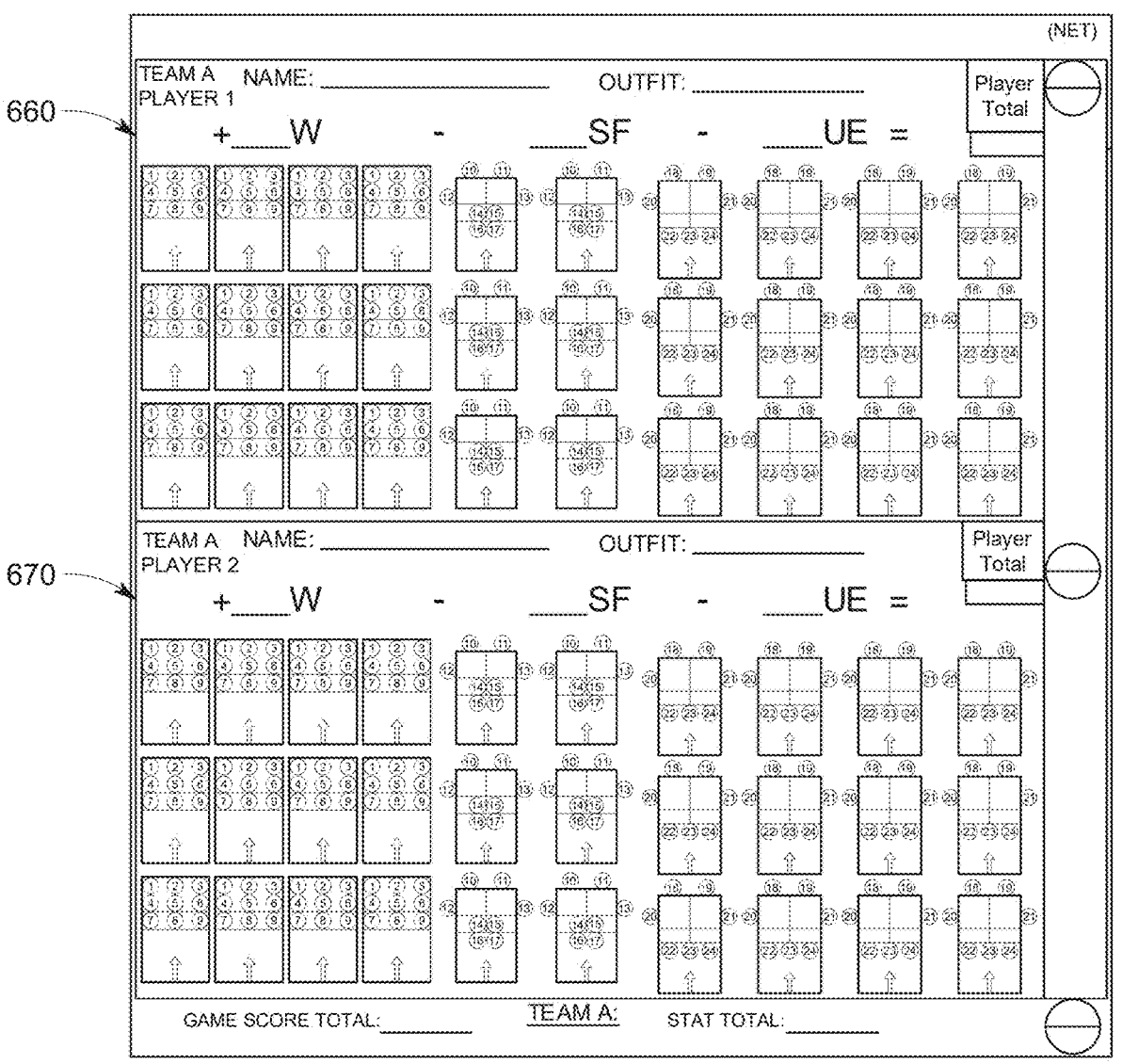
FIG. 7A is an enlarged front view of a first half of the example pickleball player statistic tracking device of FIG. 7.
Figure 7B:
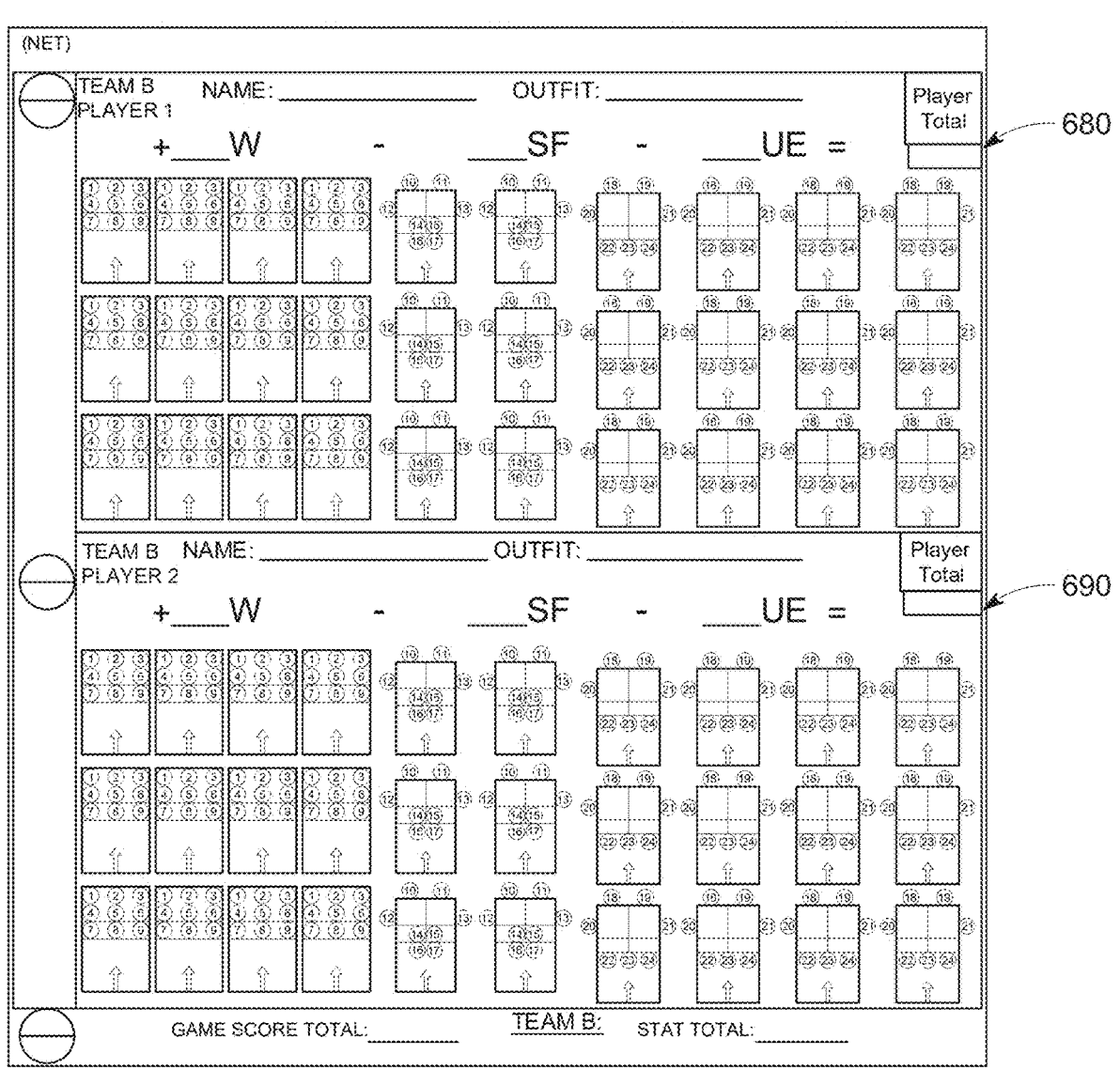
FIG. 7B is an enlarged front view of a second half of the example pickleball player statistic tracking device of FIG. 7.
Figure 8:
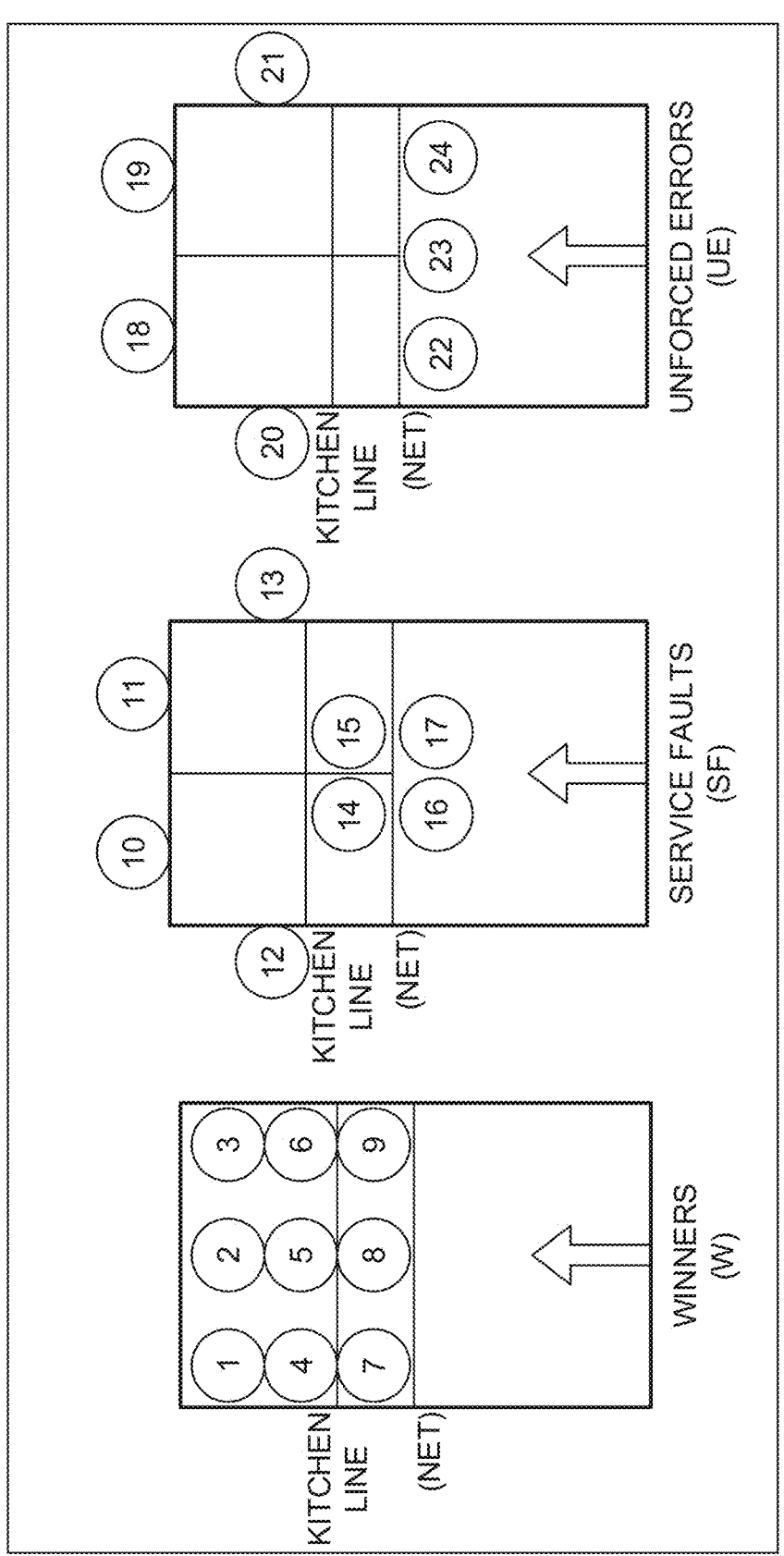
FIG. 8 is front view of an example instruction device for the pickleball player statistic tracking device of FIG. 7.

FIGS. 7, 7A, and 7B show another example pickleball player statistic tracking device 600 in accordance with one embodiment of the present disclosure. FIG. 8 shows an example instruction device for the example pickleball player statistic tracking device 600 of FIGS. 7, 7A, and 7B in accordance with one embodiment of the present disclosure.

This example pickleball player statistic tracking device 600 is associated with a separate instruction device 700 that informs the scorer of how to use pickleball player statistic tracking device 600. This instruction device 700 provides suitable abbreviations (not labeled) for certain types of results for each rally during a pickleball game. These examples include: (1) W for a winning shot; (2) SF for a service fault by a serving player; and (3) UE for an unforced error by a player. Other suitable abbreviations can be employed in accordance with the present disclosure. This instruction device 700 also informs the scorer on how to identify each player and otherwise how to use the pickleball player statistic tracking device 600 and can include any of the additional instructions as further explained below.

This example pickleball player statistic tracking device 600 includes a court layout 650 that shows the structure of the pickleball court including the net (not labeled), the two respective kitchens (not labeled) on each side of the net, the two respective rear sections (not labeled) on each side of the court, the side lines on each side of the net (not labeled), the kitchen lines (not labeled) on each side of the net, the center lines (not labeled) on each side of the net, and the baseline (not labeled) on each side of the net. This enables the scorer to better track each players' statistics.

This example pickleball player statistic tracking device 600 includes four individual separate player statistic sections 660, 670, 680, and 690, wherein the individual separate player statistic sections 660 and 670 are for the two players on a first one of the teams and individual separate player statistic sections 680 and 690 are for the two players on a second one of the teams. The four individual separate player statistic sections 660, 670, 680, and 690 are positioned on the court layout 650 and configured to correspond to each player's initial starting position for a play of the pickleball game. The first, second, third, and fourth individual separate player statistic sections 660, 670, 680, and 690 each include identical components for each player.

Each of the respective separate individual player statistic sections includes: (1) a player identification area (not labeled); (2) a player winning shot area (not labeled); (3) a player service fault area (not labeled); (4) a player unforced error area (not labeled); and (5) a player total area (not labeled). Each of the respective player identification areas, the player winning shot areas, the player service fault areas, the player unforced error areas, and the player total areas are fillable areas or said different areas configured to be completed by the scorer.

Each of the respective player identification areas includes a name section (not labeled) that enables a scorer to record the player's name and an outfit section (not labeled) that enables a scorer to identify the player based on a piece of clothing or another characteristic of the player. This outfit section assists the scorer in tracking and recording each player's statistic during a play of a pickleball game as the player switches from the right (even) side to the left (odd) side of their team's side of the court during the play of the pickleball game as described above.

Each of the respective player winning shot areas enables a scorer to separately record each of the individual player's winning shots during the play of the pickleball game. Each of the respective player winning shot areas also enables the scorer to graphically record the location of the winning shot.

Each of the respective player service fault areas enables a scorer to separately record each of the individual player's service faults during the play of the pickleball game. Each of the respective player service fault areas also enables the scorer to graphically record the location of the player's service faults.

Each of the respective player unforced error areas enables a scorer to separately record the location of each of the individual player's unforced errors/shots during the play of the pickleball game.

Each of the respective player service fault areas also enables the scorer to graphically record the location of the player's unforced errors.

These specific graphical displays for recording this more specific information is shown in one example manner but can be alternatively configured in accordance with the present disclosure.

During a play of a pickleball game, for each rally the scorer (which is not one of the players) can record the respective results of each rally during the play of the pickleball game using this example pickleball player statistic tracking device 600.

Each of the respective player total areas enables a scorer to separately record a player total rally-ending statistic for the individual first player for the play of the pickleball game. As indicated above, this player total rally-ending statistic is based on the formula W−SF−UE (quantity of Winners minus quantity of Service Faults minus quantity of Unforced Errors). The player total rally-ending statistic can be based on another suitable formula (such as a weighted formula) in accordance with the present disclosure. The player total rally-ending statistic provides an indication of how the individual player performed during the play of the pickleball game and can be used to rate the player and for any other suitable purposes (such as for showing/instructing the player how the player performed relative to the other players). Each of the respective individual player winning shot areas, player service fault areas, and player unforced error areas also enable the player to see how the player performed and potential specific areas for improvement. This information can also provide strategies as to where an opposing team is vulnerable.

The four individual separate player statistic sections 660, 670, 680, and 690 are thus configured to provide this information for each player regarding their rally-ending shot(s) for the play of the pickleball game. The four individual separate player statistic sections 660, 670, 680, and 690 are also respectively configured to provide a way to track the rally-ending shots for each player.

One example of how a scorer will employ this example pickleball player statistic tracking device 600 is now further explained. Generally, this example pickleball player statistic tracking device 600 enables the scorer to characterize every rally-ending final shot for every rally. This example pickleball player statistic tracking device 600 is configured to enable the scorer to record roughly 42 points for the players and is based on an 11-point winning game score.

Generally, FIG. 8 shows an instruction sheet that enables the scorer to become familiar with the configuration of the end-of-rally shot tracking. The instructions sheet has 24 circles that respectively indicate the possible locations of the last shot of the rally (e.g., the Winners (W) or the losers (SFs and UEs)). Only one of these circles is assigned by the scorer to each end-of-rally. This instruction sheet thus informs the scorer on how to use the pickleball player statistic tracking device 600.

More specifically, for each rally, the scorer will mentally determine the shot type and shot location that ended the rally as well as the player who made that shot, and then can select one of the shot indicators (e.g., that are 24 circles in this example embodiment but can be other suitable configurations such as but not limited to squares). In a substrate (such as paper) embodiment of the present disclosure, the scorer can fill in that shot indicator to be recorded. In an electronic (such as computer tablet or phone) embodiment of the present disclosure, the scorer can touch that shot indicator, and the computer will cause the shot to be recorded.

In this example embodiment, a winning shot may land in any of 9 different shot locations indicated by shot indicators including: (1) shot indicator circles 1, 2, and 3 for recording locations of winning shots that are deep in the opponent's court and which the opponents fail to return; (2) shot indicator circles 4, 5, and 6 for recording locations of winning shots that are unreturnable by opponents (such as at the opponent's feet and/or because the opponents are in a poor position in the middle of the court); and (3) shot indicator circles 7, 8, and 9 for recording winning drop shots (that are just over the net into the opponents kitchen that opponents are unable to return).

In this example embodiment, the different shot locations indicated by shot indicators further include: (4) shot indicator circles 10, 11, 12, 13, 14, 15, 16, or 17 for service faults out of the court that are either long left, long right, out short left, or out short right; (5) shot indicator circles 14 or 15 for shots over the net, but that fall into the opponent's kitchen or touch the kitchen line; and (6) circles 16 or 17 for service faults into the net.

In this example embodiment, the different shot locations indicated by shot indicators further include: (7) shot indicator circles 18, 19, 20, or 21 for unforced errors in the locations where the balls hit out of the court such as out long left, out long right, out short left, and out short right; and (8) shot indicator circles 22, 23, or 24 for unforced errors in locations where the balls that are hit into the net, left, middle, or right, or that do not make it across the hitting player's side of the court (such as a miss).

In this example embodiment, marking (such as checking, darkening, or otherwise selecting) a shot indicator circle indicates a rally-ending shot for or associated with the respective player. Since each player has a separate own quadrant, the scorer, on a rally-ending shot, can simply mark the appropriate circle as the rally-ending-point developed.

In this example embodiment, this example pickleball player statistic tracking device 600 includes, for each player, 12 boxes to record up to 12 Winners, 6 boxes to record up to 6 Service Faults, and 12 boxes to record up to 12 Unforced Errors. These quantities can vary in accordance with the present disclosure.

Different Colors

In various embodiments, for each player, two or more of the: (1) player identification area; (2) the player winning shot area; (3) the player service fault area; (4) the player unforced error area; and (5) the player total area, can be completed by the scorer in different colors to assist in differentiating the indications of the results of each shot type and/or rally.

Physical Tracking Devices

As mentioned above, the above-described embodiments of the present disclosure may be implemented in accordance with or in conjunction with one or more of a variety of different types of physical tracking devices such as individual sheet of paper that can be written on, as individual sheet of paper of a pad of sheets that can each be written on, a board that can be erased, or another suitable physical device.

Electronic Tracking Devices

The above-described embodiments of the present disclosure may be implemented in accordance with or in conjunction with one or more of a variety of different types of electronic tracking devices ("ETD(s)").

In various embodiments, the electronic tracking device of the present disclosure can include: (1) a handheld electronic tracking device such as a mobile cellular phone; (2) a handheld electronic tracking device such as a computer tablet; or (3) a desktop or laptop computer.

In various embodiments, the ETD is configured to communicate with one or more server through a data network or remote communication link. In certain such embodiments, the ETD is configured to communicate with another ETD through the same data network or remote communication link or through a different data network or remote communication link. For example, a plurality of ETDs can be configured to communicate with one or more servers through a data network. In various embodiments, the present disclosure also provides one or more servers that are configured to communicate with a plurality of ETD that implement the present disclosure as described herein. The one or more servers of the present disclosure are configured to enable players and/or scorer to set up player and/or scorer accounts, to maintain player and/or scorer accounts, to store player statistical data provided by one or more of the ETDs, and to enable players and/or scorers to access, download, and view such player statistical data regarding player rally-ending shots for each of a plurality of plays of the pickleball game the that player participated in. The system can provide the player rally-ending shot data by category such as but not limited to winning rally-ending shots, service faults that are rally-ending shot, and unforced errors that are rally-ending shots, and related scoring history data.

In various embodiments, the ETD includes at least one processor, at least one memory device or data storage device, at least one display device, and at least one input device.

In various embodiments, the ETD is configured to transmit and receive data or signals representing events, messages, commands, or any other suitable information.

In various embodiments, the at least one processor of the ETD is any suitable processing device or set of processing devices, such as a microprocessor, a microcontroller-based platform, a suitable integrated circuit, or one or more application-specific integrated circuits (ASICs).

In various embodiments, the at least one memory device of the ETD can include: (1) volatile memory (e.g., RAM, which can include non-volatile RAM, magnetic RAM, ferroelectric RAM, and any other suitable forms); (2) non-volatile memory (e.g., disk memory, FLASH memory, EPROMs, EEPROMs, memristor-based non-volatile solid-state memory, etc.); (3) unalterable memory (e.g., EPROMs); (4) read-only memory; and/or (5) a secondary memory storage device, such as a non-volatile memory device, configured to store tracking software related information. Any other suitable magnetic, optical, and/or semiconductor memory may operate in conjunction with the ETD of the present disclosure.

In various embodiments, the at least one memory device of the ETD is configured to store, for example, software configured to enable the ETD to function for the purposes described herein.

It should be appreciated that the ETD described herein can be in any of a number of different patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation. Furthermore, aspects of the present disclosure may take the form of a computer program product embodied in one or more computer readable media having computer readable program code embodied thereon. Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the ETD and partly on a remote computer or entirely on the remote computer or server. In the latter scenario, the remote computer may be communicatively connected to the user's computer through any type of network, including a local area network (LAN) or a wide area network (WAN), or the connection may be made to an external computer.

The computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified herein. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified herein.

In various embodiments, the at least one memory device is configured to store program code and instructions executable by the at least one processor of the ETD to control the ETD. The at least one memory device of the ETD also stores other operating data, such as image data, event data, input data, or information, and/or applicable scoring rules that relate to the play of one or more pickleball games. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a tracking establishment operator) and/or a player uses such a removable memory device in an ETD to implement at least part of the present disclosure. In other embodiments, part or all of the program code and/or the operating data is downloaded to the at least one memory device of the ETD through any suitable data network described above (such as an Internet or intranet).

In various embodiments, the display device(s) of the ETD can include, for example: a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touchscreen with an associated touch-screen controller. The display devices may be of any suitable sizes, shapes, and configurations. The display devices of the ETD are configured to display one or more and/or images, symbols, and indicia such as described above. Thus, in various embodiments, the input device(s) of the ETD includes, without limitation: a touch screen and/or a key board.

In various embodiments, the ETD can be configured to communicate with a social network server that hosts or partially hosts a social networking website via a data network (such as the Internet) to integrate a player's statistics with the player's social networking account. This enables the electronic tracking device to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the electronic tracking device to receive certain information from the social network server, such as the player's likes or dislikes or the player's list of connections.

In certain embodiments, the ETD enables the player to link the player's player account stored on a system server to the player's social networking account(s). This enables the tracking device to, once it identifies the player and initiates a tracking session (such as via the player logging in to a website (or an application) on the player's personal tracking device), link that tracking session to the player's social networking account(s). In other embodiments, the tracking device enables the player to link the player's social networking account(s) to individual tracking sessions when desired by providing the required login information.

In various embodiments, each of one or more of the system servers maintains the player and/or scorer accounts includes at least one processor, at least one memory device or data storage device, at least one display device, and at least one input device.

In various embodiments, the system server that maintains the player and/or scorer accounts is configured to transmit and receive data or signals representing events, messages, commands, or any other suitable information.

In various embodiments, the at least one processor of the system server that maintains the player and/or scorer accounts is any suitable processing device or set of processing devices, such as a microprocessor, a microcontroller-based platform, a suitable integrated circuit, or one or more application-specific integrated circuits (ASICs).

In various embodiments, the at least one memory device of the system server that maintains the player and/or scorer accounts can include: (1) volatile memory (e.g., RAM, which can include non-volatile RAM, magnetic RAM, ferroelectric RAM, and any other suitable forms); (2) non-volatile memory (e.g., disk memory, FLASH memory, EPROMS, EEPROMs, memristor-based non-volatile solid-state memory, etc.); (3) unalterable memory (e.g., EPROMs); (4) read-only memory; and/or (5) a secondary memory storage device, such as a non-volatile memory device, configured to store tracking software related information. Any other suitable magnetic, optical, and/or semiconductor memory may operate in conjunction with the system server of the present disclosure.

In various embodiments, the at least one memory device of the system server that maintains the player and/or scorer accounts is configured to store, for example, software configured to enable the system server functions for the purposes described herein.

It should be appreciated that the system server described herein can be in any of a number of different patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation. Furthermore, aspects of the present disclosure may take the form of a computer program product embodied in one or more computer readable media having computer readable program code embodied thereon. Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the system server and partly on a remote computer or entirely on the remote computer or server. In the latter scenario, the remote computer may be communicatively connected to the user's computer through any type of network, including a local area network (LAN) or a wide area network (WAN), or the connection may be made to an external computer.

The computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified herein. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified herein.

In various embodiments, the at least one memory device is configured to store program code and instructions executable by the at least one processor of the system server to control the system server. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a tracking establishment operator) and/or a player uses such a removable memory device in a system server to implement at least part of the present disclosure. In other embodiments, part or all of the program code and/or the operating data is downloaded to the at least one memory device of the system through any suitable data network described above (such as an Internet or intranet).

In various embodiments, the system server can be configured to communicate with a social network server that hosts or partially hosts a social networking website via a data network (such as the Internet) to integrate a player's statistics with the player's social networking account. This enables the system server to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the system server to receive certain information from the social network server, such as the player's likes or dislikes or the player's list of connections.

In certain embodiments, the system server enables the player to link the player's player account stored on a system server to the player's social networking account(s). This enables the system server to, once it identifies the player and initiates a tracking session (such as via the player logging in to a website (or an application) on the player's personal tracking device), link that tracking session to the player's social networking account(s). In other embodiments, the system server enables the player to link the player's social networking account(s) to individual tracking sessions when desired by providing the required login information.

In certain embodiments, the ETD and/or the system server enables a scorer or the player to save the summary results of each play of the pickleball game in a suitable format (such as a pdf) and can cause that summary to be provided to the player in one or more formats (such as emailed or texted to the player). In various embodiments, the summary results can include any of player statistical data described herein such as summary of the type of rally-ending shots and or heat maps of such information. Such summaries can also be for multiple plays. In various embodiment the ETD and/or the system server can use suitable artificial intelligence ("AI") systems or create and provide such summaries.

Additional Example Electronic Tracking Device

Various additional embodiments of the present disclosure can be implemented in accordance with or in conjunction with one or more of a variety of different types of ETDs. As mentioned above, in various such embodiments, the ETDs can include: (1) a handheld electronic tracking device such as an electronic mobile cellular phone that has an application downloaded thereon and is configured to display various graphical user interfaces to a player or scorer; (2) a handheld electronic tracking device such as an electronic computer tablet that has an application downloaded thereon and is configured to display various graphical user interfaces to a player or scorer; or (3) a desktop or laptop computer that has an application downloaded thereon and is configured to display various graphical user interfaces to a player or scorer.

FIGS. 9 to 30 are front views an example pickleball player statistic tracking device in the form of an ETD and particularly an electronic mobile cellular phone, and showing various example graphical user interfaces displayed by the ETD at various points during the operation of the ETD and specifically before, during, and after an example play of a pickleball game by four players.

For brevity, the graphical user interfaces displayed by the ETD are sometimes referred to herein as an "interface" or a specific type of interface. Each interface is configured to display certain information to the player or scorer, to enable the player or scorer to make zero, one, or a plurality of inputs using the interface, and to enable the player or scorer to progress to one or more of the other interfaces.

The example interfaces described below assume that each of the players and/or the scorer of the pickle ball game have previously set up player and/or scorer accounts with the system server that maintains the player and/or scorer accounts. This enables the ETD to provide the data collected for the play of the pickleball game to the system sever such that the system server can update and maintain such updated accounts. The system servers can include or access suitable databases that store the player and/or storer account data and the player statical information.

Figure 9:
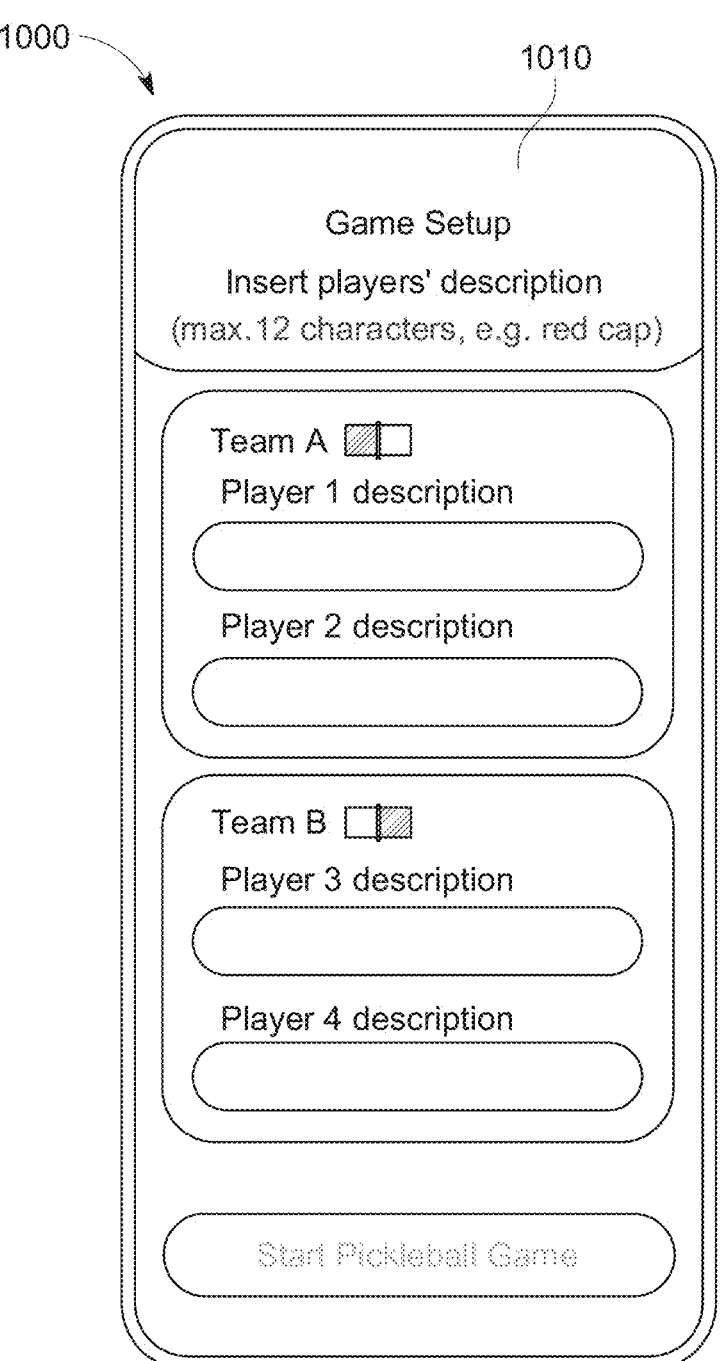
FIGS. 9, 10, 11, 12, 13, 14, 15, 15A, 16, 17, 18, 19, 19A, 20, 21, 22, 22A, 23, 24, 25, 26, 27, 27A, 28, 28A, 29, 29A, 30, 30A, 31, 32, and 33 are front views of an example pickleball player statistic tracking device in accordance with various embodiments of the present disclosure, and showing various different example graphical user interfaces displayed by the example pickleball player statistic tracking device at various points during the operation of the pickleball player statistic tracking device for various example plays of a pickleball game by four players.
Figure 10:
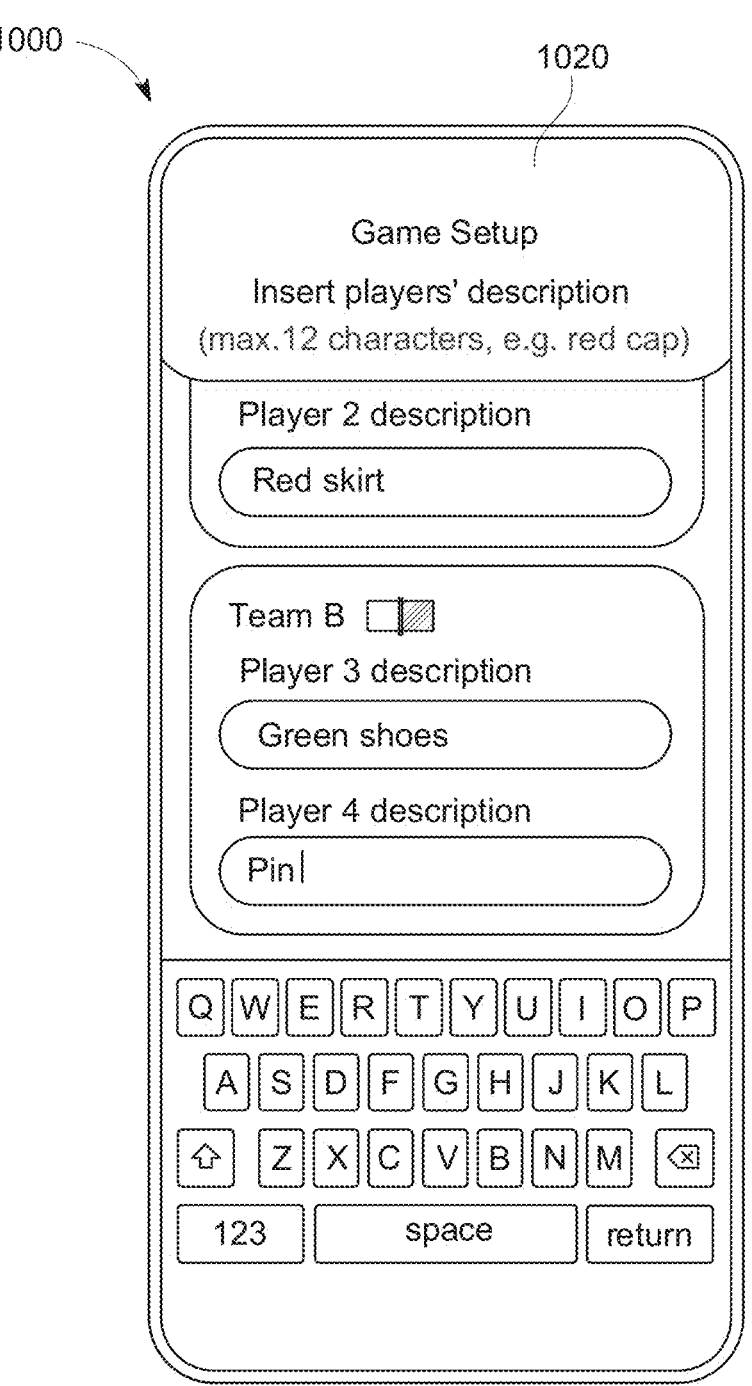
Figure 11:
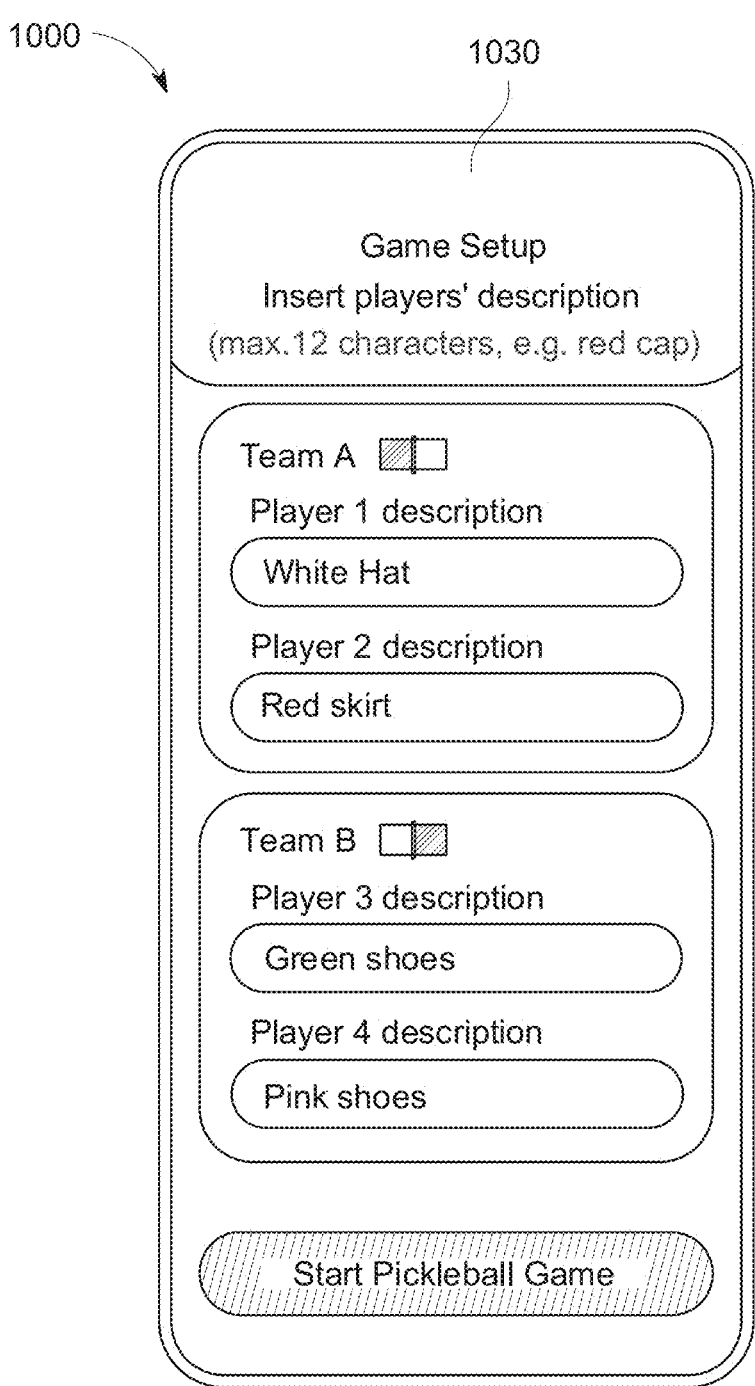

FIGS. 9, 10, and 11 show the ETD 1000 displaying, prior to the start of the play of the pickleball game, example Game Setup graphical user interfaces 1010, 1120, and 1130 that enable the scorer using the ETD 1000 to enter identifying information regarding each of the players on each of the two teams that will play the pickleball game. The ETD 1000 includes a combination display device and touch screen that enables the scorer to enter data directly via the graphical user interfaces.

In this example, the Game Setup graphical user interfaces 1010, 1120, and 1130 are configured for a play of a pickleball game in which there are two players on each team. In other embodiments, the ETD 1000 and the graphical user interfaces displayed by the ETD can be configured for a play of a pickleball game having one player on each team (i.e., for a singles pickleball game).

The Game Setup graphical user interfaces 1010, 1120, and 1130 enable the scorer to input at separate respective player identification areas (not labeled) and in respective player ID sections (not labeled) thereof a way to quickly and easily identify the player based on a piece of clothing or another characteristic of the player. This player ID section assists the scorer in tracking and recording each player's statistic during a play of a pickleball game as the player switches from the right (even) side to the left (odd) side of their team's side of the court during the play of the pickleball game as described above. The Game Setup graphical user interfaces 1010, 1120, and 1130 enable the scorer to enter each player's details, assigning them to either Team A or Team B.

Although not shown, the Game Setup graphical user interfaces can also enable the scorer to input other respective player identification such as via an enhanced player identification section (not shown) such as a name section (not labeled) and/or player account section (not shown) that enables a scorer to record the player's name and/or player account information. The player's name and/or player account enables the ETD and the tracking system server to accumulate data related to the player over a series of plays of pickleball games and to provide that accumulated data to the player as mentioned above.

The Game Setup graphical user interfaces 1010, 1120, and 1130 enable the scorer to start scoring the play of the pickleball game after this data is entered.

Figure 12:
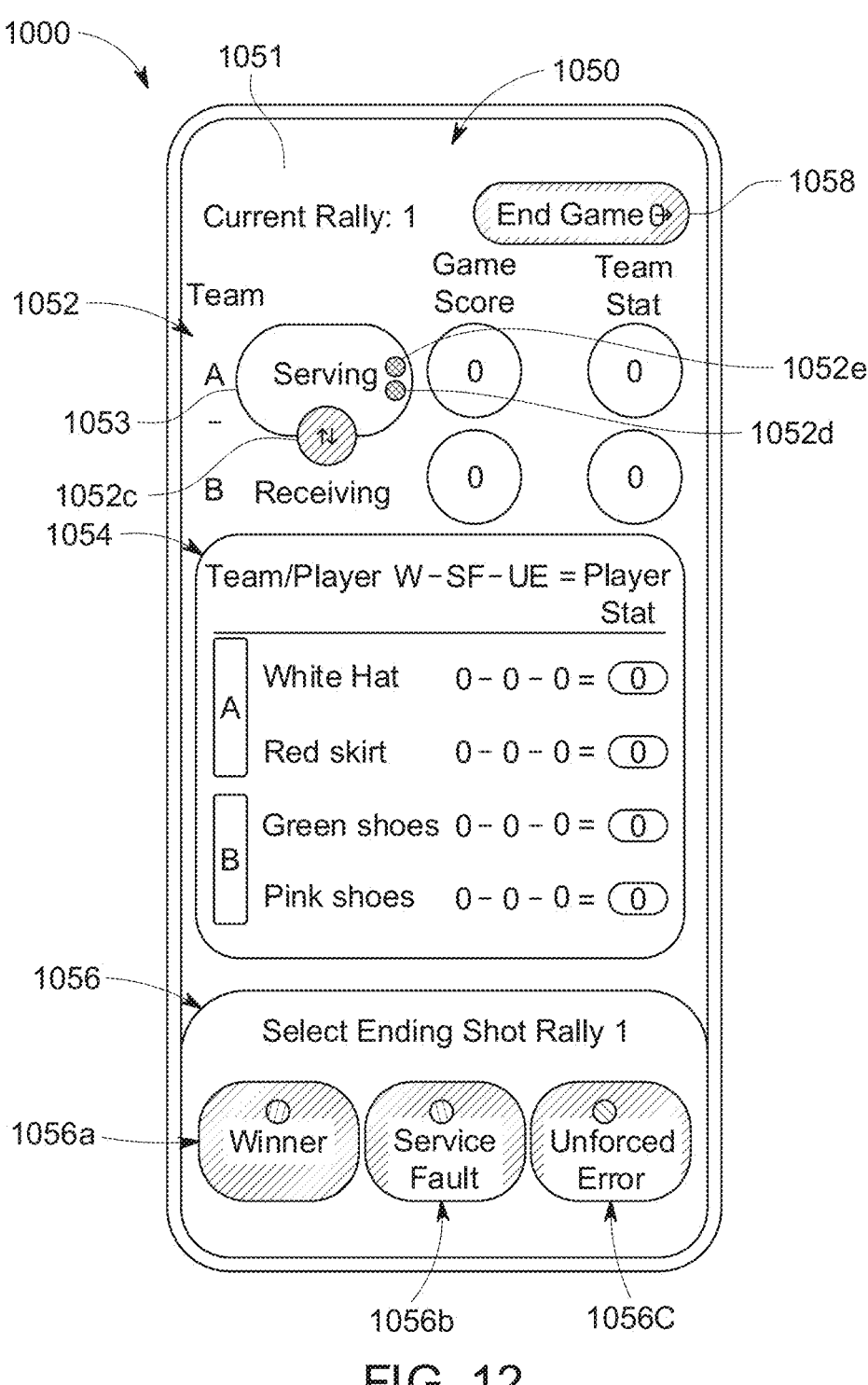

FIG. 12 shows the ETD 1000 displaying, for the play of pickleball game, an example Rally graphical user interface 1050 that enables the scorer to enter rally related data for each single rally of the play of the pickleball game including each rally-ending shot, and that displays cumulative rally data for the play of the pickleball game.

The example Rally graphical user interface 1050 indicates the rally number for the play of the pickleball game by rally number indicator 1051. This number increases after rally data is entered by the scorer for each rally for the play of the pickleball game.

The Rally graphical user interface 1050 includes a team serving section 1052 that indicates at the start of the rally which team is serving, which team is receiving the serve, the game score, the team total play rally-ending shot statistic (referred herein as the "team stat") for the play of the pickleball game.

The Rally graphical user interface 1050 indicates the serving team by a serving team indicator 1053 that in this example is an oval line around the team indication. Other suitable serving team indicators can be employed in accordance with the present disclosure.

The team serving section 1052 of the Rally graphical user interface 1050 includes a serving team input button 1052c that enables the scorer to confirm which team is serving. The Rally graphical user interface 1050 can thus require the scorer to touch the serving team input button 1052c before the game begins.

The Rally graphical user interface 1050 includes serve counter indicators that indicate the server number (i.e., one or two) for the serving team. In this example, the serve counter indicators are two circular indicators 1052*d* and 1052*e* that are displayed to indicate the serve count number for the serving team.

Figure 13:
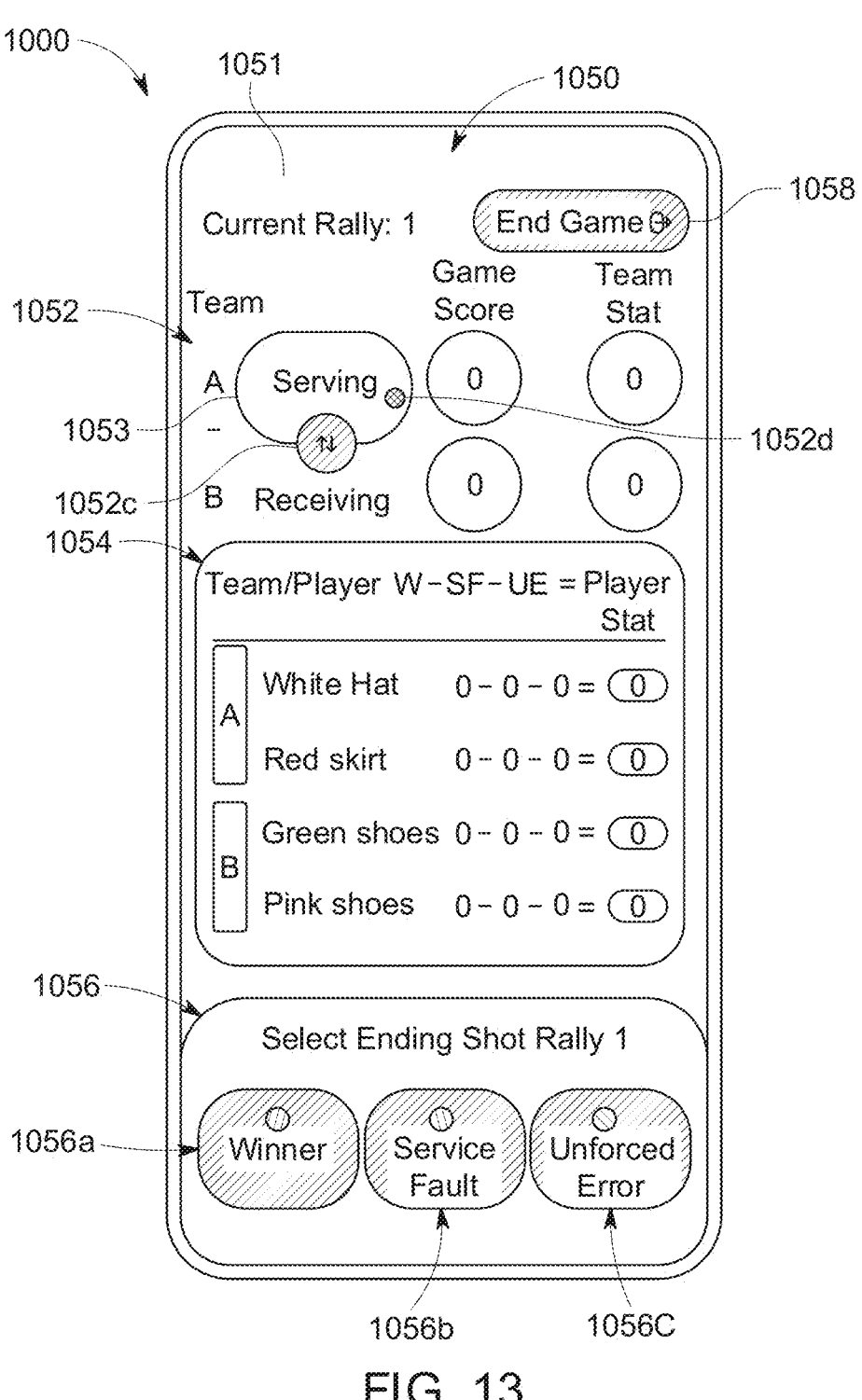

In this example shown in FIG. 12, both indicators 1052*d* and 1052*e* are displayed because this example Rally interface is for the start of the play of the pickleball game (i.e., the first rally) and the first service team starts serving at the second service (as explained above). FIG. 13 shows an example where only 1 of the indicators (i.e., 1052*e*) is displayed—to indicate the serving team is at the first service for the serving team. Other suitable serve counter indicators can be employed in accordance with the present disclosure.

The Rally graphical user interface 1050 includes a player statistic tracking device section 1054 that includes four individual separate player statistic sections (not individually labeled) for the individual two players on a first one of the teams (e.g., Team A) and individual separate player statistic sections (not individually labeled) for the individual two players on a second one of the teams (e.g., Team B). The four individual separate player statistic sections are configured to correspond to each player's initial starting position for the play of the pickleball game. The first, second, third, and fourth individual separate player statistic sections each include identical components for each player, and specifically include: (1) a player identification area (not labeled); (2) a player winning shot area (not labeled); (3) a player service fault area (not labeled); (4) a player unforced error area (not labeled); and (5) a player total area (not labeled). This Rally graphical user interface 1050 includes suitable abbreviations (not labeled) and specifically in this example includes: (1) W for a winning shot; (2) SF for a service fault by a serving player; and (3) UE for an unforced error by a player. These abbreviations are for the same purposes as explained above. The first, second, third, and fourth individual separate player statistic sections each include, for each player, a player total play rally-ending shot statistic (referred herein as the "player stat") for the play of the pickleball game.

The Rally graphical user interface 1050 includes a rally-ending section 1056 that includes different input indicators that enable the scorer to quickly enter how the rally ended. These include: (1) a player winning shot input button 1056*a*; (2) a player service fault input button 1056*b*; and (3) a player unforced error input button 1056*c*. In other words, the Rally graphical user interface 1050 requires the scorer, after each rally is completed to select one of the three different types of rally-ending shots using this interface. In one example, these selectable shot are different colors such as winners (W) being green, service faults (SF) being orange, and unforced errors (UE) being red. Any suitable colors or other differentiating indications can be employed in accordance with the present disclosure.

The Rally graphical user interface 1050 includes a game end input button 1058 that enables the scorer to start a game ending process as further discussed below.

In this example Rally graphical user interface 1050, only the hatched input buttons are able to be pressed by the scorer. In other words, the interface 1050 limits the inputs by the scorer to make use of the interface easy and quick for the scorer.

Figure 14:
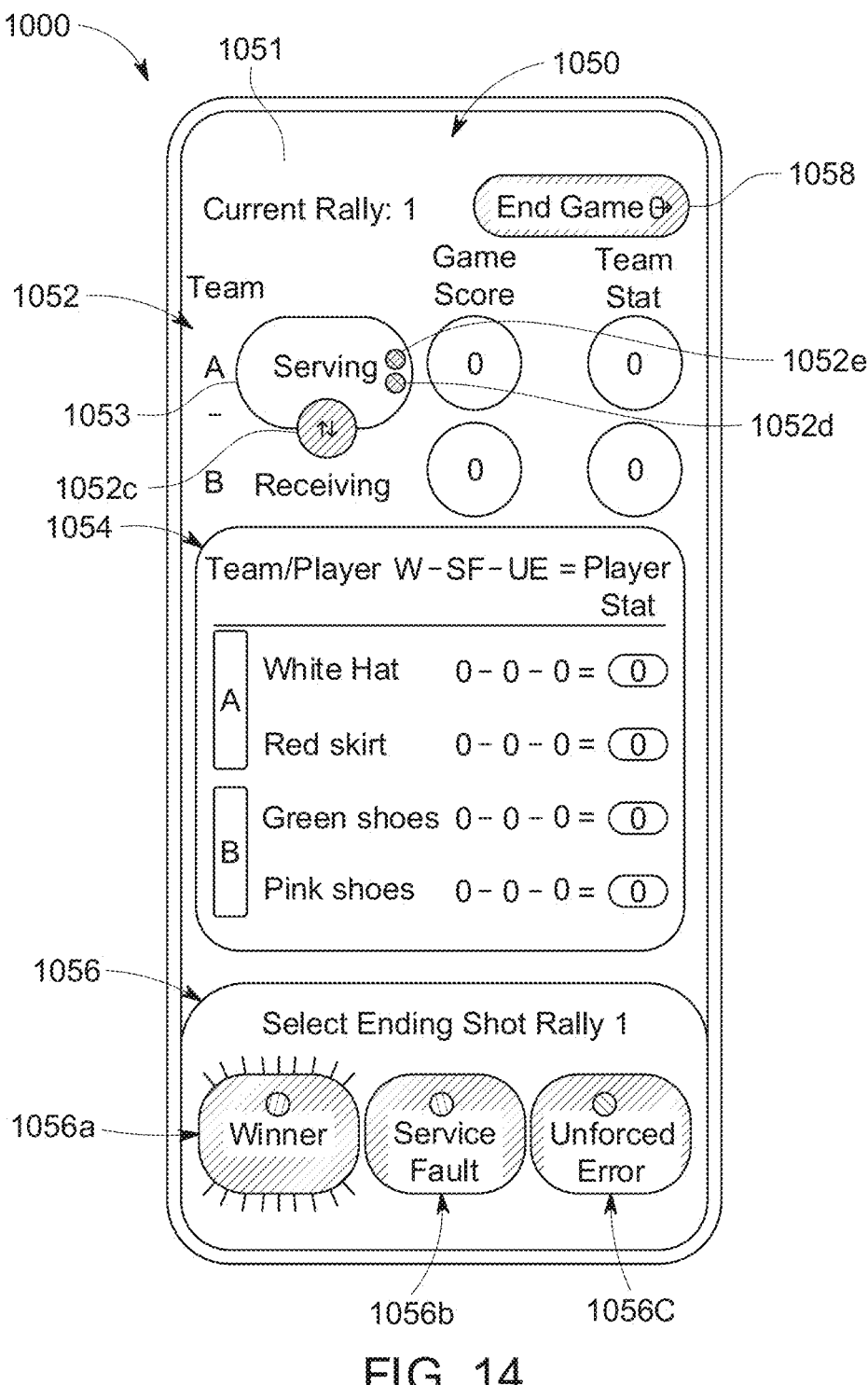

FIG. 14 indicates that for the example first rally of the play of pickleball game the scorer hit the winner button 1056*a* to indicate the first rally ended due to a winning shot.

Figure 15:
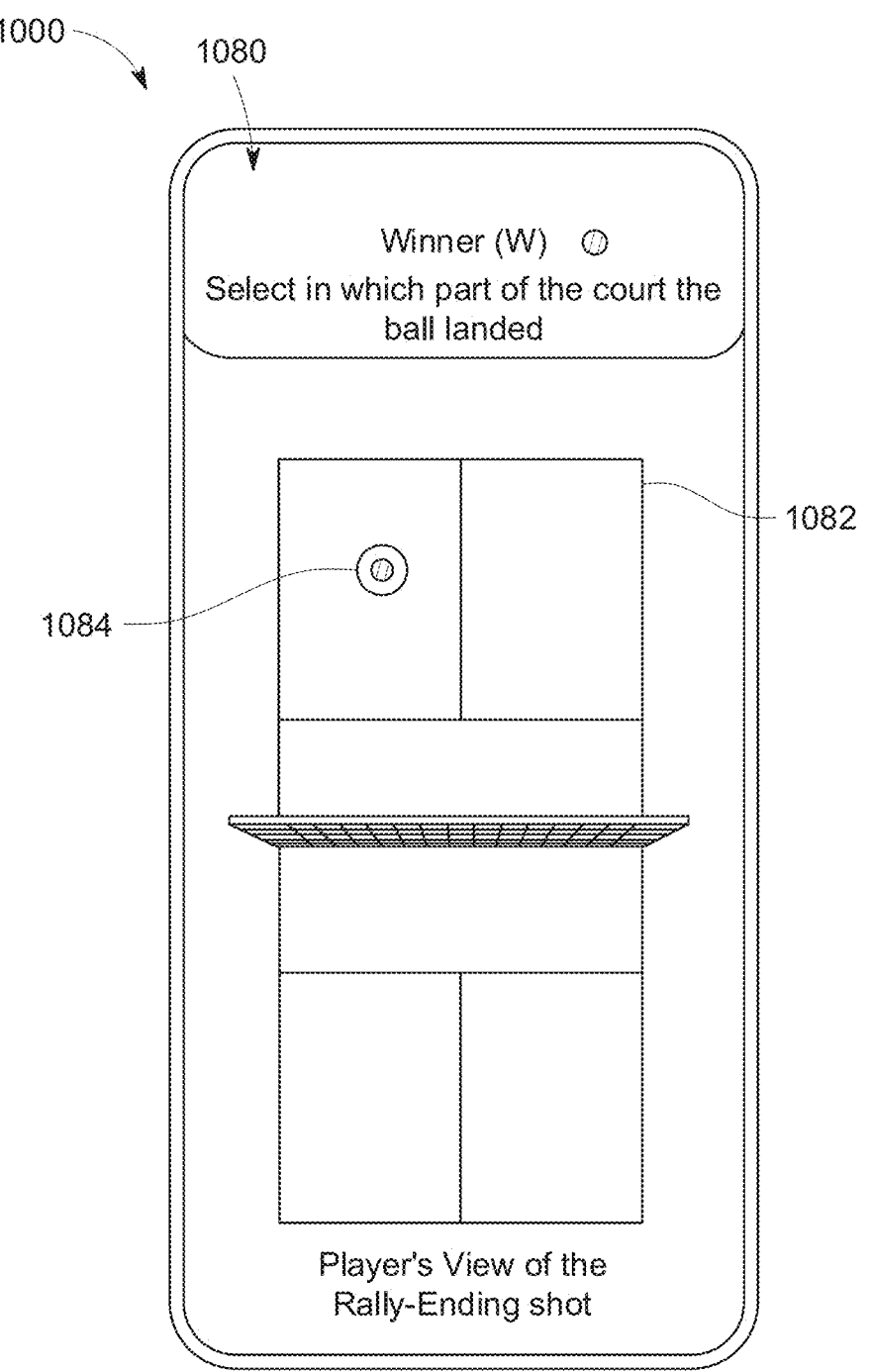

As shown in FIG. 15, responsive to the scorer hitting the winner button 1056*a* on the Rally interface 1050, the ETD 1000 displays a Shot Location graphical user interface 1080 that includes a court layout 1082 that enables the scorer to input the location where the ball of the winning shot landed on the court. In this example, after the scorer does so, the ETD 1000 displays a shot indicator 1084 on the court layout 1082 that generally indicates the location where the ball of the winning shot landed on the court. This example court layout 1082 shows the structure of the pickleball court including the net (not labeled), the two respective kitchen sections (not labeled) on each side of the net, the two respective rear sections (not labeled) on each side of the court, the side lines on each side of the net (not labeled), the kitchen lines (not labeled) on each side of the net, the center lines (not labeled) on each side of the net, and the baseline (not labeled) on each side of the net. In this example, the ETD 1000 shows the court from the server's side to make it easier for the scorer to make this input.

Figure 15A:
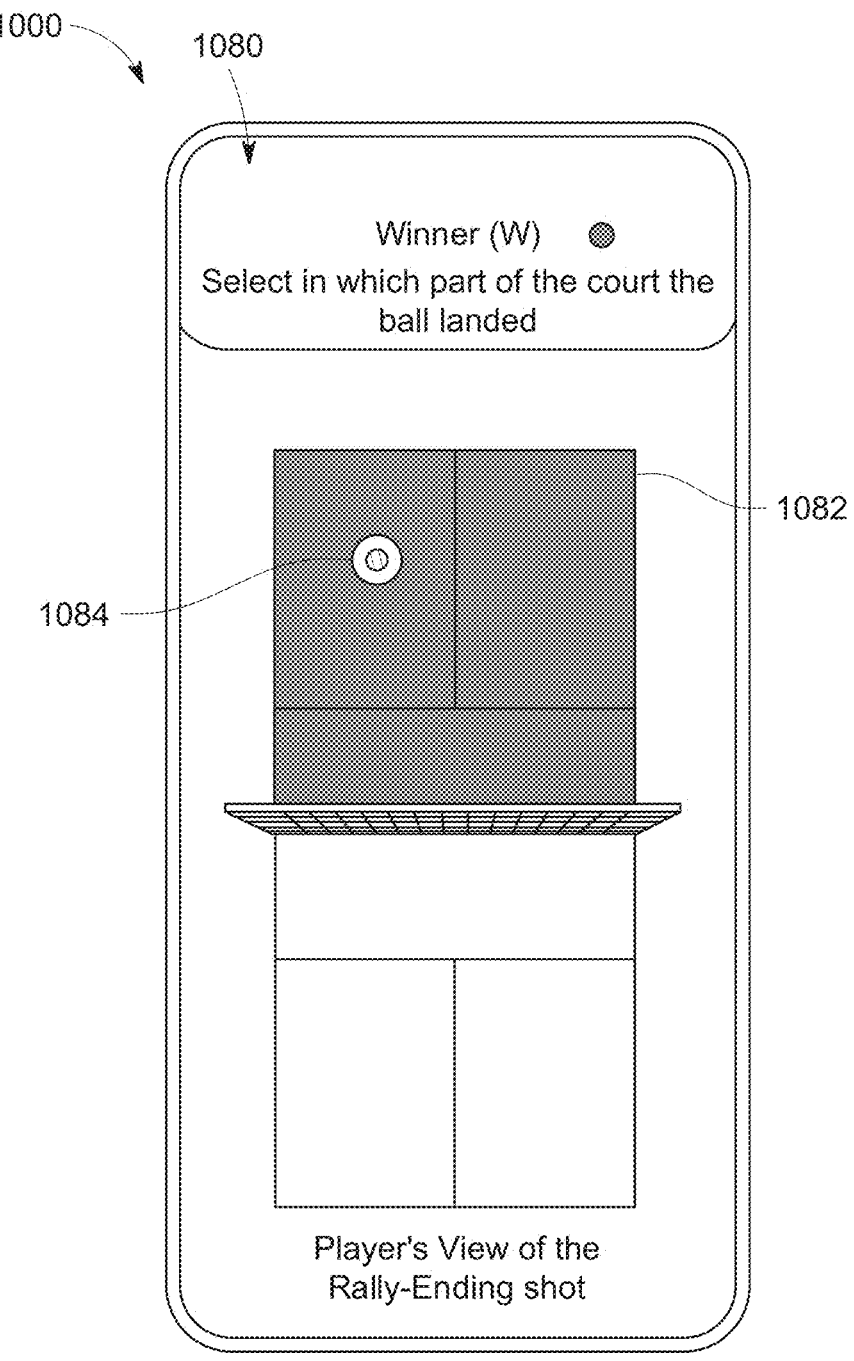

FIG. 15A shows an alternative embodiment of a Shot Location graphical user interface 1080 that includes a court layout 1082 that enables the scorer to more easily input the location where the ball of the winning shot landed on the court. In this example embodiment, the Shot Location graphical user interface 1080 includes the portions of the court layout 1082 where a winning shot can possibly land in a color (which is green in this example). This additional indicator (green) indicates to the scorer the only locations that a winning shot can occur. In this example, after the scorer selects a location for the winning shot, the ETD 1000 displays a shot indicator 1084 on the court layout 1082 that generally indicates the location where the ball of the winning shot landed on the court.

Figure 16:
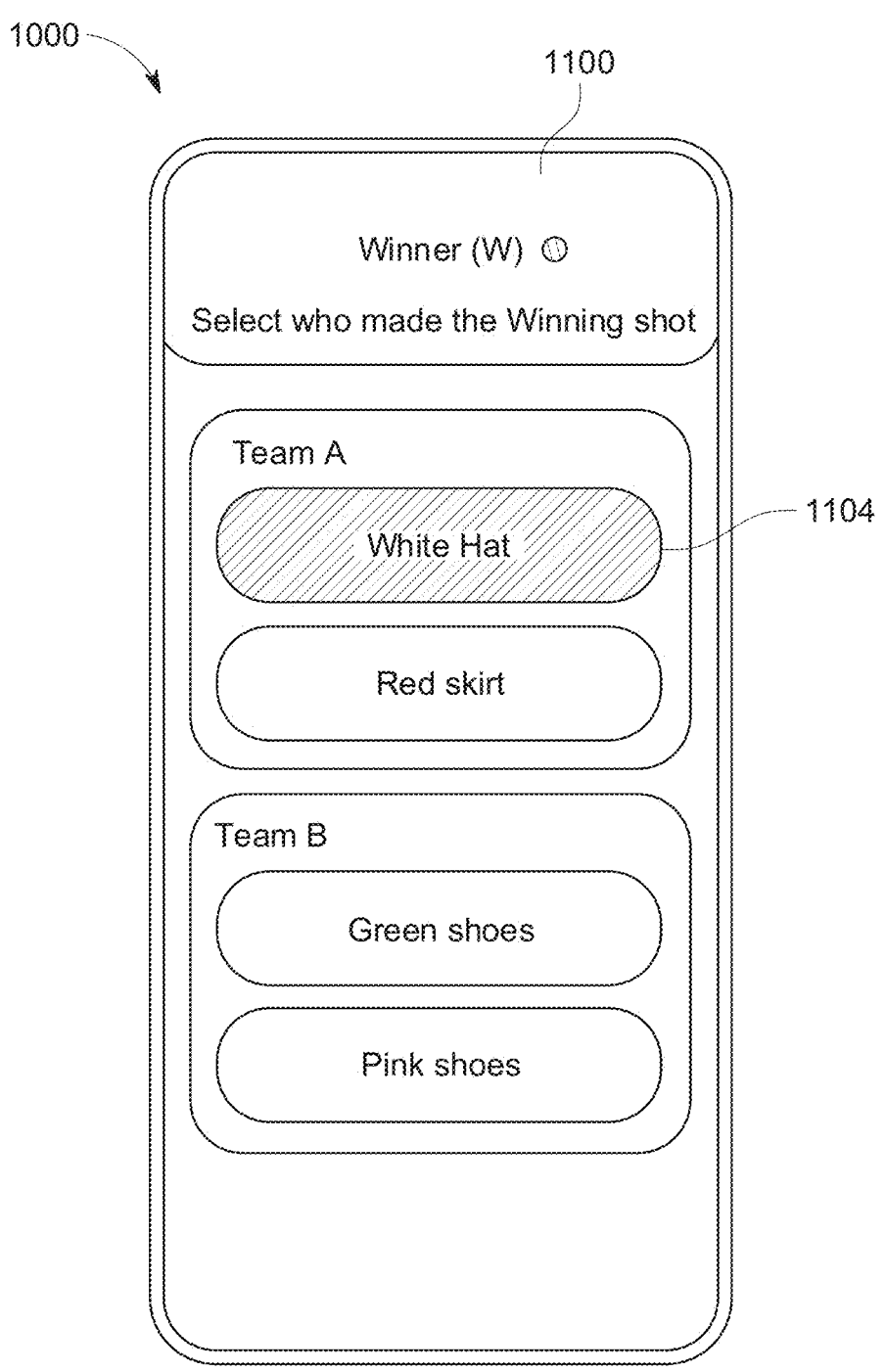

As shown in FIG. 16, thereafter, the ETD 1000 displays Player Winner graphical user interface 1100 that enables the scorer to input the player who hit the winning shot. In this example, after the scorer does so, the ETD 1000 displays a player indicator 1104 on the Player Winner graphical user interface 1100.

Figure 17:
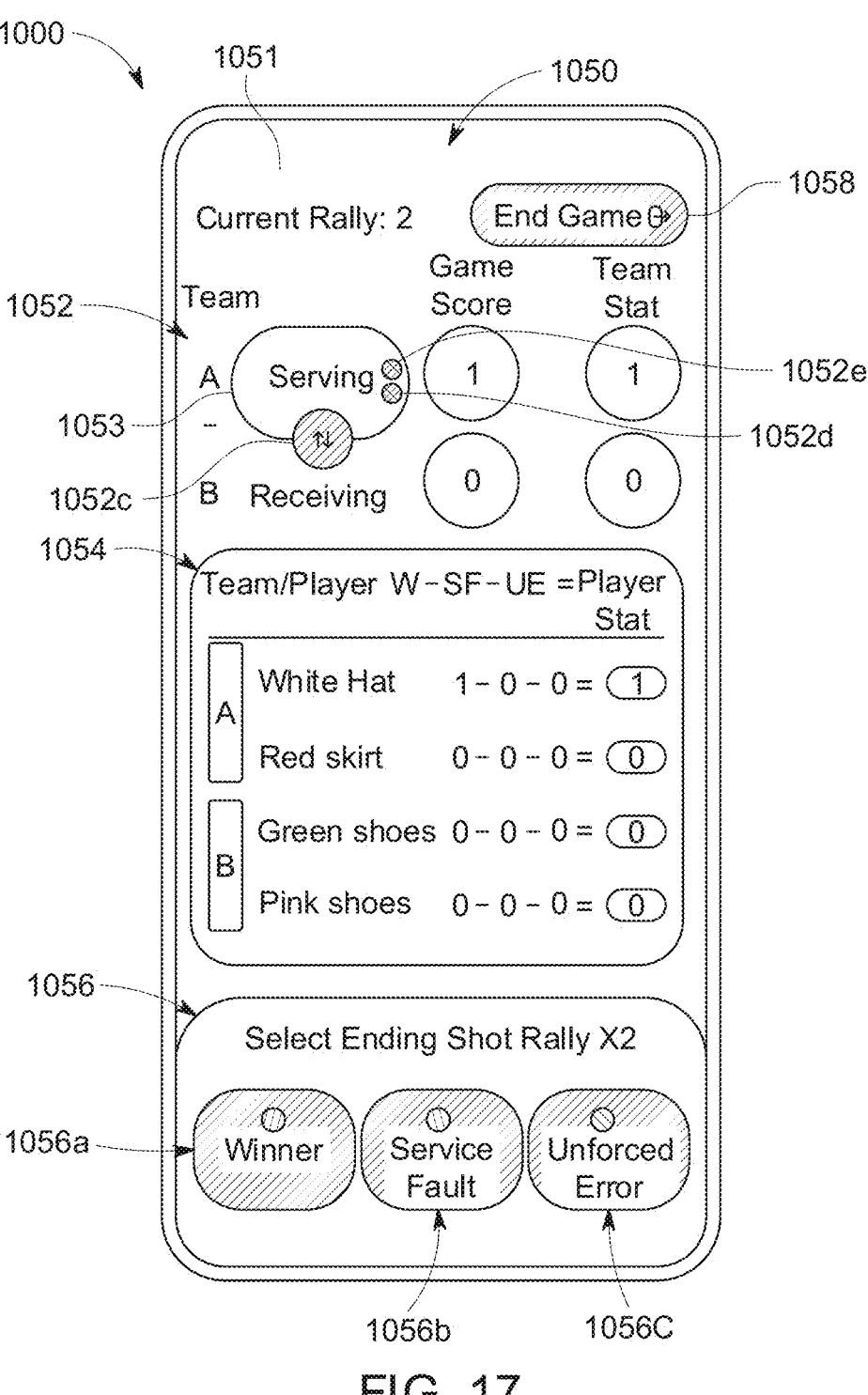

After the scorer makes these inputs, the ETD 1000 updates the player statistics for this play of the pickleball game and displays the Rally graphical user interface 1050 with an updated rally count, updated team score, and updated player data such as shown in FIG. 17. FIG. 17 also shows that the Rally graphical user interface 1050 is ready to receive an input from the scorer for the second rally for this play of the pickleball game.

This example shows that the ETD 1000, during the play of the pickleball game, for each rally, enables the scorer to easily and quickly record the respective results of that rally during the play of the pickleball game.

This example shows that the ETD 1000 displays for each individual player, the player total rally-ending statistic is based on the formula W−SF−UE=Player's total rally-ending statistic (i.e., W less SF less UE=total rally-ending statistic). In other words, winners (W) minus service faults (SF) minus unforced errors (UE) equals a player's total rally-ending statistic. The player total rally-ending statistic can be based on another suitable formula (such as a weighted formula) in accordance with the present disclosure. The total player rally-ending statistics provides an indication of how the individual player performs during the play of the pickleball game and can be used to rate the player and for any other suitable purposes (such as for showing the player how the player performed relative to the other players). The four individual separate player statistic sections are thus configured to provide this information for each player.

The ETD 1000 thus tracks and stores data regarding each of the rally-ending shots by each player and displays indications of as the game progresses. In different embodiments, the ETD 1000 can provide this data back to the system server for each player on an ongoing continuous basis or at the end of the play of the pickleball game.

Figure 18:
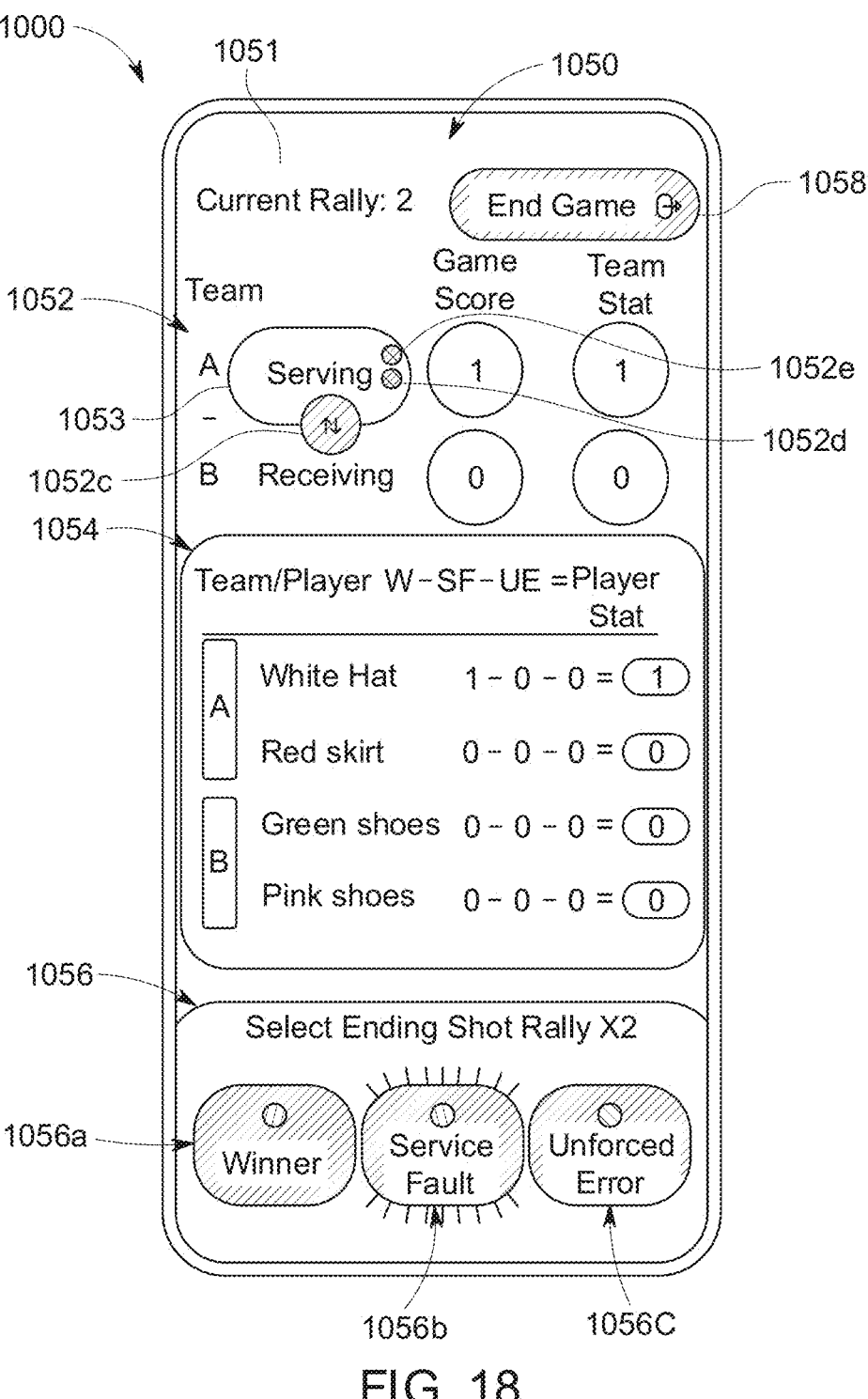

FIG. 18 indicates that for the example second rally of the play of pickleball game the scorer hit the server fault button 1056*b* to indicate the second rally ended due to a service fault.

Figure 19:
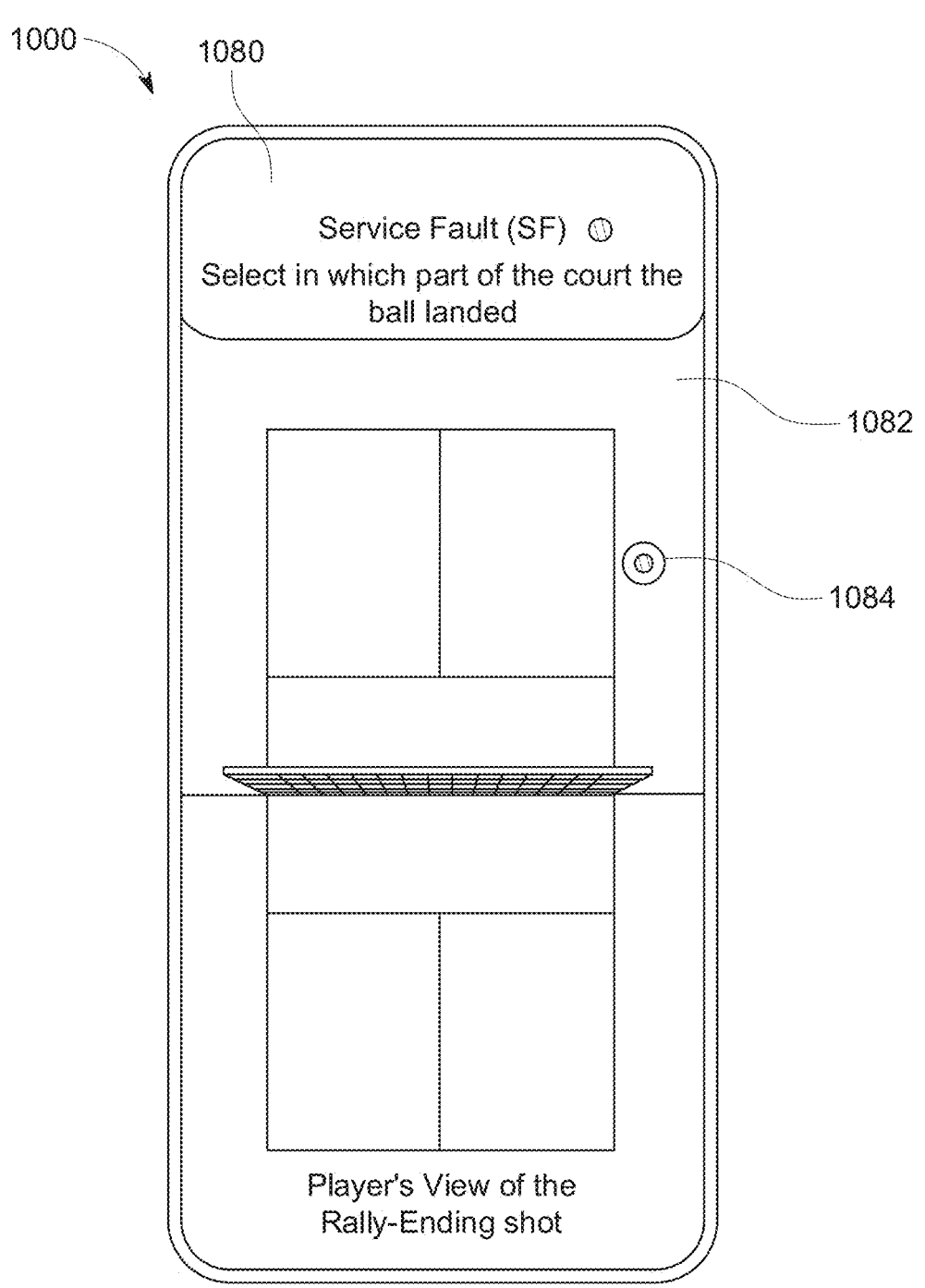

As shown in FIG. 19, responsive to the scorer hitting the service fault button 1056*b*, the ETD 1000 displays a Shot Location graphical user interface 1080 that includes a court layout 1082 that enables the scorer to input the location where the ball that resulted in the service fault landed on the court. In this example, after the scorer does so, the ETD 1000 displays a shot indicator 1084 on the court layout 1082 that generally indicates the location where the ball that resulted in the service fault landed on the court. In this example, the ETD 1000 shows the court from the server's side to make it easier for the scorer to make this input.

Figure 19A:
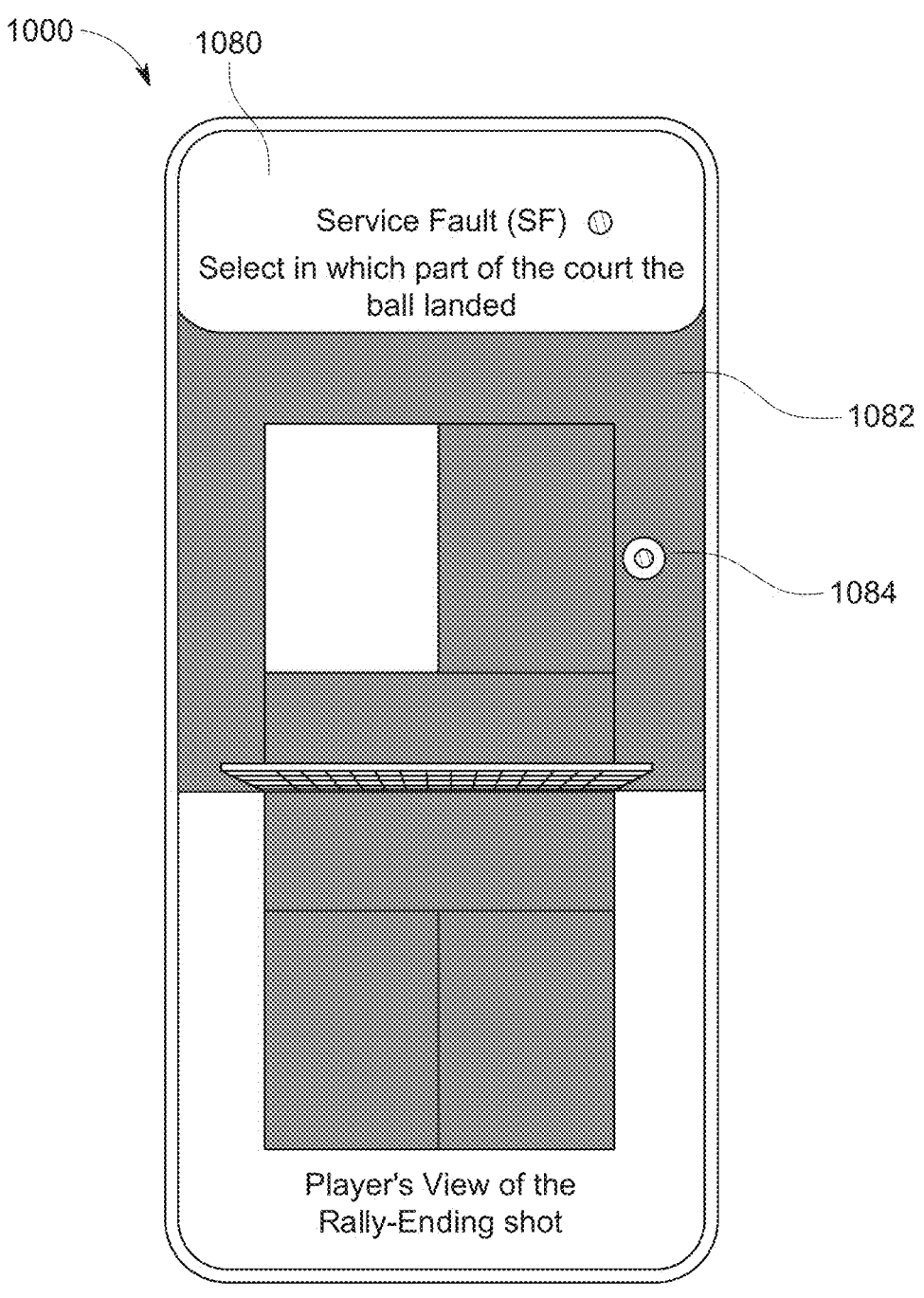

FIG. 19A shows an alternative embodiment of a Shot Location graphical user interface 1080 that includes a court layout 1082 that enables the scorer to more easily input the location where the ball of the service fault landed on the court. In this example embodiment, the Shot Location graphical user interface 1080 includes the portions of the court layout 1082 where a service fault can possibly land in a color (which is red in this example). This additional indicator (red) indicates to the scorer the locations that a service fault can occur. In this example, after the scorer selects a location for the service fault, the ETD 1000 displays a shot indicator 1084 on the court layout 1082 that generally indicates the location where the ball of the service fault landed on the court. It should be appreciated that in this illustrated example, the server is serving from the right side of the court and the right side of the receiver's court is not red because if the ball landed in that section of the receiver's court, it would not be a service fault. Likewise, if the server were serving from the left side of the court, the left side of the receiver's court would not be red because if the ball landed in that section of the receiver's court, it would not be a service fault.

Figure 20:
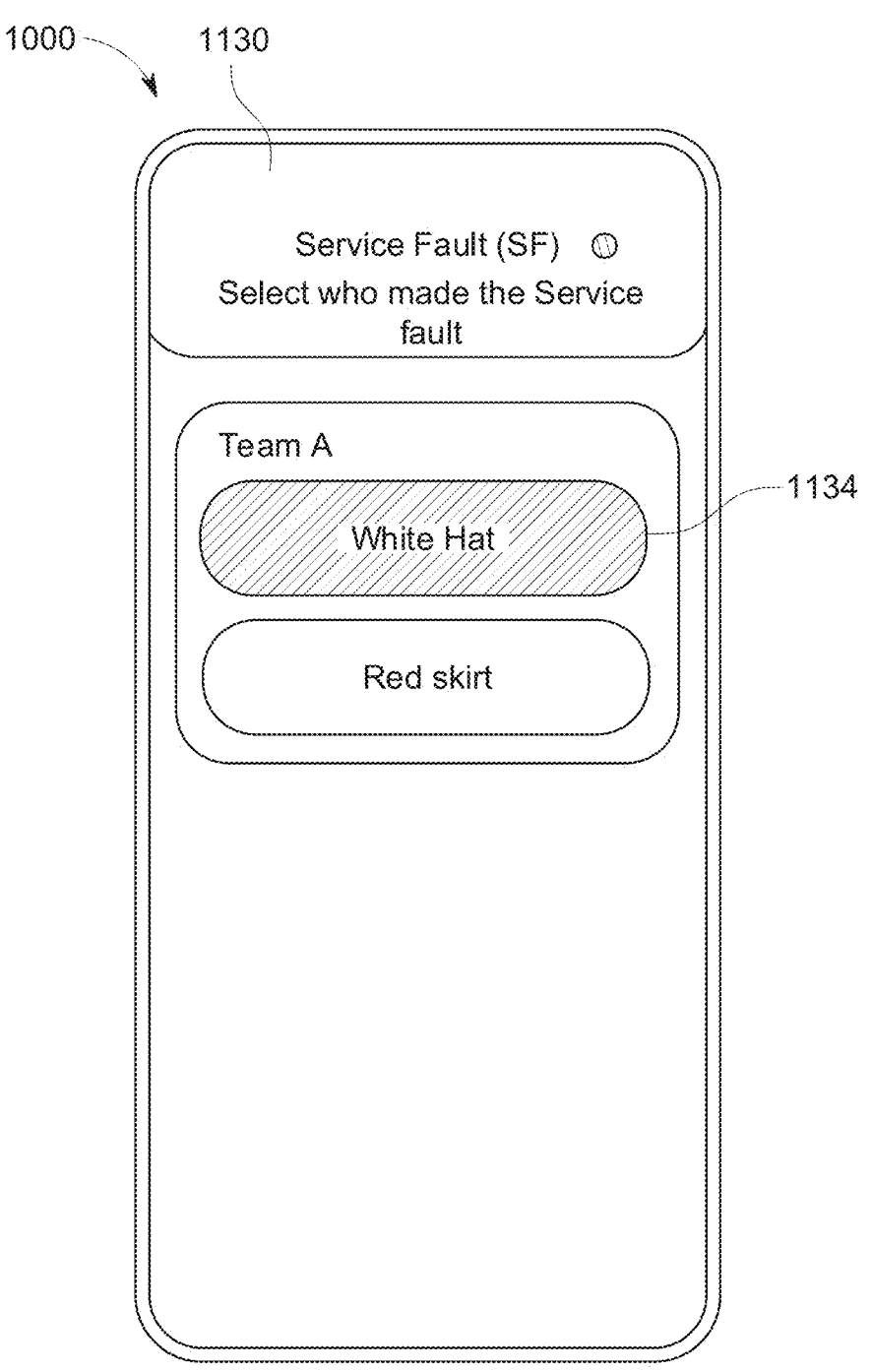

As shown in FIG. 20, thereafter, the ETD 1000 displays the Service Fault graphical user interface 1130 that enables the scorer to input the player who hit the service fault. In this example, after the scorer does so, the ETD 1000 displays a player indicator 1134 on the Service Fault graphical user interface 1130.

Figure 21:
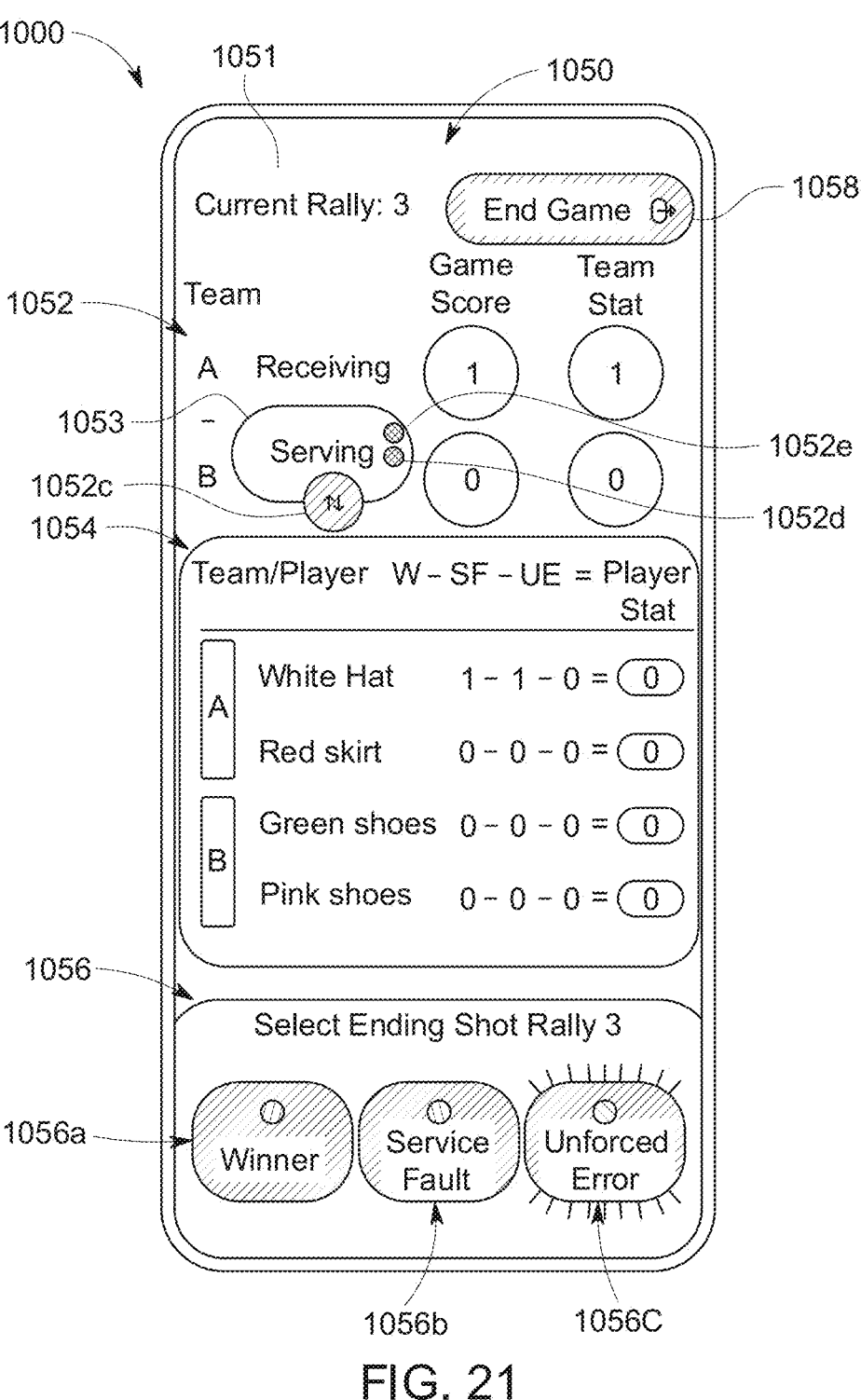

After the scorer makes these inputs, the ETD 1000 updates the player statistics for this play of the pickleball game and displays the Rally graphical user interface 1050 with an updated rally, updated team score, and updated player data as shown in FIG. 21. FIG. 21 also shows that the Rally graphical user interface 1050 is ready to receive an input from the scorer for the third rally for this play of the pickleball game.

The ETD 1000 thus tracks and stores data regarding each of the rally-ending shots by each player and displays indications of as the game progresses. In different embodiments, the ETD 1000 can provide this data back to the system server for each player on an ongoing continuous basis or at the end of the play of the pickleball game.

FIG. 21 also indicates that for the example third rally of the play of pickleball game the scorer hit the unforced error button 1056*c* to indicate the third rally ended due to an unforced error.

Figure 22:
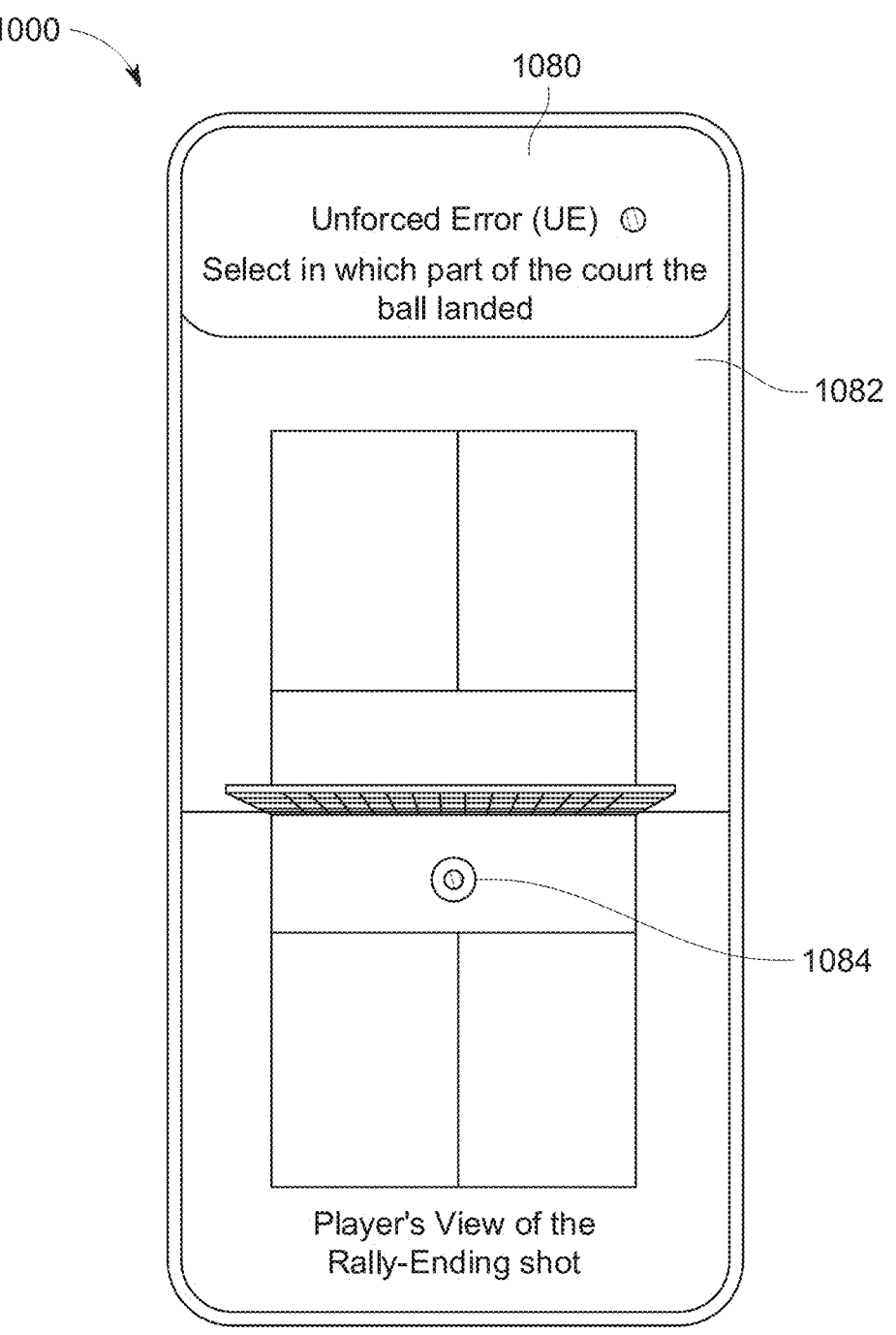

As shown in FIG. 22, responsive to the scorer hitting the unforced error button 1056*c*, the ETD 1000 displays Shot Location graphical user interface 1080 that includes a court layout 1082 that enables the scorer to input the location where the ball that resulted in the unforced error landed on the court. In this example, after the scorer does so, the ETD 1000 displays a shot indicator 1084 on the court layout 1082 that generally indicates the location where the ball that resulted in the unforced error landed on the court. In this example, the ETD 1000 shows the court from the server's side to make it easier for the scorer to make this input.

Figure 22A:
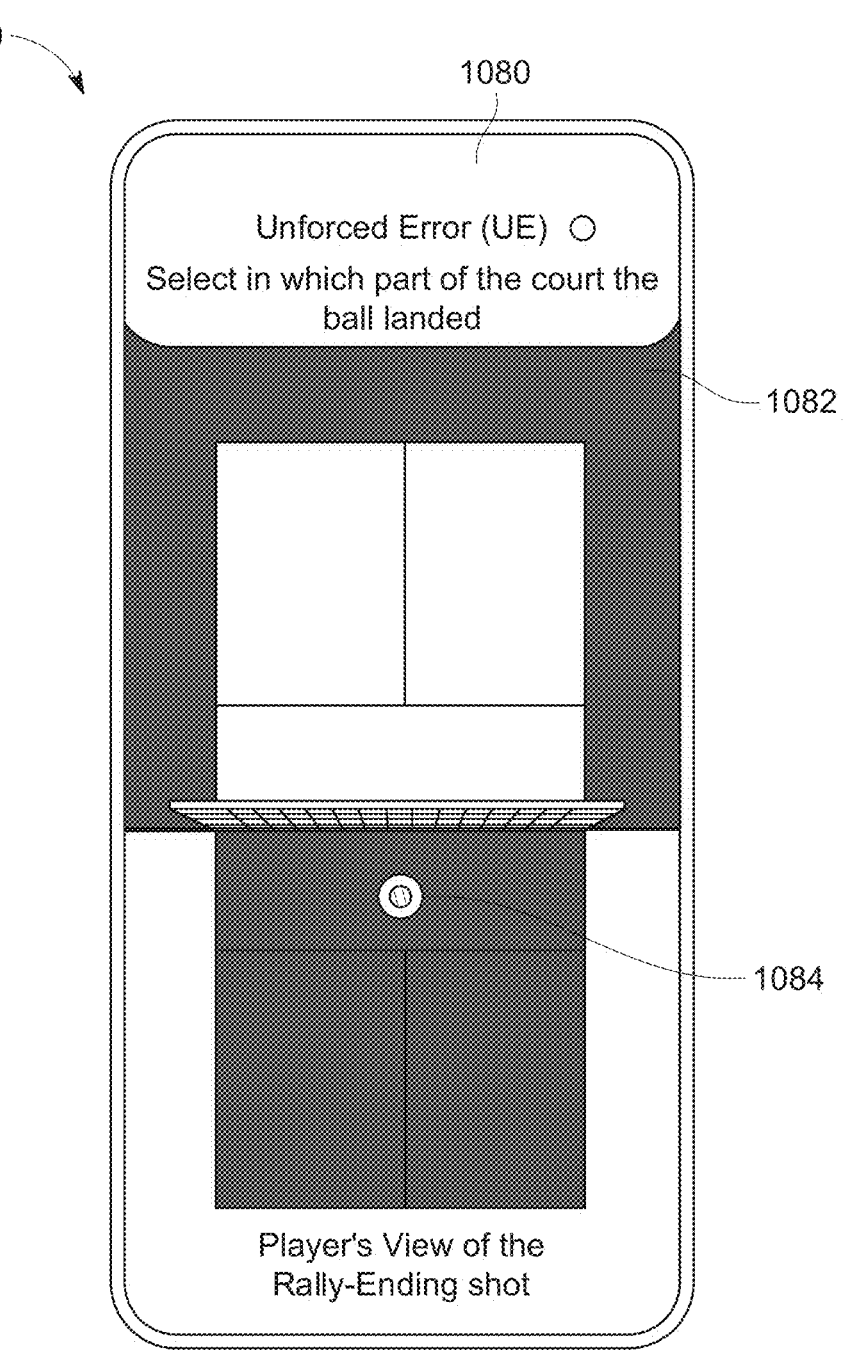

FIG. 22A shows an alternative embodiment of a Shot Location graphical user interface 1080 that includes a court layout 1082 that enables the scorer to more easily input the location where the ball of the unforced error landed on the court. In this example embodiment, the Shot Location graphical user interface 1080 includes the portions of the court layout 1082 where an unforced error can possibly land in a color (which is orange in this example). This additional indicator (orange) indicates to the scorer the locations that an unforced error can occur. In this example, after the scorer selects a location for the unforced error, the ETD 1000 displays a shot indicator 1084 on the court layout 1082 that generally indicates the location where the ball of the unforced error landed on the court.

Figure 23:
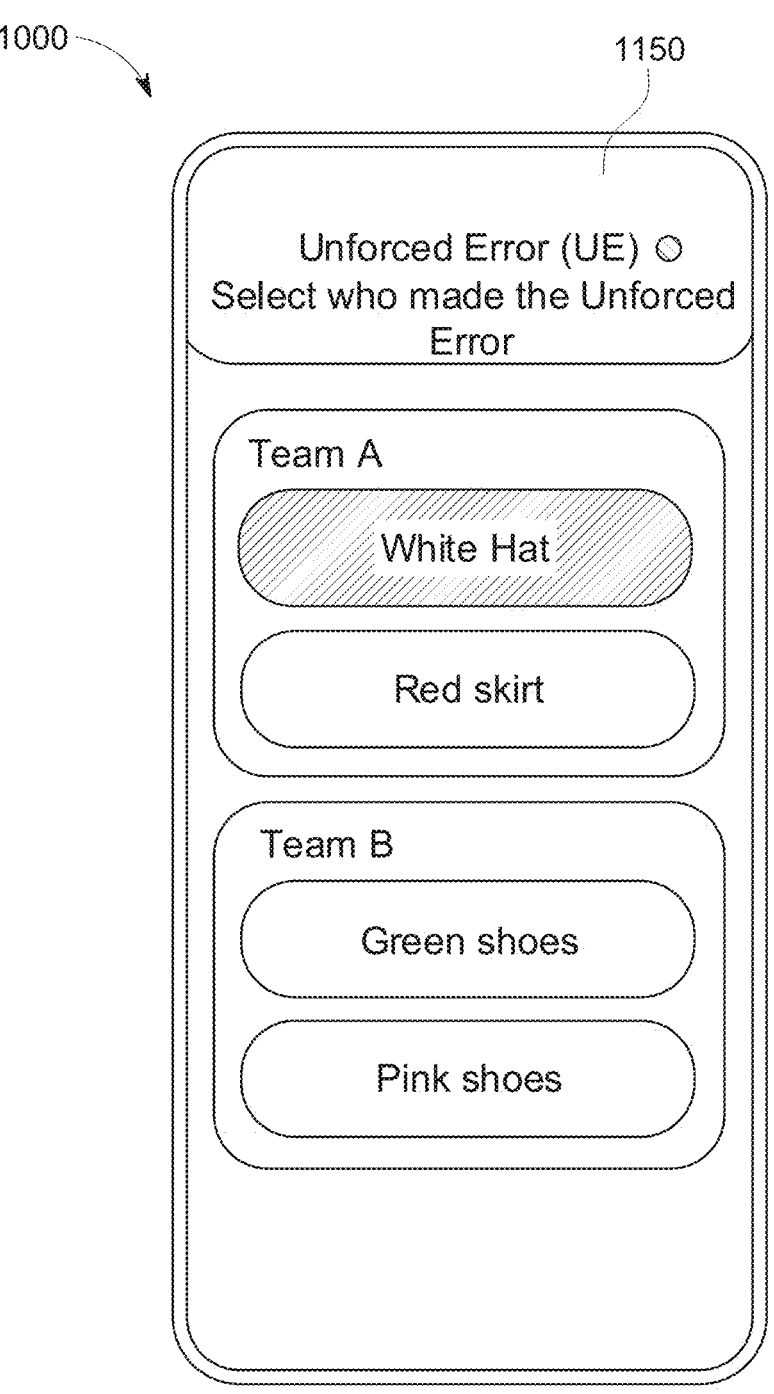

As shown in FIG. 23, thereafter, the ETD 1000 displays the Unforced Error graphical user interface 1150 that enables the scorer to input the player who made the unforced error. In this example, after the scorer does so, the ETD 1000 displays a player indicator 1154 on the Unforced Error graphical user interface 1150.

Figure 24:
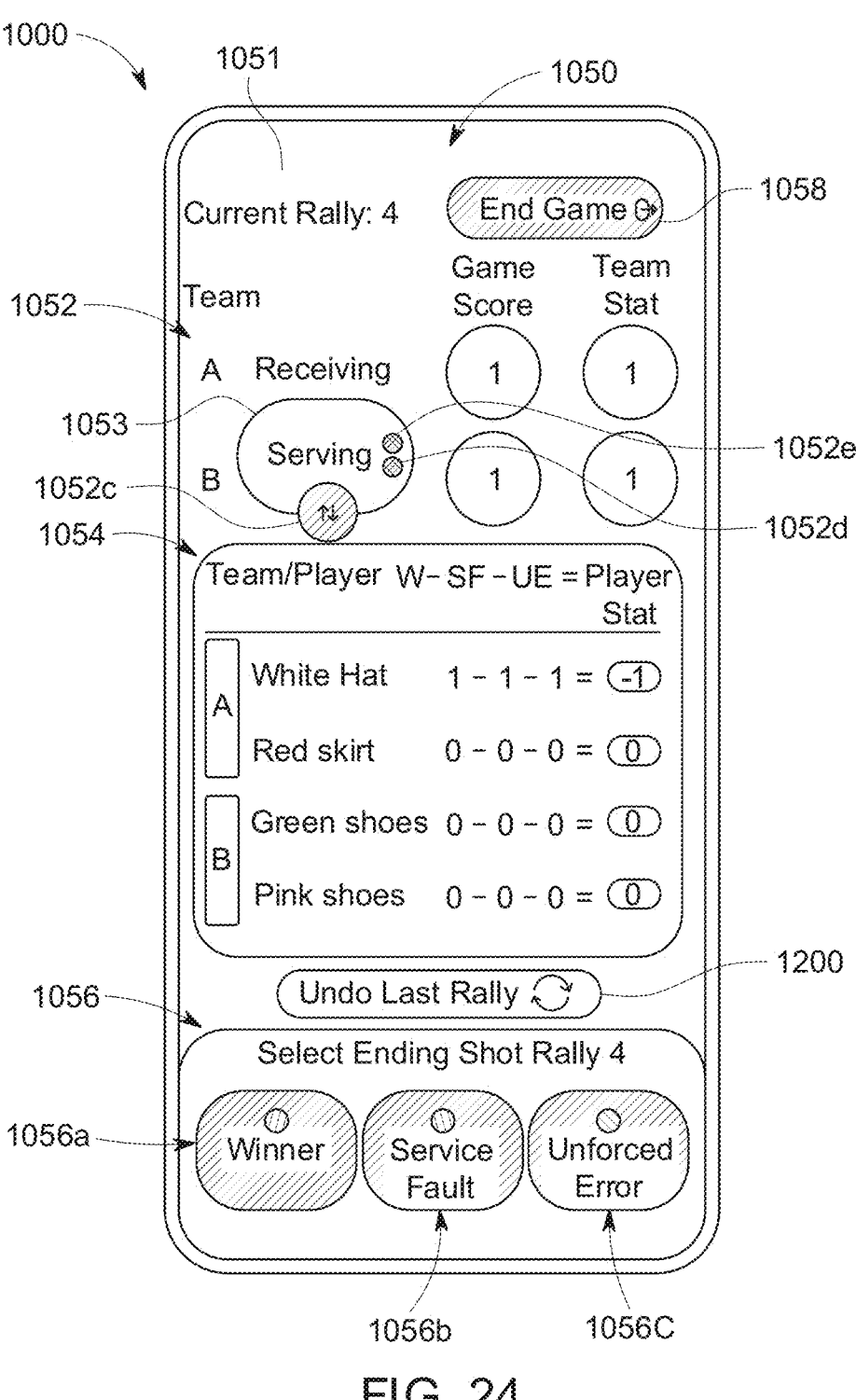

After the scorer makes these inputs, the ETD 1000 updates the player statistics with respect to rally-ending shots for this play of the pickleball game and displays the Rally graphical user interface 1050 with updated rally, team score, and player data as shown in FIG. 24. FIG. 24 also shows that the Rally graphical user interface 1050 is ready to receive an input from the scorer for the fourth rally for this play of the pickleball game.

The ETD 1000 thus tracks and stores data regarding each of the rally-ending shots by each player and displays indications of as the game progresses. In different embodiments, the ETD 1000 can provide this data back to the system server for each player on an ongoing continuous basis or at the end of the play of the pickleball game.

It should be appreciated from the above, that as the play of the pickleball game progresses, for each rally-ending shot, the ETD enables the scorer to easily and quickly make the respective inputs for that rally and the ETD automatically tracks the game score as well as the team and player rally-ending stats.

As also shown in FIG. 24, the ETD 1000 can display the Rally graphical user interface 1050 (and or one or more of the other interfaces) with a suitable Undo Last Rally input button such as button 1200 that enables the scorer to undo the last shot that the scorer entered and enable the scorer to enter a different shot, different shot location, and/or different player. In other words, one or more or each of the interfaces can enable the scorer to change one or more previous scorer inputs.

As also shown in FIGS. 12, 13, 14, 17, 18, 21, and 24, the ETD 1000 includes the End Game input 1058 that enables the scorer to end the play of the pickle ball game when the play is over.

The ETD can also be configured, when the leading team gets to a game score of 11 (or other suitable agreed upon game ending score), automatically prompt the scorer a question (such as "Has the game ended?") and enable the scorer to make an input regarding the answer to this question.

After the play of the pickleball game ends, the ETD 1000 is configured to display one or more Game Play Summary user interfaces with the game and player data.

Figure 25:
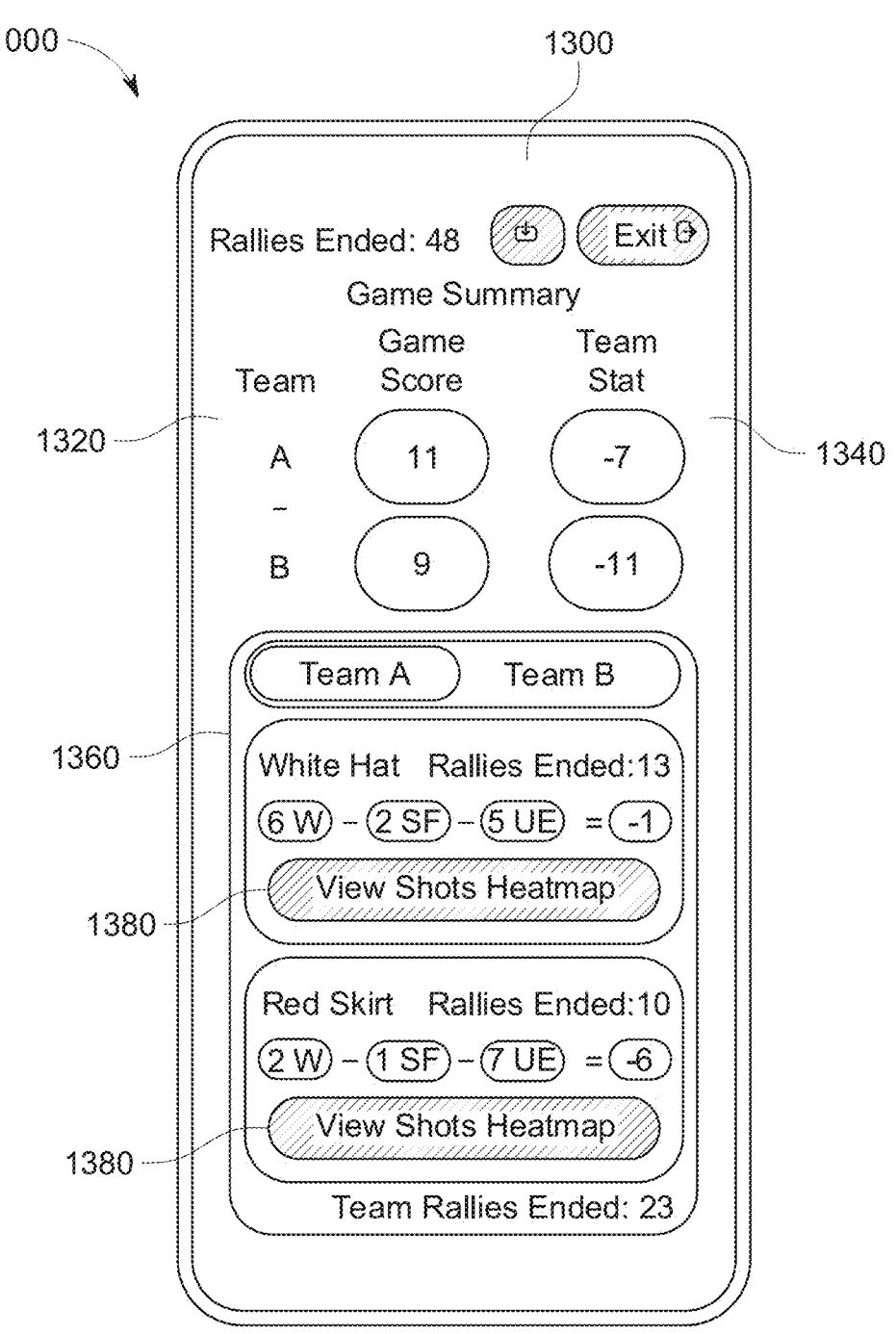
Figure 26:
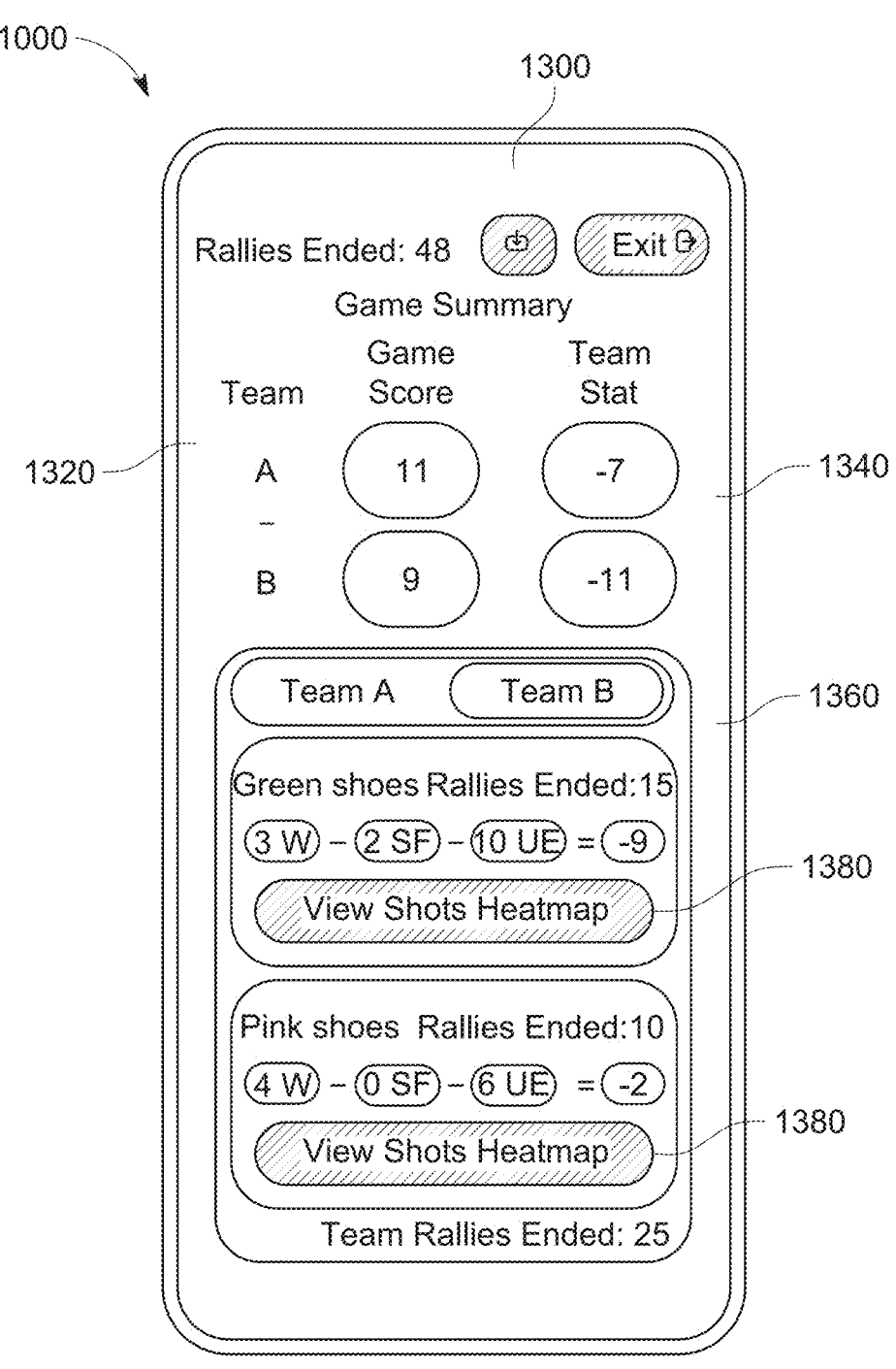
Figure 27:
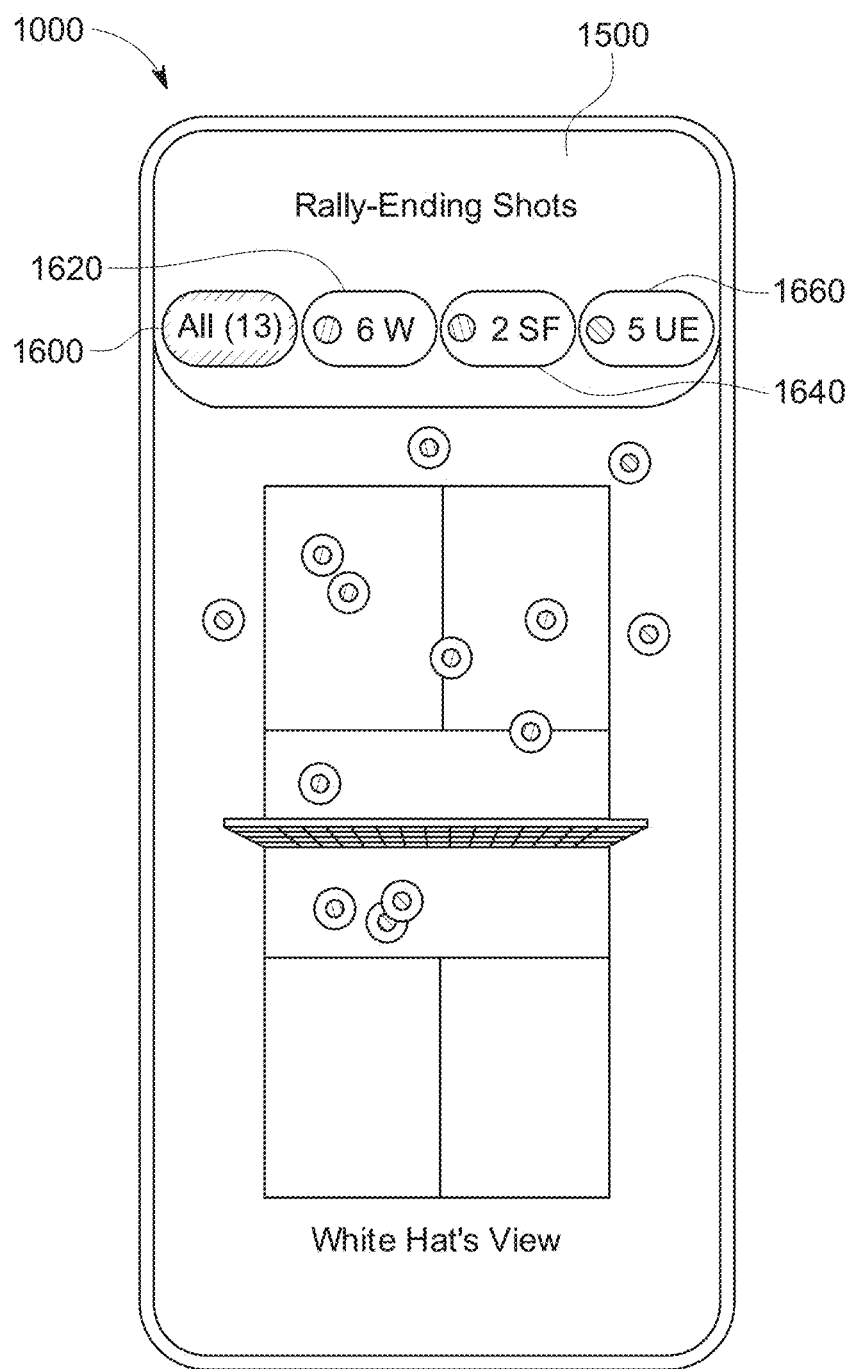
Figure 27A:
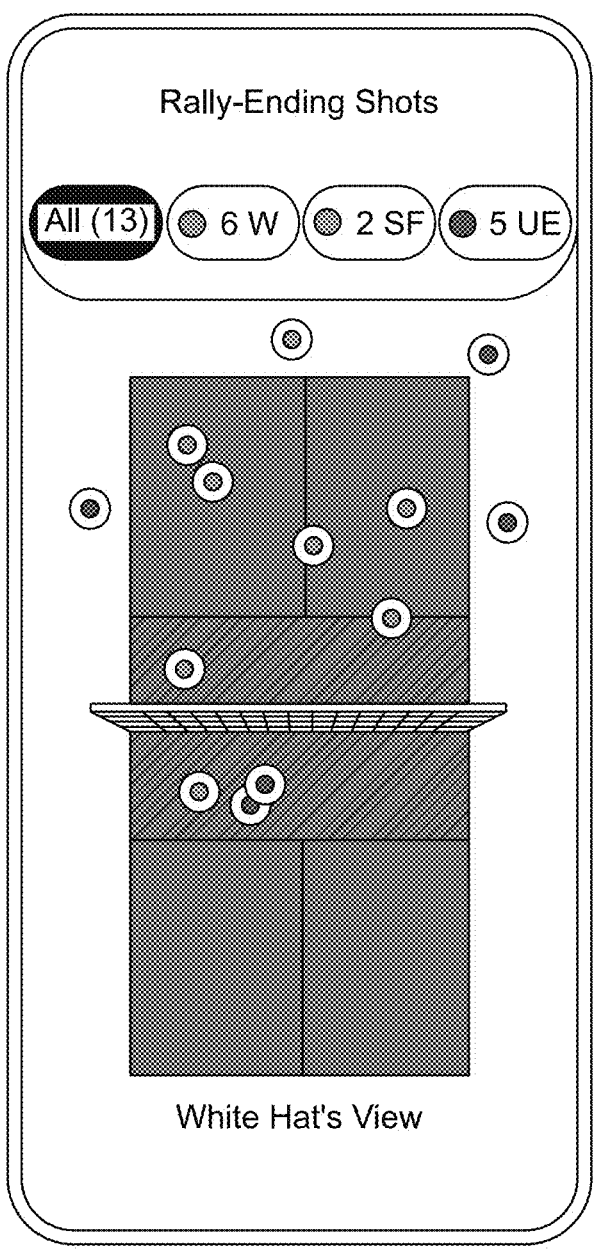
Figure 28:
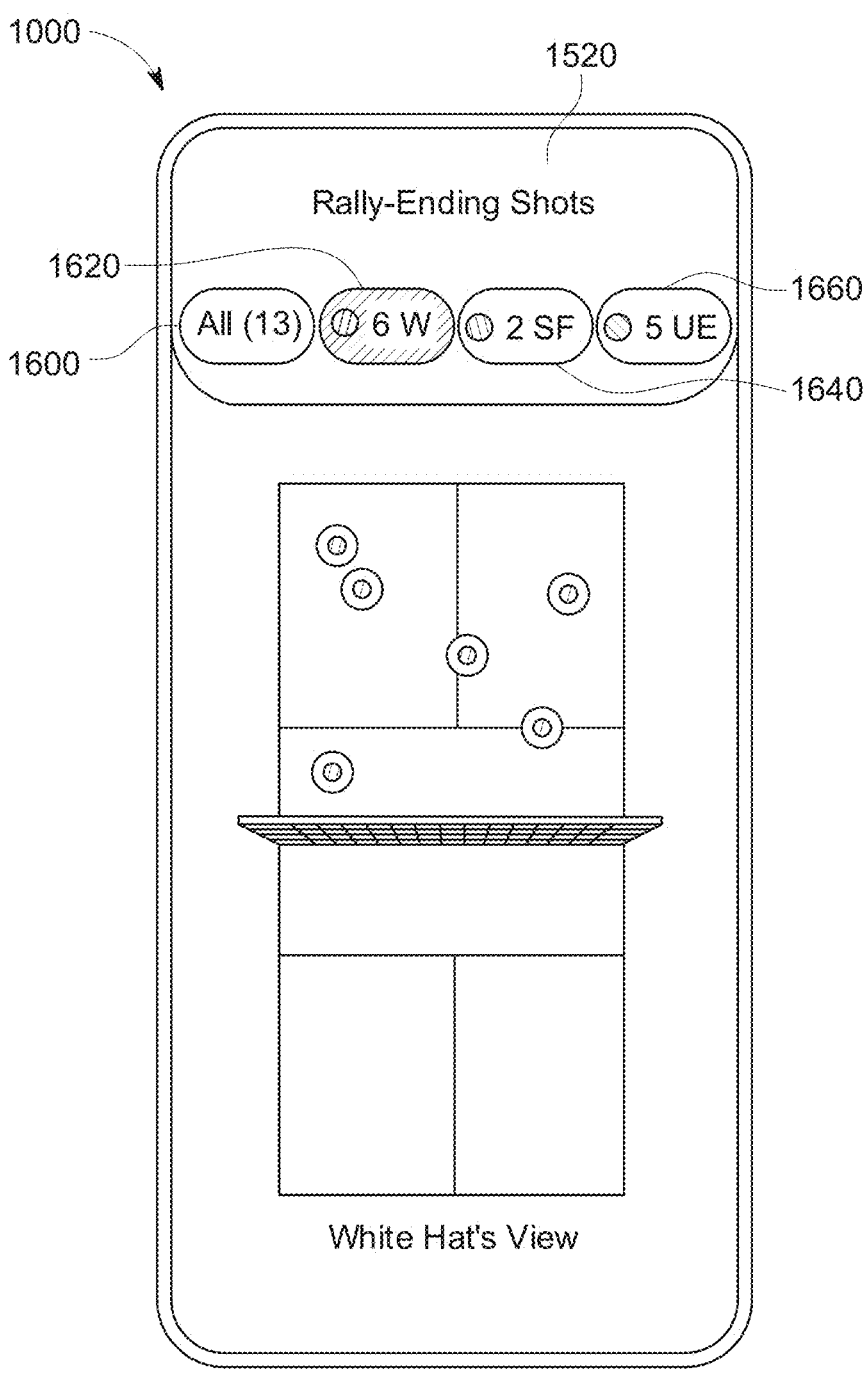
Figure 28A:
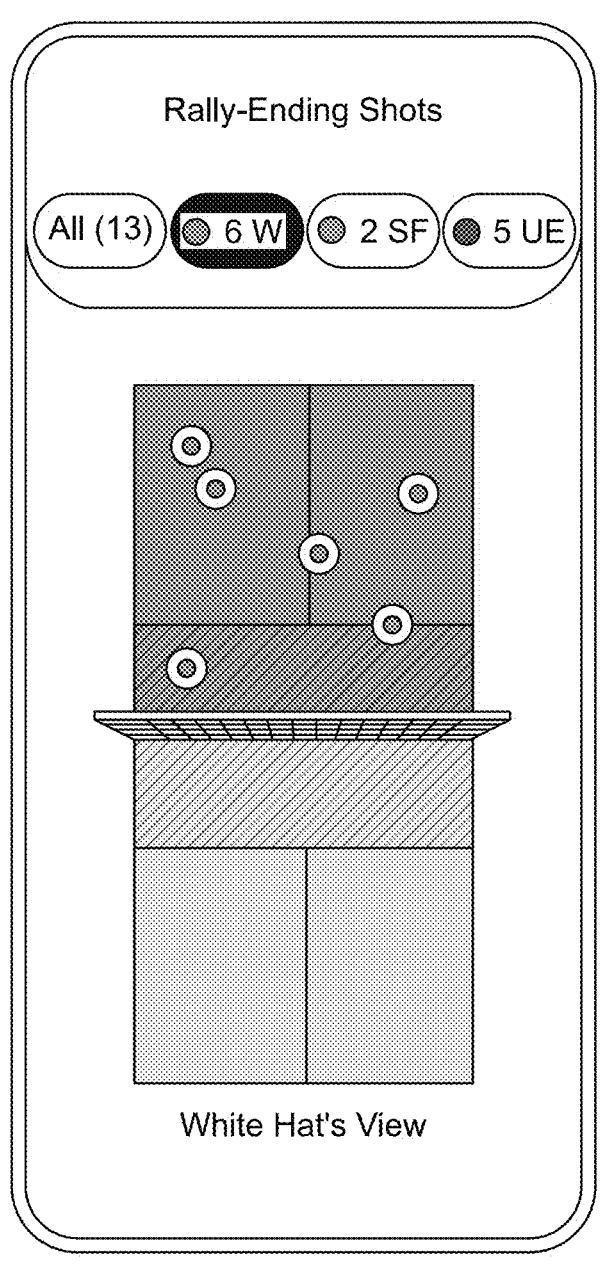
Figure 29:
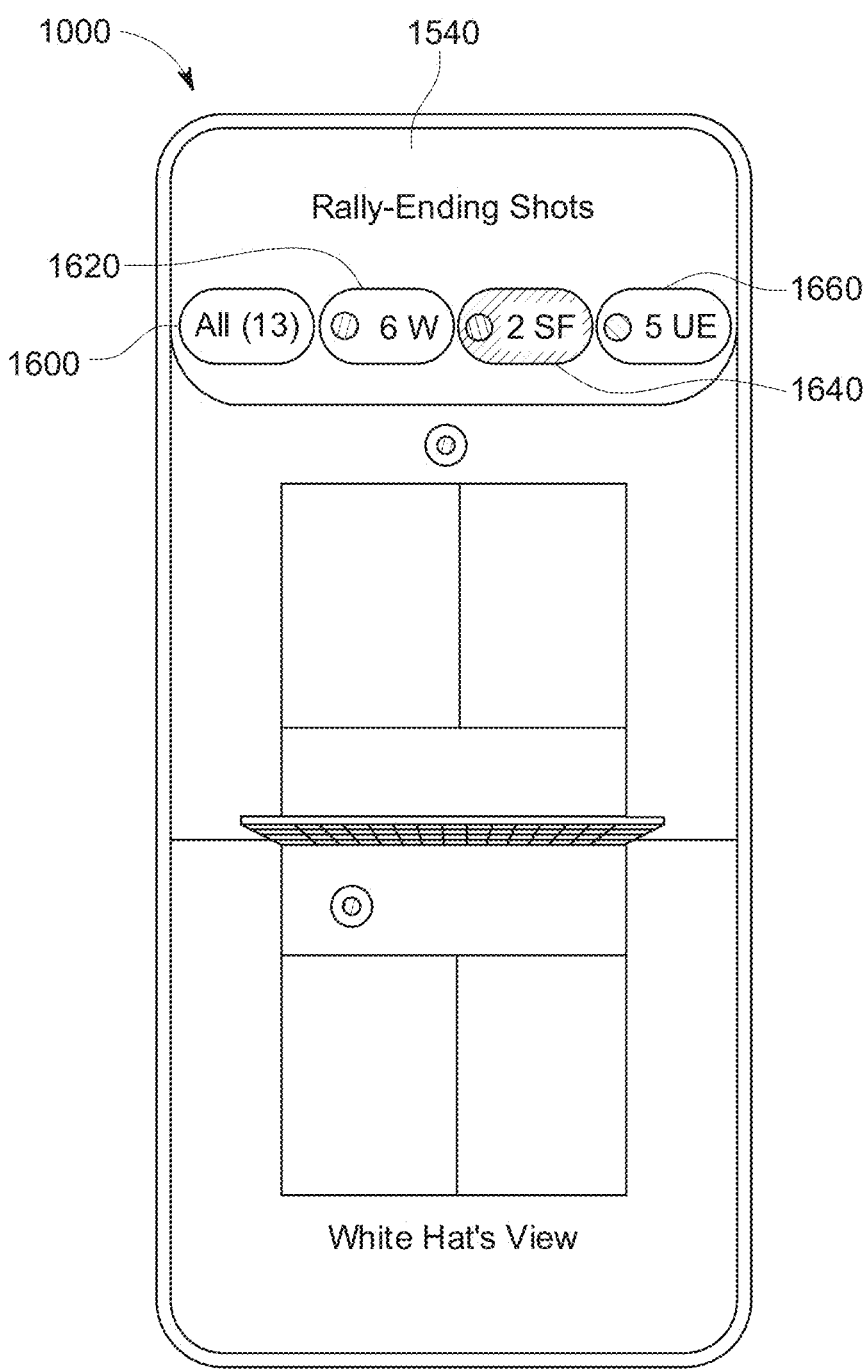
Figure 29A:
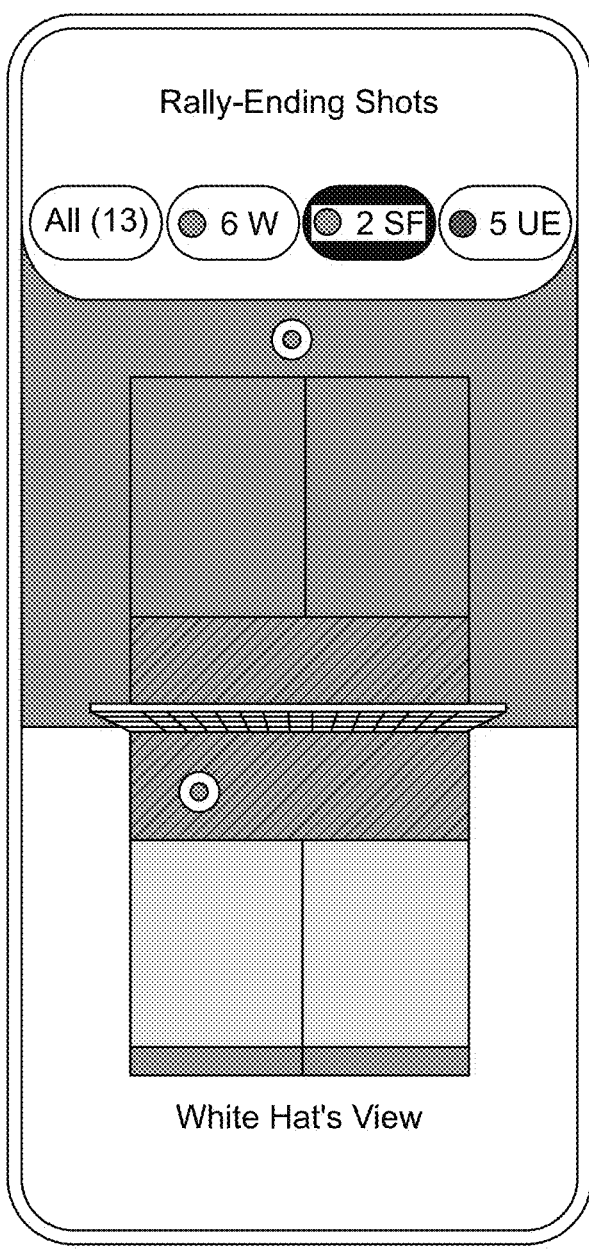
Figure 30:
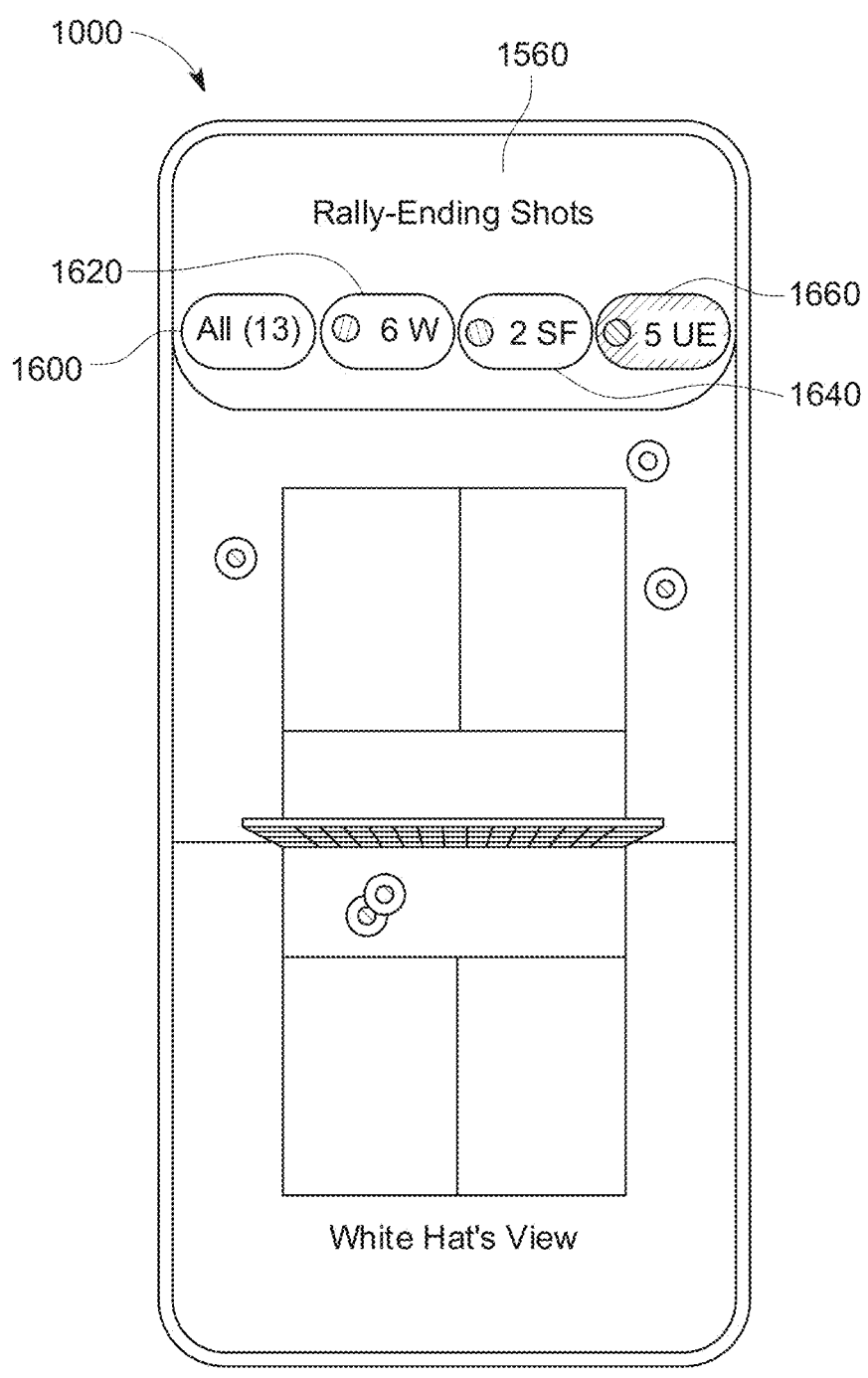
Figure 30A:
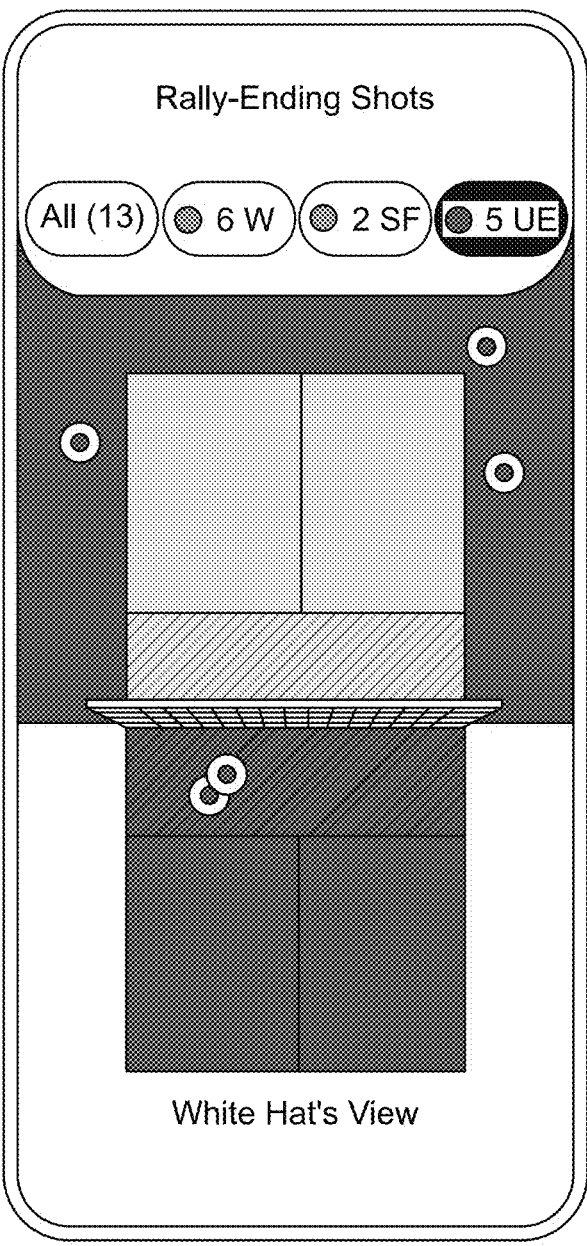

One example Game Summary user interface 1300 shown in FIGS. 25 and 26 displays: (1) the final game score (not labeled) in a final score section 1320; (2) the team rally-ending shot total statistics for each team (not labeled) in a rally-ending shot total stat section 1340; and (3) the individual player rally-ending shot total statistics for each of the players (not labeled) in a player rally-ending shot total stat section 1360. Specifically, in this example, FIG. 25 shows the summary for team A and FIG. 26 shows the summary for team B. In this example embodiment, for each player, the higher the player total stat, the better the performance of the player.

The example Game Summary user interface 1300 shown in FIGS. 25 and 26 also include respective heat map inputs 1380 for each player to see one or more heat maps that show each player's individual performance and specifically their rally-ending shot performance.

FIGS. 27, 28, 29, and 30 show the ETD 1000 displaying example Player Heat Maps interfaces 1500, 1520, 1540, and 1560 that show a player where every single one of their rally-ending shots landed including both the successful ones and the unsuccessful shots.

FIGS. 27, 28, 29, and 30 show the ETD 1000 displaying example different inputs 1600, 1620, 1640, and 1660 that respectively cause the ETD to display the interfaces displaying all a player's rally-ending shots, or each of the three different respective types of rally-ending shots individually.

FIGS. 27A, 28A, 29A, and 30A show the ETD 1000 displaying example different Player Heat Maps interfaces that respectively include the colors blue, green, orange, and red that respectively enhance the ability of the players and/or scorer to better understand the locations of all of a player's rally-ending shots for the entire play and the respective locations of each of the three different respective types of the player's rally-ending shots individually.

It should be appreciated from FIGS. 15A, 19A, 22A, 27A, 28A, 29A, and 30A that the ETD 1000 of various embodiments of the present disclosure can use different colors in association with different types of rally-ending shots (e.g., winning shots, service faults, and unforced errors) in a consistent manner and in different graphical user interfaces.

It should also be appreciated that the different heat map interfaces can be used to jointly show the performance of multiple players at one time.

It should be appreciated since the ETD 1000 tracks and stores data regarding each of the rally-ending shots by each player and provide this data back to the system server for each player, the system server can enable each player to use their own ETD to access such interfaces to review their own performance. For example, if a player plays five games, the ETD and/or the system server can email the player a high-level heat map showing all rally-ending shots by the player for all five games to show individual performance.

These interfaces enable the scorer and each individual player to see data regarding: (1) whether the player is right-handed or left-handed; (2) whether the player has weak backhand (as indicated by many shots unforced errors (UE) that hit into net); (3) whether the player with unforced errors is a 'Banger'—that hits line drives (including some that are winners but many that are into net or long); (4) whether the player has range of winners such as drop shots, shots at opponent's feet or deep into court; (5) which opposing player to attack; (6) which opposing player to avoid hitting the ball to during a rally; and (7) how the player should defend and attack based on their previous performance and strengths and weaknesses.

Figure 31:
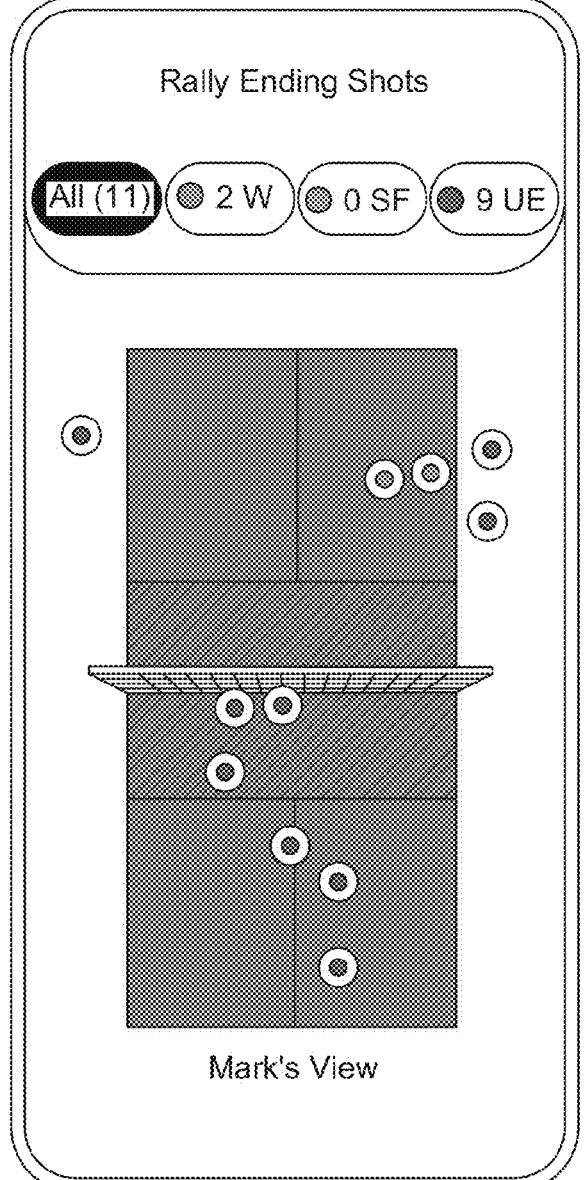
Figure 31:
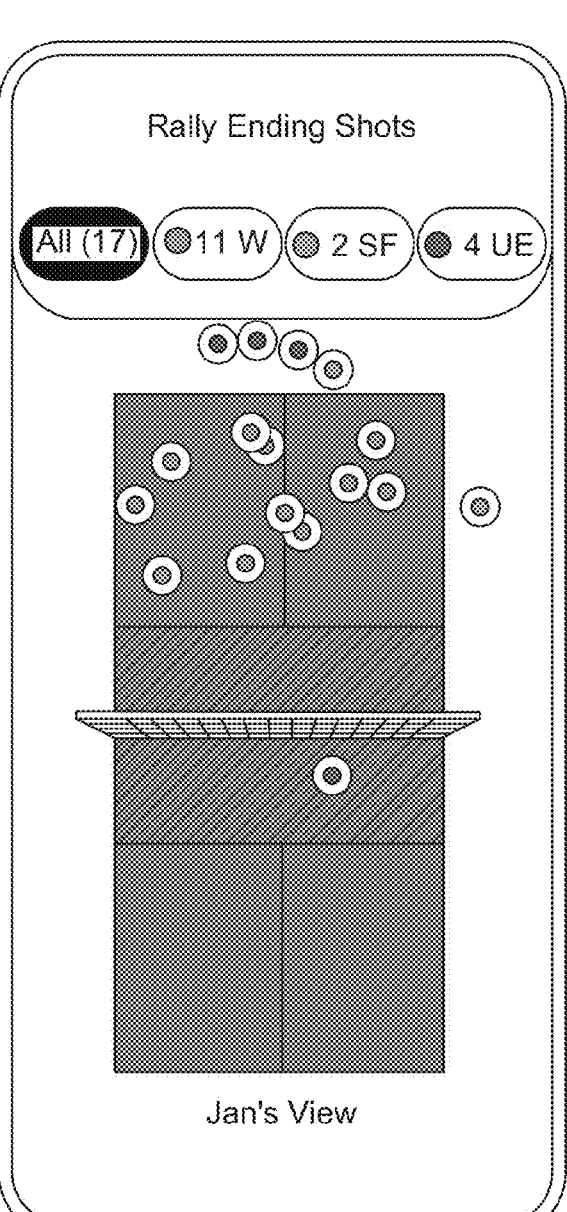

FIG. 31 shows the ETD displaying example interfaces for a play of a pickleball game wherein one team has a strong player (Jan) paired with a weaker player (Mark). The example interface on the right side of FIG. 31 shows that Jan's performance is stellar. The ETD shows a heat map interface for Jan with many winning rally ending shots including high percentage shots (e.g., keeping the ball in the middle of the court). The interfaces can show that the Jan/Mark team ended 28 of the 42 rallies, or ⅔ of all the rallies with 13 winning rally ending shots. For this play, the example interface on the left side of FIG. 31 shows that if Mark had not made the 9 unforced errors, the score of the play of the pickleball game would not have been close.

Figure 32:
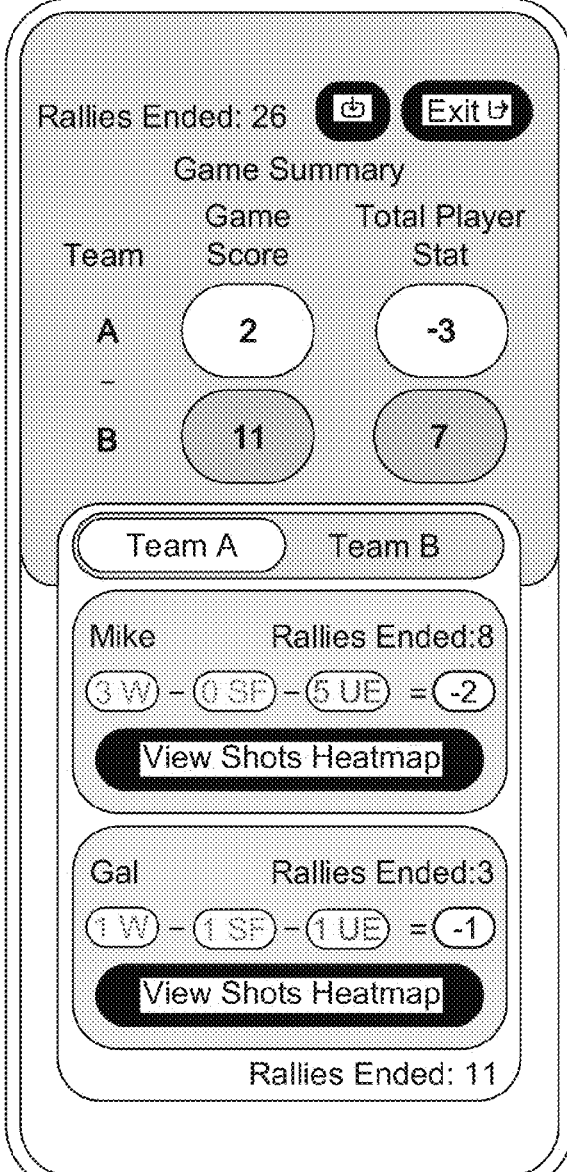
Figure 32:
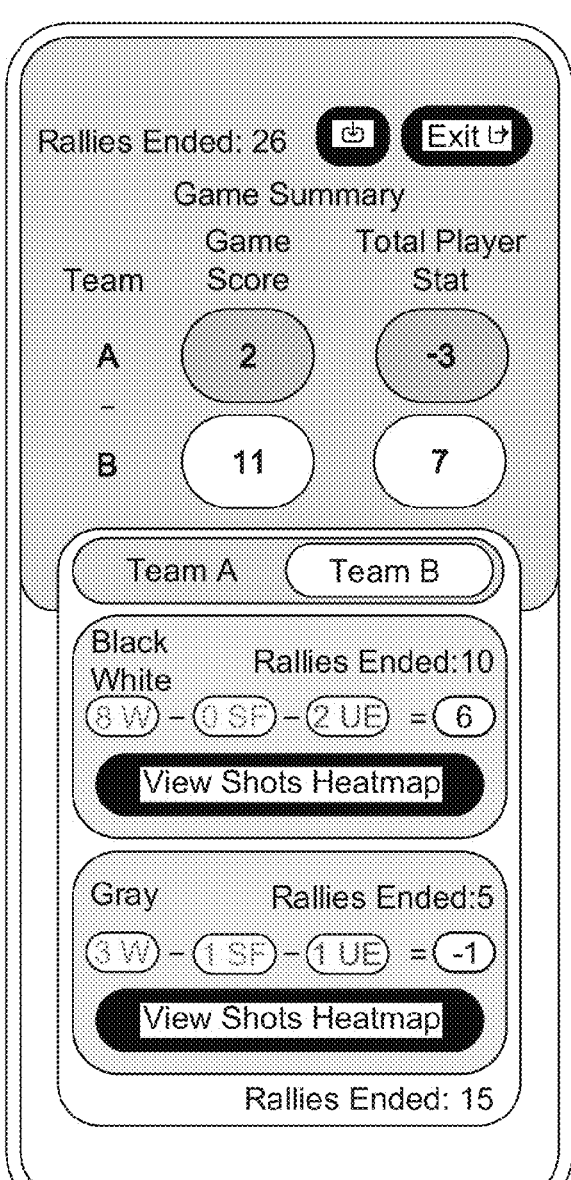

FIG. 32 shows the ETD displaying example interfaces for an example lop-sided game play. As indicated by the player total stats in these interfaces, the better the player/team, the higher the player total stat score.

Figure 33:
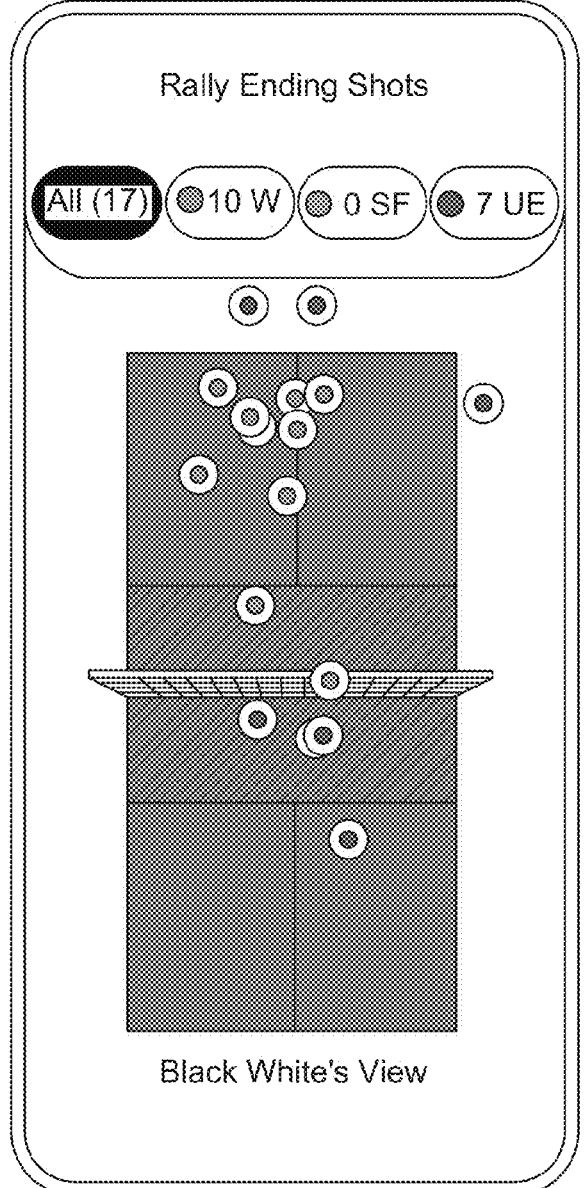
Figure 33:
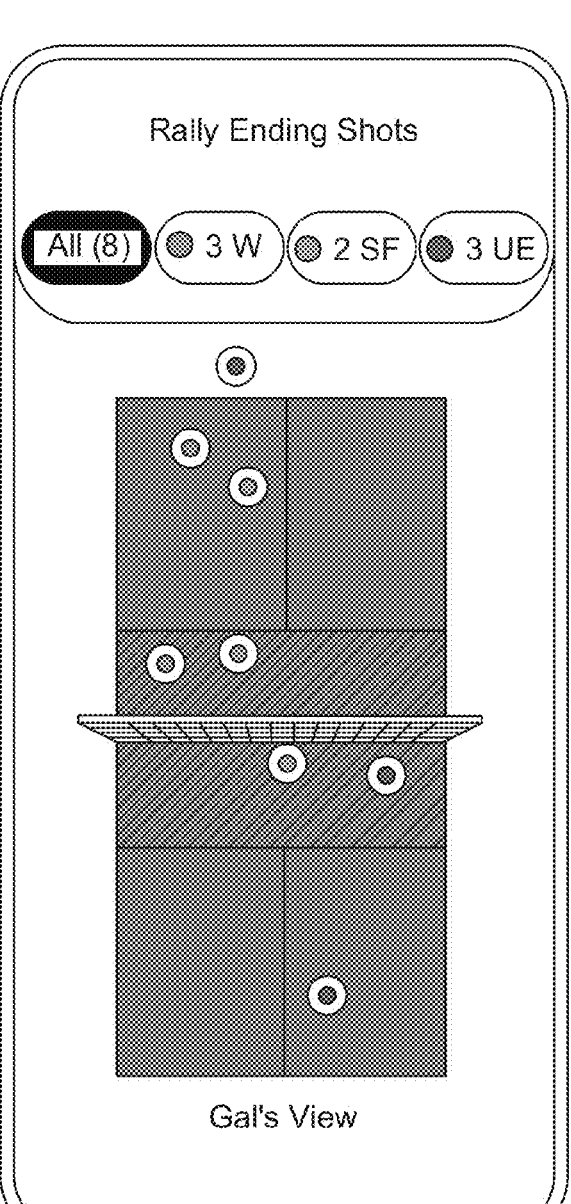

FIG. 33 shows the ETD displaying example interfaces for a play of a pickleball game where 18 points are scored, 38 rallies occurred, the player referenced by the black and white clothing dominated the game play with 10 winning rally ending shots. The interfaces also indicate that there was good shot selection down the middle of the opponent's court and thus good percentage play. These example interfaces further indicate that "Gal" was a representative player, but could use practice based on the indicated winning shots into the opponent's LEFT side court as opponent views it, for balance.

It should be appreciated form these various example that the interfaces can provide various different types of player stat and other information for the players.

It should be appreciated that the interfaces can each include one or more transfer to another interface input buttons (not shown) or exit interface buttons (not shown) that enable the scorer to change interfaces.

It should be appreciated that the terminology used herein is for the purpose of describing particular aspects only and is not intended to be limiting of the disclosure. For example, the singular forms "a," "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention claimed is:

1. A pickleball player statistic tracking device comprising:
a combination display device and touch screen input device;
a processor; and
a memory device that stores a plurality of instructions, which when executed by the processor, cause the processor to:
for each of four players of a play of a pickleball game, receive player identification signals generated from inputs, via the combination display device and touch screen input device, related to player identification;
for each of the four players of the play of the pickleball game, cause data based on said player identification signals to be stored in the memory device;
cause a display, by the combination display device and touch screen input device, of a rally graphical user interface that includes for each of the four players of the play of the pickleball game:
a player identification,
a player winning shots indication,
a player service faults indication,
a player unforced errors indication, and
a player total stat indication;
for each of the four players of the play of the pickleball game, receive rally ending related signals generated from inputs using the rally graphical user interface, via the combination display device and touch screen input device, related to any player winning shots, any player service faults, and any player unforced errors during the play of the pickleball game;
for each of the four players of the play of the pickleball game, cause data based on said rally ending signals to be stored in the memory device; and
cause a display, by the combination display device and touch screen input device, of the rally graphical user interface that includes for each of two teams that include the four players for the play of the pickleball game:
a team identification indication,
a team game score indication, and
a team total stat indication.

2. The pickleball player statistic tracking device of claim 1, wherein the plurality of instructions, which when executed by the processor, cause the processor to cause a display, by the combination display device and touch screen input device, of the rally graphical user interface including a current rally number indication.

3. The pickleball player statistic tracking device of claim 1, wherein the plurality of instructions, which when executed by the processor, cause the processor to cause a display, by the combination display device and touch screen input device, of the rally graphical user interface including a current team serving indication.

4. The pickleball player statistic tracking device of claim 1, wherein the plurality of instructions, which when executed by the processor, cause the processor to cause a display, by the combination display device and touch screen input device, of the rally graphical user interface including a current service number indication for the current team serving.

5. The pickleball player statistic tracking device of claim 1, wherein the plurality of instructions, which when executed by the processor, cause the processor to cause a display, by the combination display device and touch screen input device, of the rally graphical user interface including a game ending input.

6. The pickleball player statistic tracking device of claim 1, wherein the plurality of instructions, which when executed by the processor, cause the processor to cause a display, by the combination display device and touch screen input device, of the rally graphical user interface including a winning shot input, a service fault input, and an unforced error input.

7. The pickleball player statistic tracking device of claim 6, wherein the plurality of instructions, which when executed by the processor, cause the processor to, responsive actuation of any one of the winning shot input, the service fault input, and the unforced error input via the rally graphical user interface, cause a display, by the combination display device and touch screen input device, of a shot location graphical user interface that includes a court layout that enables input of a location where a ball of the rally landed on a pickleball court.

8. The pickleball player statistic tracking device of claim 1, wherein the plurality of instructions, which when executed by the processor, cause the processor to, responsive actuation of input of the location where the ball of the rally landed on the pickleball court via the shot location graphical user interface, cause a display, by the combination display device and touch screen input device, of a player graphical user interface that enables an input of the player who made the unforced error.

9. The pickleball player statistic tracking device of claim 1, wherein the plurality of instructions, which when executed by the processor, cause the processor to cause a display, by the combination display device and touch screen input device, of game play summary user interfaces that includes a final game score indication, a team total stat indication for each team, and an individual player total stat for each of the players.

10. The pickleball player statistic tracking device of claim 1, wherein the plurality of instructions, which when executed by the processor, cause the processor to cause a display, by the combination display device and touch screen input device, of game play summary user interfaces that includes respective heat map inputs for each player.

11. The pickleball player statistic tracking device of claim 10, wherein the plurality of instructions, which when executed by the processor, cause the processor to, responsive to actuation of one of the respective shot heat map inputs for one of the players, cause a display, by the combination display device and touch screen input device, of a shot game play summary user interfaces that includes a shot heat map for that player that shows where every one of the player's rally-ending shots landed in a court.

12. The pickleball player statistic tracking device of claim 1, wherein the plurality of instructions, which when executed by the processor, cause the processor to cause a display, by the combination display device and touch screen input device, of a game play summary user interface for one of the players that includes different inputs that respectively cause the display of different graphical user interfaces showing all of a player's rally-ending shots or each of the three different respective types of rally-ending shots individually.

13. A pickleball player statistic tracking device comprising:

a combination display device and touch screen input device;

a processor; and a memory device that stores a plurality of instructions, which when executed by the processor, cause the processor to:

for each of four players of a play of a pickleball game, receive player identification signals generated from inputs, via the combination display device and touch screen input device, related to player identification;

for each of the four players of the play of the pickleball game, cause data based on said player identification signals to be stored in the memory device;

cause a display, by the combination display device and touch screen input device, of a rally graphical user interface that includes for each of four players of the play of the pickleball game:

a player identification, a player winning shots indication, a player service faults indication, a player unforced errors indication, and a player total stat indication;

for each of the four players of the play of the pickleball game, receive rally ending related signals generated from inputs using the rally graphical user interface, via the combination display device and touch screen input device, related to any player winning shots, any player service faults, and any player unforced errors during the play of the pickleball game;

for each of the four players of the play of the pickleball game, cause data based on said rally ending signals to be stored in the memory device; and cause a display, by the combination display device and touch screen input device, of the rally graphical user interface that includes for each of two teams that include the four players for the play of the pickleball game:

a team identification indication, a team game score indication, a team rally score indication, a current rally number indication, a current team serving indication, a current service number indication for the current team serving, a game ending input, a winning shot input, a service fault input, and an unforced error input.

14. The pickleball player statistic tracking device of claim 13, wherein the plurality of instructions, which when executed by the processor, cause the processor to cause a display, by the combination display device and touch screen input device, of game play summary user interfaces that includes a final game score indication, a team total stat indication for each team, and an individual player total stat for each of the players.

15. The pickleball player statistic tracking device of claim 13, wherein the plurality of instructions, which when executed by the processor, cause the processor to, responsive actuation of any one of the winning shot input, the service fault input, and the unforced error input via the rally graphical user interface, cause a display, by the combination display device and touch screen input device, of a shot location graphical user interface that includes a court layout that enables input of a location where a ball of the rally landed on a pickleball court, and a player graphical user interface that enables an input of the player who made the unforced error.

16. A pickleball player statistic tracking device comprising:

a combination display device and touch screen input device;

a processor; and a memory device that stores a plurality of instructions, which when executed by the processor, cause the processor to:

cause a display, by the combination display device and touch screen input device, for a play of a pickleball game of:

a game setup graphical user interface, a rally graphical user interface, a winning shot location graphical user interface, a service fault location graphical user interface, an unforced error graphical user interface, a player winning shot graphical user interface, a player service fault graphical user interface, a player unforced error graphical user interface, and a game summary graphical user interface;

for each of four players of the play of the pickleball game, receive player identification signals generated from inputs, via the combination display device and touch screen input device, related to player identification;

for each of the four players of the play of the pickleball game, cause data based on said player identification signals to be stored in the memory device;

for each of the four players of the play of the pickleball game, receive rally ending related signals generated from inputs using the rally graphical user interface, via the combination display device and touch screen input device, related to any player winning shots, any player service faults, and any player unforced errors during the play of the pickleball game; and for each of the four players of the play of the pickleball game, cause data based on said rally ending signals to be stored in the memory device.

17. The pickleball player statistic tracking device of claim 16, wherein the plurality of instructions, which when executed by the processor, cause the processor to cause a display, by the combination display device and touch screen input device, of a player rally-ending shot summary user interface.

18. The pickleball player statistic tracking device of claim 16, wherein the plurality of instructions, which when executed by the processor, cause the processor to cause a display, by the combination display device and touch screen input device, of player shot summary graphical user interfaces that separately display indications of each of the player's winning shots, each of the player's service faults, and each of the player's unforced errors.

19. The pickleball player statistic tracking device of claim 16, wherein the plurality of instructions, which when executed by the processor, cause the processor to cause a display, by the combination display device and touch screen input device, of the winning shot location graphical user interface indicating first possible areas on a court for winning shots in a first color, the service fault location graphical user interface indicating second possible areas on the court for service faults in a second color, and the unforced error graphical user interface, indicating third possible areas on the court for unforced errors in a third color, wherein the first, second, and third colors are different.

20. The pickleball player statistic tracking device of claim 16, wherein the plurality of instructions, which when executed by the processor, cause the processor to cause a display, by the combination display device and touch screen input device, of the winning shot location graphical user interface indicating first possible areas on a court for winning shots in a first color, the service fault location graphical user interface indicating second possible areas on the court for service faults in a second color, and the unforced error graphical user interface, indicating third possible areas on the court for unforced errors in a third color, wherein the first color is green, the second color is orange, and the third color is red.

* * * * *